United States Patent
Maguire

(10) Patent No.: US 12,371,235 B2
(45) Date of Patent: Jul. 29, 2025

(54) TOOL FOR MANUFACTURING A CAP FOR A CONTAINER

(71) Applicant: ThisCap, Inc., Las Vegas, NV (US)

(72) Inventor: Michael Joseph Maguire, San Jose, CA (US)

(73) Assignee: ThisCap, Inc., Las Vegas, NV (US)

(*) Notice: Subject to any disclaimer, the term of this patent is extended or adjusted under 35 U.S.C. 154(b) by 1170 days.

(21) Appl. No.: 17/120,158

(22) Filed: Dec. 12, 2020

(65) Prior Publication Data
US 2021/0094736 A1    Apr. 1, 2021

Related U.S. Application Data

(63) Continuation-in-part of application No. 16/834,916, filed on Mar. 30, 2020, now Pat. No. 11,312,544, and
(Continued)

(30) Foreign Application Priority Data

Apr. 2, 2015    (TW) ................................ 104110838

(51) Int. Cl.
*B65D 55/16*     (2006.01)
*B26F 1/22*      (2006.01)
(Continued)

(52) U.S. Cl.
CPC ................ *B65D 55/16* (2013.01); *B26F 1/22* (2013.01); *B29C 45/0017* (2013.01);
(Continued)

(58) Field of Classification Search
CPC ................ B65D 55/16; B65D 19/0046; B65D 19/0053; B65D 41/3428; B65D 41/3447;
(Continued)

(56) References Cited

U.S. PATENT DOCUMENTS 5,215,204 A * 6/1993 Beck ...................... B65D 55/16
                                                215/258
5,246,125 A * 9/1993 Julian ................ B65D 41/3447
                                                215/252
(Continued)

FOREIGN PATENT DOCUMENTS

DE    202019106993 U1    1/2020
DE    202019104298 U1 * 12/2020 ............... B26D 3/08
(Continued)

OTHER PUBLICATIONS

EP-3800020-A1 english translation; Apr. 7, 2021; EP ; Friedli P.*
Japanese Patent Application No. 2022-559828, Office Action mailed Mar. 25, 2025, 6 pages.

*Primary Examiner* — Laura M Lee

(74) *Attorney, Agent, or Firm* — Conley Rose, P.C.

(57) ABSTRACT

A tool for manufacturing a cap for a container comprises a blade set that includes a plurality of knives. The knives are configured to make incisions in a cap having a main body having a top plate and a circular sidewall. The top plate has a top surface, wherein two opposite sides of the circular sidewall circularly connect to each other, one periphery of the circular sidewall connects to one surface of the top plate forming a closed end, and the other periphery of the circular sidewall at the opposite side of the closed end forms an opened end and a ring member, which is located at the opened end of the main body. There is a first tab on the ring member and a second tab on the sidewall.

8 Claims, 52 Drawing Sheets

Related U.S. Application Data a continuation-in-part of application No. 16/524,030, filed on Jul. 27, 2019, now Pat. No. 11,332,290, which is a continuation-in-part of application No. 16/121,506, filed on Sep. 4, 2018, now Pat. No. 10,836,549, which is a continuation-in-part of application No. 15/694,441, filed on Sep. 1, 2017, now Pat. No. 10,647,486, which is a continuation-in-part of application No. 15/480,125, filed on Apr. 5, 2017, now Pat. No. 9,932,159, which is a continuation of application No. 14/725,246, filed on May 29, 2015, now Pat. No. 9,643,762.

(51) Int. Cl.

| | | |
|---|---|---|
| *B29C 45/00* | (2006.01) | |
| *B29C 69/00* | (2006.01) | |
| *B29K 23/00* | (2006.01) | |
| *B29L 31/56* | (2006.01) | |
| *B65D 41/04* | (2006.01) | |
| *B65D 41/34* | (2006.01) | |

(52) U.S. Cl.
CPC ........ *B29C 45/0053* (2013.01); *B29C 69/001* (2013.01); *B65D 41/04* (2013.01); *B65D 41/34* (2013.01); *B65D 41/3428* (2013.01); *B65D 41/3447* (2013.01); *B26F 2210/04* (2013.01); *B29K 2023/12* (2013.01); *B29L 2031/56* (2013.01); *B29L 2031/565* (2013.01); *Y10T 83/0333* (2015.04); *Y10T 83/0596* (2015.04); *Y10T 83/6667* (2015.04)

(58) Field of Classification Search
CPC .... B26F 1/22; B26F 2210/04; Y10T 83/0333; Y10T 83/0596; Y10T 83/0348; Y10T 83/0363
USPC ........................................ 215/252, 258, 253
See application file for complete search history.

(56) References Cited

U.S. PATENT DOCUMENTS

| | | | | |
|---|---|---|---|---|
| 5,557,999 | A * | 9/1996 | Smith | B26D 7/01 |
| | | | | 83/418 |
| 6,264,052 | B1 * | 7/2001 | Schmitz | B65D 41/3447 |
| | | | | 215/252 |
| 6,817,276 | B1 * | 11/2004 | Kowal | B26F 1/20 |
| | | | | 83/881 |
| 6,826,994 | B1 * | 12/2004 | Liao | B29C 59/007 |
| | | | | 425/291 |
| 7,673,543 | B2 * | 3/2010 | Albonetti | B26D 7/0608 |
| | | | | 413/67 |
| 10,703,002 | B2 * | 7/2020 | Bergami | B23Q 17/2442 |
| 10,836,549 | B2 * | 11/2020 | Maguire | B65D 41/3428 |
| 11,485,550 | B2 * | 11/2022 | Naumann | B65D 47/0823 |
| 11,577,421 | B2 * | 2/2023 | Menzolini | B26F 1/18 |
| 11,970,311 | B2 * | 4/2024 | Nakamura | B65D 41/3428 |
| 12,053,898 | B2 * | 8/2024 | Venturini | B26F 1/18 |
| 2002/0043142 | A1 * | 4/2002 | Zumbuhl | B26F 1/18 |
| | | | | 83/886 |
| 2007/0089587 | A1 * | 4/2007 | Liao | B26F 1/18 |
| | | | | 83/879 |
| 2010/0258520 | A1 | 10/2010 | Giraud et al. | |
| 2012/0285302 | A1 * | 11/2012 | Bergami | B26D 3/08 |
| | | | | 83/13 |
| 2018/0370701 | A1 * | 12/2018 | Maguire | B65D 41/04 |
| 2020/0384714 | A1 * | 12/2020 | Migas | B29C 69/001 |
| 2021/0300634 | A1 * | 9/2021 | Maguire | B65D 41/3428 |
| 2022/0126472 | A1 * | 4/2022 | Venturini | B26D 1/02 |
| 2023/0098984 | A1 * | 3/2023 | Nakamura | B29D 99/0096 |
| | | | | 215/252 |
| 2023/0150163 | A1 * | 5/2023 | Penazzi | B26F 1/22 |
| | | | | 83/13 |
| 2024/0025070 | A1 * | 1/2024 | Larivée | B65D 55/16 |

FOREIGN PATENT DOCUMENTS

| | | | | |
|---|---|---|---|---|
| EP | 0533633 A2 * | 3/1993 | ............ | B26F 1/0053 |
| EP | 0619168 A1 | 10/1994 | | |
| EP | 3800020 A1 * | 4/2021 | ............... | B26F 1/18 |
| EP | 4353615 A1 * | 4/2024 | ............... | B26D 1/02 |
| JP | 2011173600 A | 9/2011 | | |
| WO | 2020050823 A1 | 3/2020 | | |

* cited by examiner

TOOL FOR MANUFACTURING A CAP FOR A CONTAINER

BACKGROUND

In general, the cap of a conventional container is completely separated from its container once the container is opened. For that reason, it is easy for the separated cap to be dropped, accidentally disposed of and/or misplaced/lost. Moreover, the separated cap when dropped can easily become soiled by coming in to contact with the ground or other uncontrolled surfaces resulting in the cap becoming no longer reusable. Furthermore, the discarded or misplaced/lost separated caps are able to and will pollute the environment and cause additional environmental problems. Therefore, in order to solve these problems, the industry has developed a few caps that will remain connected to their containers while their containers are in an open state. These few caps are thereby prevented from being separated from their containers, dropped, accidentally discarded, misplaced/lost, soiled by contact with the ground or other uncontrolled surfaces or able to pollute the environment or cause additional environmental problems.

Nonetheless, the currently existing caps with the above-mentioned functions can use complex designs and complicated connecting structures that necessitate some difficult physical manipulation by the user to return the caps to a closed sealed state. Manufacture of caps with these structures can also be complex or expensive.

DETAILED DESCRIPTION

Figure 1:
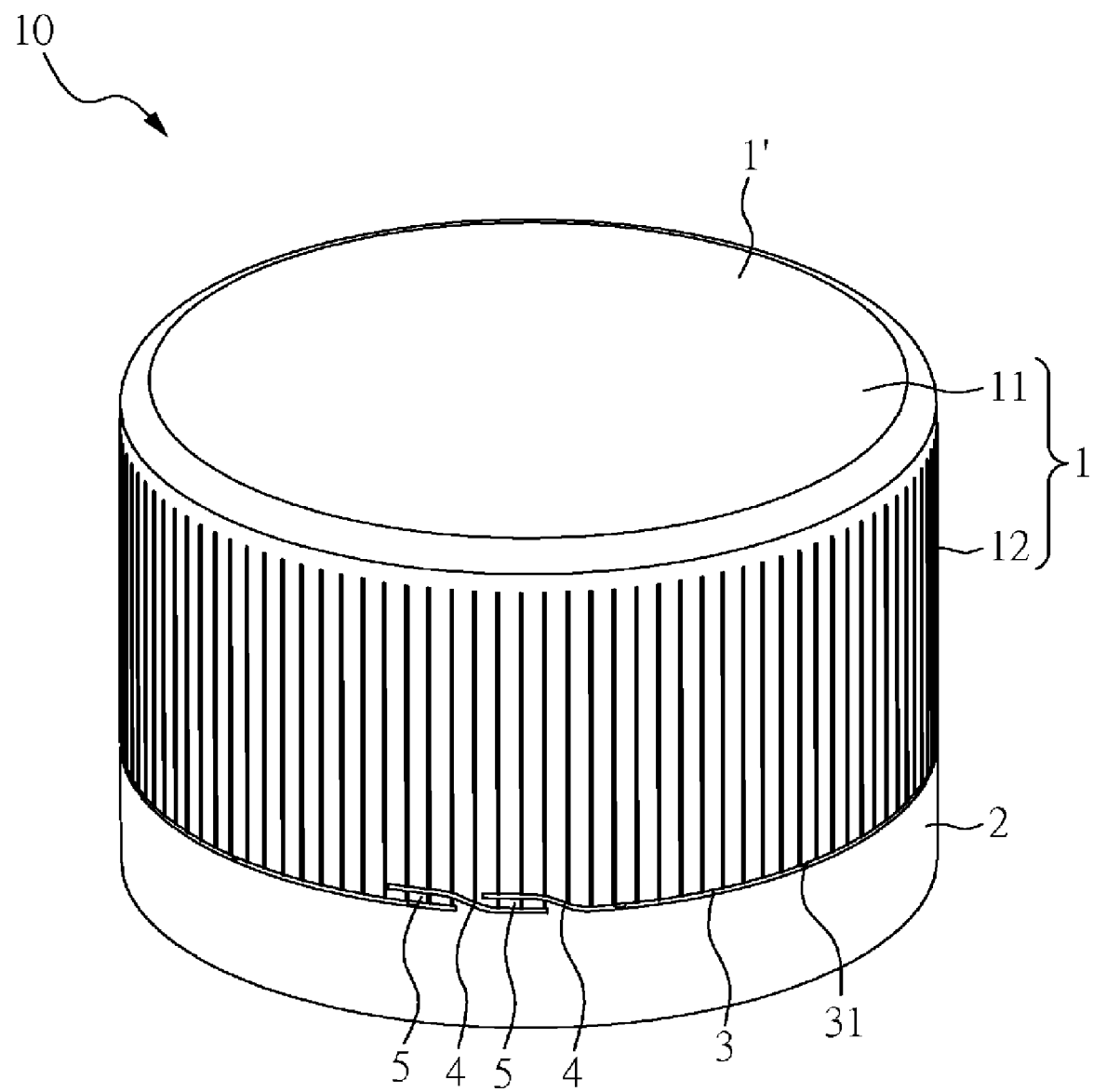
FIG. 1 is a three-dimensional schematic diagram showing an embodiment of the cap for a container in accordance with an embodiment.

FIG. 1 is a three-dimensional schematic diagram showing an embodiment of a cap for a container. As FIG. 1 shows, the cap 10 of the present example includes a main body 1 having a top plate 11 and a circular sidewall 12. The two opposite sides of the circular sidewall 12 circularly connect to each other. One periphery of the circular sidewall 12 connects to one surface of the top plate 11 forming a closed end 1'. The other periphery of the circular sidewall 12 at the opposite side of the closed end 1' forms an opened end 1" (shown in FIG. 3). The cap 10 of the present example also contains a ring member 2, which is located at the opened end 1" of the main body 1. The ring member 2 is separated from the main body 1 by penetration lines which can be formed as part of the formation of cap 10. For example, the penetration lines are formed as part of an injection molding process or other manufacturing process in which cap 10 is formed.

For example, penetration lines may also be formed by incision. While in the description below penetration lines are often referred to as incision lines, the penetration lines can be formed by methods other than incision. The ring member 2 is separated from the main body 1 by a first incision line 3 located in between the opened end 1" of the main body 1 and the ring member 2. The first incision line 3 possesses a plurality of connecting pins 31. The plurality of connecting pins 31 located along the first incision line 3 connect the main body 1 and the ring member 2 at the two sides of the first incision line 3. The two ends of the first incision line 3 are separated by a plurality of connecting portions 5. The plurality of connecting portions 5 connect the main body 1 and the ring member 2 together. Located at one side of the plurality of connecting portions 5 is a plurality of second incision lines 4. The plurality of second incision lines 4 are also located either on the main body 1 or the ring member 2. The two ends of the plurality of second incision lines 4 and itself are not connected. The plurality of second incision lines 4 do not overlap with the first incision line 3.

Figure 2A:
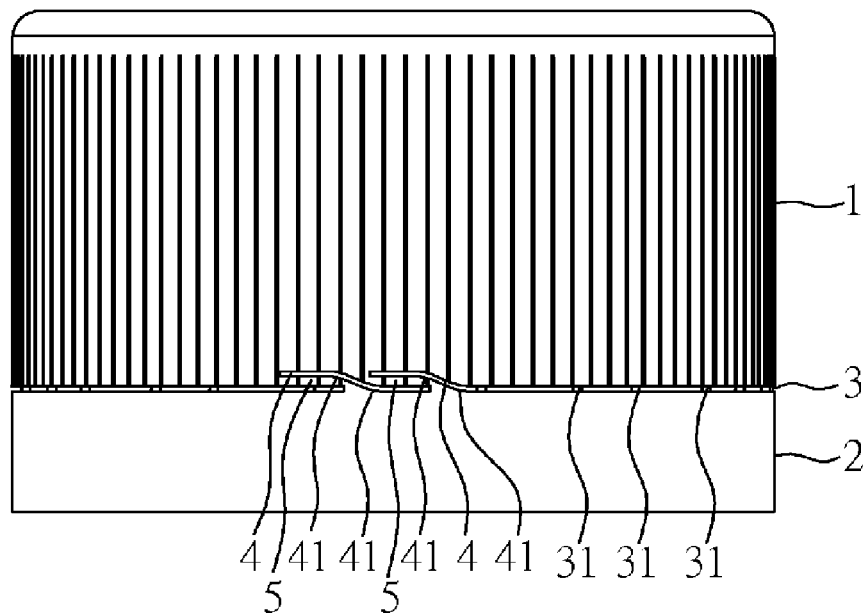
FIG. 2A-2G are schematic diagrams showing different embodiments of a cap for a container.

As FIG. 2A shows, in the present example, the plurality of connecting portions 5 are formed in between the first incision line 3 and the plurality of second incision lines 4. For example, the shape of the plurality of connecting portions 5 is not particularly limited. The shape of the plurality of the connecting portions 5 is depended on the shapes of the first incision line 3 and the plurality of second incision lines 4 located at the sides of the plurality of connecting portions 5. In the present example, the shape of the plurality of connecting portions 5 is cuboid (shown in FIG. 3). For example, the quantity of the plurality of connecting portions 5 is not particularly limited. However, in the present example, the quantity of the plurality of connecting portions 5 is 2. For example, the spacing between each of the plurality of connecting portions 5 is not particularly limited as well. However, in the present example, each of the plurality of connecting portions 5 is separated by parts of the plurality of second incision lines 4.

For example, the quantity of the plurality of second incision lines 4 is not particularly limited. However, in the present example, the quantity of the plurality of second incision lines 4 is 2. As FIG. 2A shows, only the main body 1 possesses the plurality of second incision lines 4. One of the two second incision lines 4 is connected to parts of the first incision line 3. Furthermore, parts of the plurality of second incision lines 4 are parallel to the first incision line 3.

For example, the first incision line 3 and the plurality of second incision lines 4 are not particularly limited. The first incision line 3 and the plurality of second incision lines 4 can individually be, for example, straight lines, curved lines, polylines, arc lines, or the combinations thereof. In the present example, the first incision line 3 is a straight line. The plurality of second incision lines 4 can also be more preferably be L-shaped lines, S-shaped lines, Z-shaped lines, or the combinations thereof. In the present example, the plurality of second incision lines 4 are Z-shaped lines. For example, the corners 41 of the plurality of second incision lines 4 are not particularly limited. The corners 41 of the plurality of second incision lines 4 are, for example, curved corners, chamfered corners, sharp corners, or the combinations thereof. In the present example, the corners 41 of the plurality of second incision lines 4 are curved corners.

For example, the first incision line 3 and the plurality of second incision lines 4 surround parts of the circular sidewall 12 or the ring member 2, but do not fully surround the circular sidewall 12 or the ring member 2. The lengths of the first incision line 3 and the plurality of second incision lines 4 surrounded the circular sidewall 12 or the ring member 2 are not particularly limited. In the present example, the length of the first incision line 3 surrounded the circular sidewall 12 or the ring member 2 is longer than the lengths of each of the plurality of second incision lines 4 surrounded the circular sidewall 12 or the ring member 2; however, this can vary based on implementation.

Figure 2B:
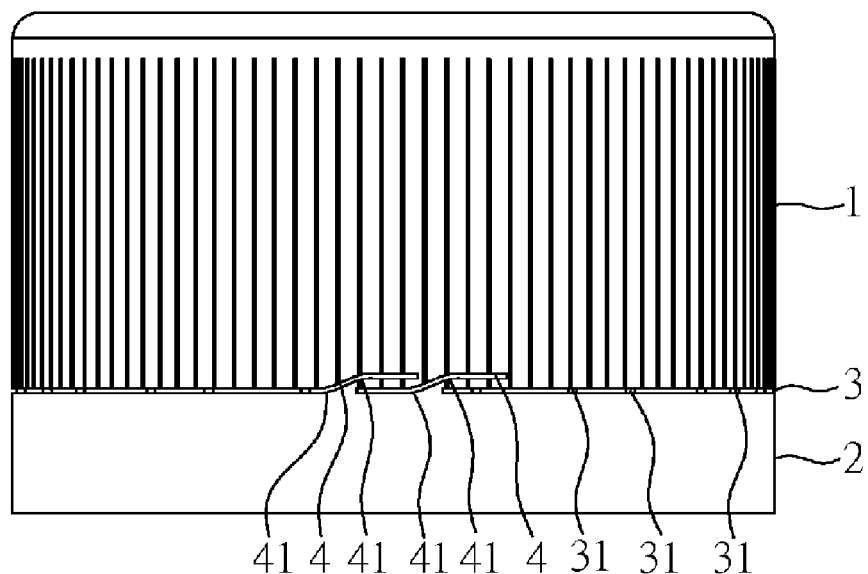

FIG. 2B is a schematic diagram showing another embodiment of the cap for a container. The cap of the present example and the cap shown in FIG. 1 are the same except that the plurality of second incision lines 4 and the plurality of second incision lines 4 shown in FIG. 2A are opposite to each other. Nevertheless, the opening directions of the cap and that of the cap shown in FIG. 2A are still the same (both are in the anti-clockwise direction; that is rotation in the right direction in FIG. 2A or FIG. 2B).

Figure 2C:
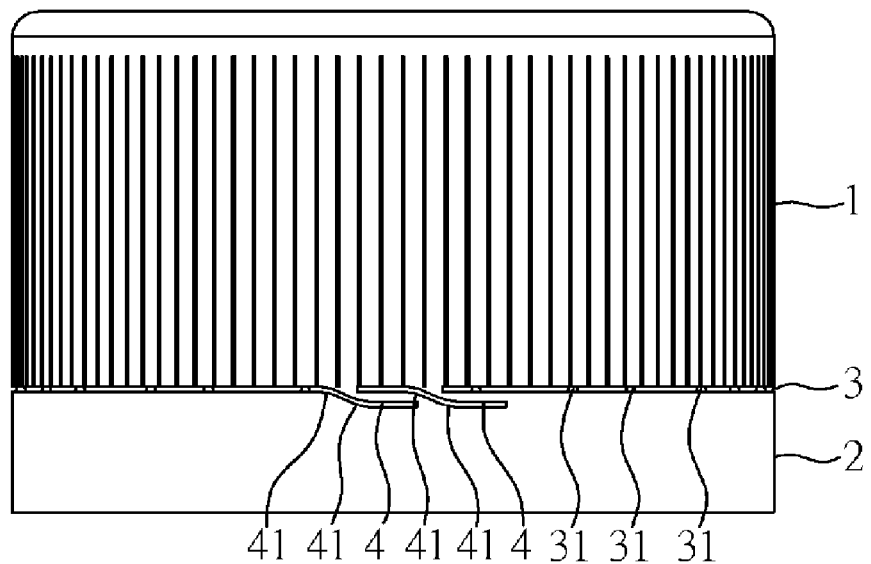

FIG. 2C is a schematic diagram showing another embodiment of the cap for a container. The cap of the present example and the cap shown in FIG. 1 are the same except that only the ring member 2 possesses the plurality of second incision lines 4 and the plurality of second incision lines 4 surround less than ⅕ of the ring member 2.

Figure 2D:
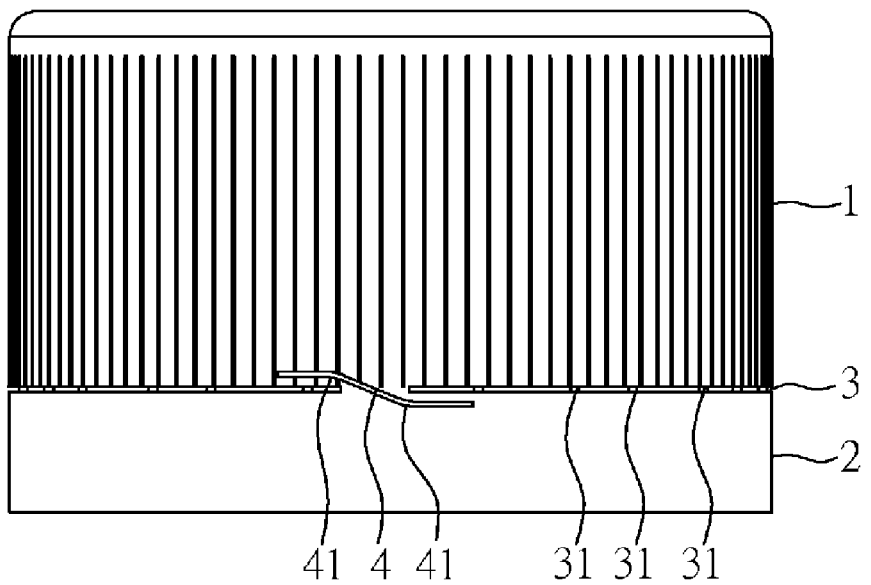

FIG. 2D is a schematic diagram showing another embodiment of the cap for a container. The cap of the present example and the cap shown in FIG. 1 are the same except that the quantity of the plurality of second incision lines 4 is 1, the second incision line 4 extends from the main body 1 to the ring member 2 or from the ring member 2 to the main body 1, the second incision line 4 and the first incision line 3 are not connected, the corners 41 of the second incision line 4 (Z-shaped line) are sharp corners and the second incision line 4 surrounds less than ⅕ of the circular sidewall 12 and less than ⅕ of the ring member 2.

Figure 2E:
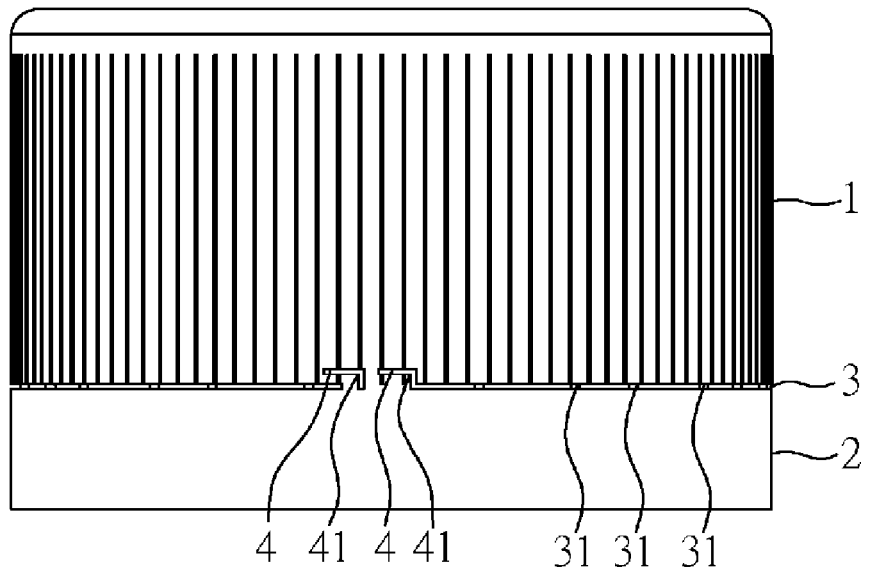

FIG. 2E is a schematic diagram showing another embodiment of the cap for a container. The cap of the present example and the cap shown in FIG. 1 are the same except that the plurality of second incision lines 4 are L-shaped lines and the corners 41 of these L-shaped lines are sharp corners.

Figure 2F:
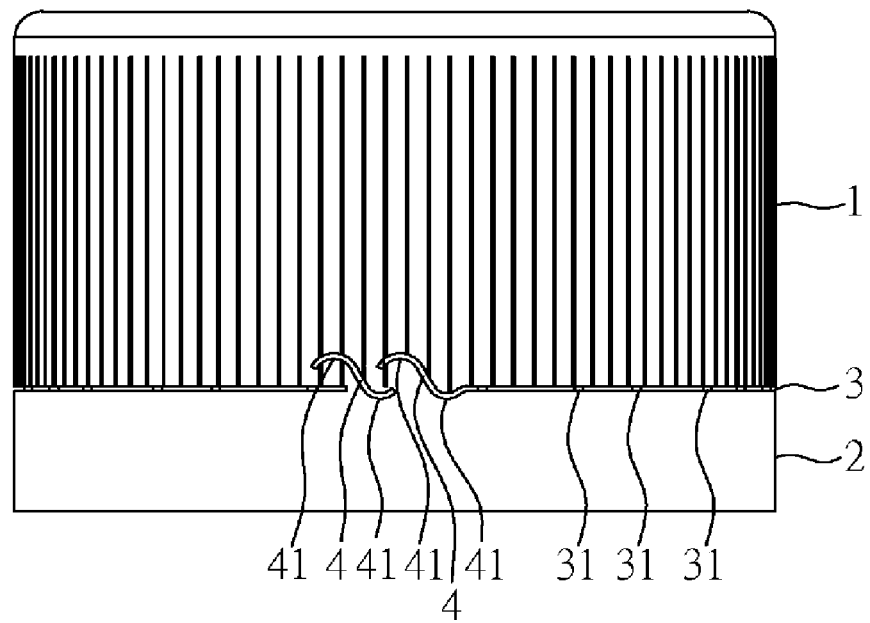

FIG. 2F is a schematic diagram showing another embodiment of the cap for a container. The cap of the present example and the cap shown in FIG. 1 are the same except that the plurality of second incision lines 4 and the first incision line 3 are not parallel to each other and the plurality of second incision lines 4 are S-shaped lines.

Figure 2G:
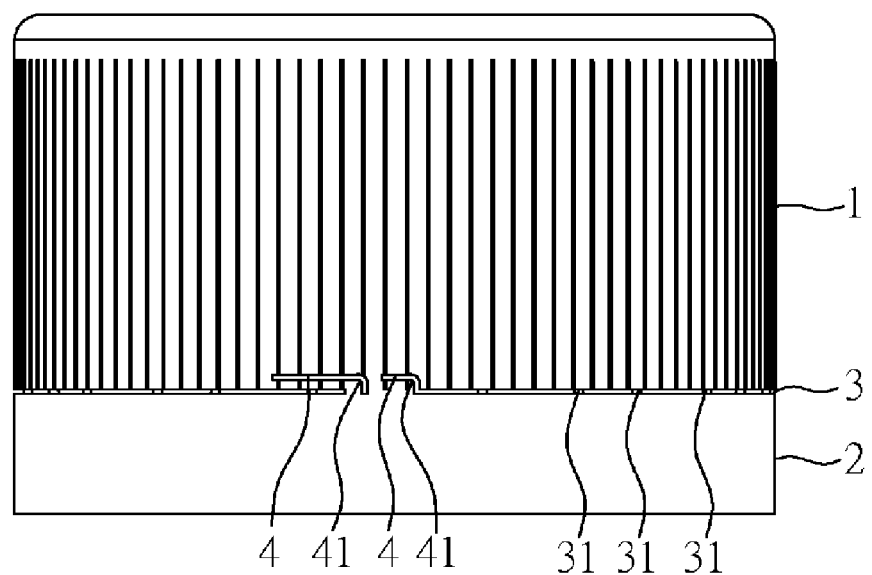

FIG. 2G is a schematic diagram showing another embodiment of the cap for a container. The cap of the present example and the cap shown in FIG. 2E are the same except that the corners 41 of the plurality of second incision lines 4 (L-shaped lines) are curved corners and one of the second incision lines 4 surrounds less than ½ of the circular sidewall 12.

Figure 3:
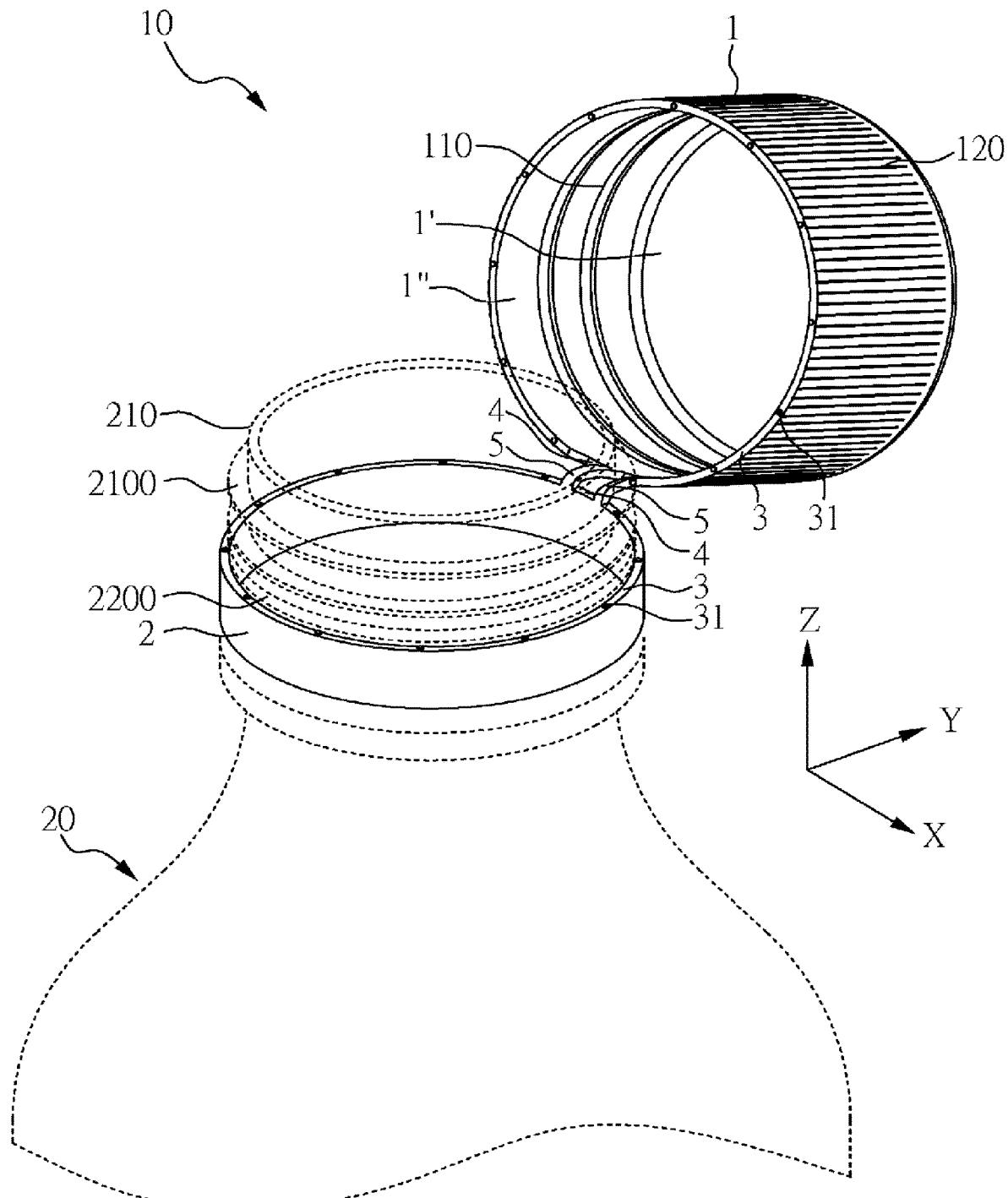
FIG. 3 is a three-dimensional schematic diagram showing an embodiment for a cap being separated from a container

FIG. 3 is a three-dimensional schematic diagram showing an embodiment of the cap for a container being separated from a container, wherein the cap shown can be any one of the caps of any one of the above-mentioned examples.

Hereinafter, the practical application of the cap will be further described in detail using the cap shown in FIG. 1.

For example, the cap 10 provided can be used together with any conventional containers without any particular limitation as long as the cap 10 and the container 20 can be assembled together. For example, the shape of the cap 10 is not particularly limited. As shown in FIG. 3, the inner side of the cap is circular. For example, the shape of the container 20 is also not particularly limited as well. As shown in FIG. 3, the opening 210 of the container is a circular opening. For example, the container 20 is a round bottle or a round can. As shown in FIG. 3, the container 20 is a bottle with a circular opening.

The main body 1 of the cap 10 can control the opening and closing of the opening 210 of the container. As shown in FIG. 3, the inner side of the main body 1 has thread 110. Through a complementary thread structure 2100 at the outer side of the opening 210 of the container, the main body 1 can be screwed opened (in anti-clockwise direction) and screwed closed (not shown) (in clockwise direction) on the opening 210 of the container by rotation. For example, when the main body 1 of the cap 10 provided is screwed closed on the opening 210 of the container, the closed end 1' of the main body 1 will abut against the opening 210 of the container. Meanwhile, the opened end 1" of the main body 1 will face toward the opening 210 of the container and cover and fit on the opening 210 of the container. Consequently, the opening 210 of the container is in a closed state with the container 20 remaining sealed.

For example, the outer side of the main body 1 of the cap 10 provided can have a knurled portion 120. When the container 20 is to be opened, the knurled portion 120 can facilitate applying a force to rotate and separate the main body 1 and the ring member 2. For example, depending on the actual needs, the first incision line 3 disposed between the main body 1 and the ring member 2 of the cap 10 provided can have a plurality of connecting pins 31 to connect the main body 1 and the ring member 2. The shape, size, quantity and spacing of the plurality of connecting pins 31 are not particularly limited. When the size and quantity of the plurality of connecting pins 31 of the first incision line 3 are smaller and the spacing of the plurality of connecting pins 31 is larger, the force needed to break the plurality of connecting pins 31 is smaller. On the contrary, when the size and quantity of the plurality of connecting pins 31 of the first incision line 3 are larger and the spacing of the plurality of connecting pins 31 is smaller, the force needed to break the plurality of connecting pins 31 is larger. In the present example, the size and quantity of the plurality of connecting pins 31 of the first incision line 3 are smaller and the spacing of the plurality of connecting pins 31 is larger. In addition, the plurality of second incision lines 4 do not possess a plurality of connecting pins 31. Therefore, the force needed to break the plurality of connecting pins 31 is smaller. Subsequently, users can separate the main body 1 and the ring member 2 more easily; that is, the cap 10 can be opened from the opening 210 of the container more easily.

For example, when the main body 1 of the cap 10 has been screwed opened from the opening 210 of the container, the plurality of connecting portions 5 will connect the main body 1 and the ring member 2 together. Since the ring member 2 is fitted below a bulge portion 2200 of the opening 210 of the container; thus, the ring member 2 will not detach from the opening 210 of the container. As a result, the connection between the main body 1 separated from the opening 210 of the container with the ring member 2 will allow the main body 1 to still remain in a connected state with the container 20. Moreover, the plurality of connecting portions 5 can also allow the main body 1 to remain in an opened state. The plurality of connecting portions 5 will prevent the main body 1 from interfering the opening 210 of the container. The plurality of connecting portions 5 will also decrease the free movement of the main body 1. As a result, when emptying the contents from the container 20, the plurality of connecting portions 5 can prevent the main body 1 from touching other objects due to its free movement. For example, when the container 20 is a water bottle, when users are drinking from the water bottle, the plurality of connecting portions 5 will prevent the main body 1 from touching the faces and any body parts of the users. In addition, the plurality of connecting portions 5 can also prevent the residual contents at the inner side of the main body 1 to spill out easily by decreasing the free movement of the main body 1. And since the ring member 2 fitted on the opening 210 of the container can freely rotate; hence, the plurality of connecting portions 5 will not be pulled off easily.

For example, the cap provided can be made by using any materials known in the art, wherein the material for the cap is, for example, plastic. The cap can be manufactured by any processes known in the art. For example, the manufacturing process of the cap is by injection molding. The first incision line and the plurality of second incision lines can be formed by any known methods. In all the above-mentioned examples, the first incision line and the plurality of second incision lines are formed by rotary cutting and the incisions are done by cutting tools or laser cutting.

Figure 4:
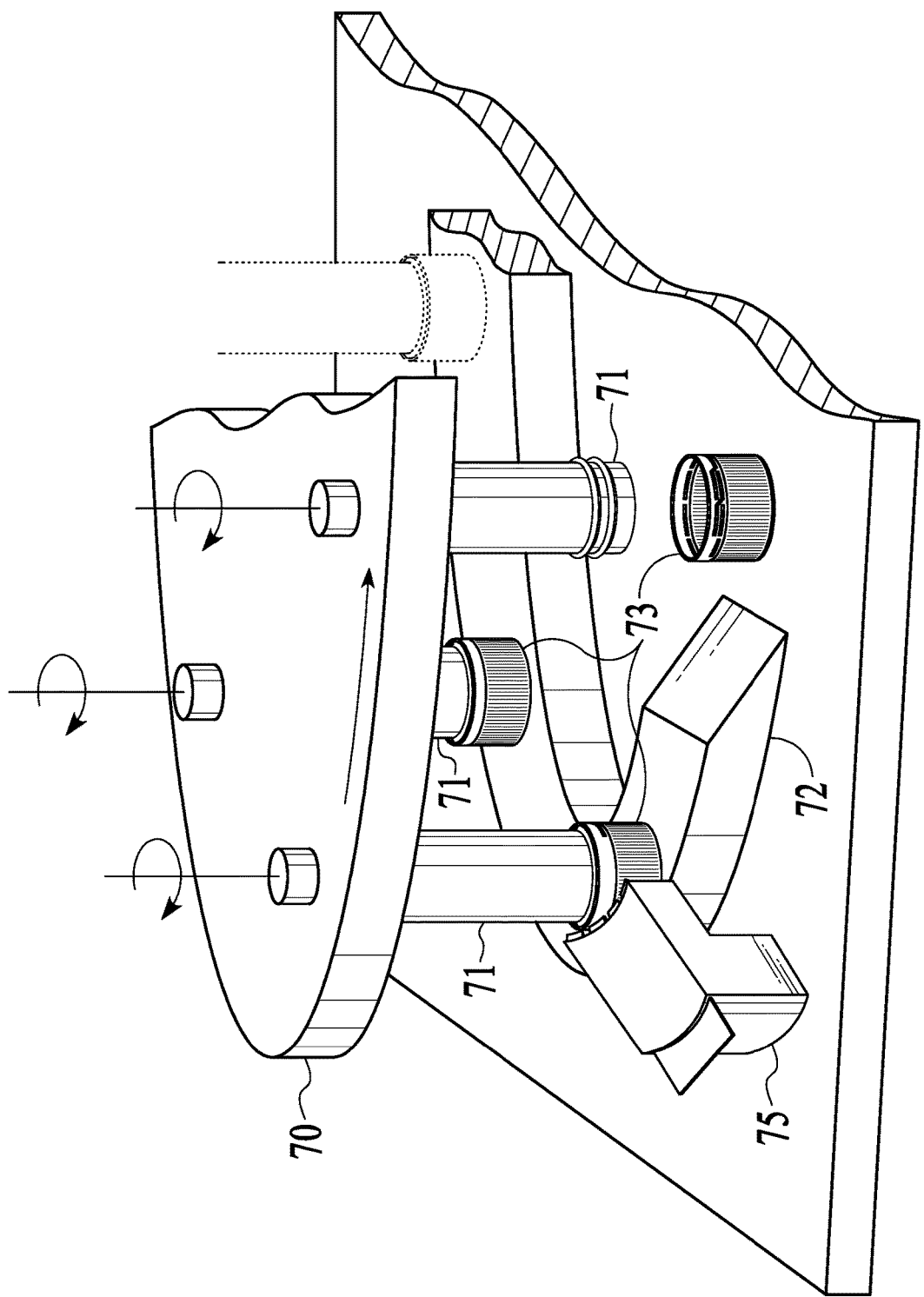
FIG. 4 shows part of a manufacturing system used to engrave incision lines within a cap in accordance with an implementation.
Figure 5:
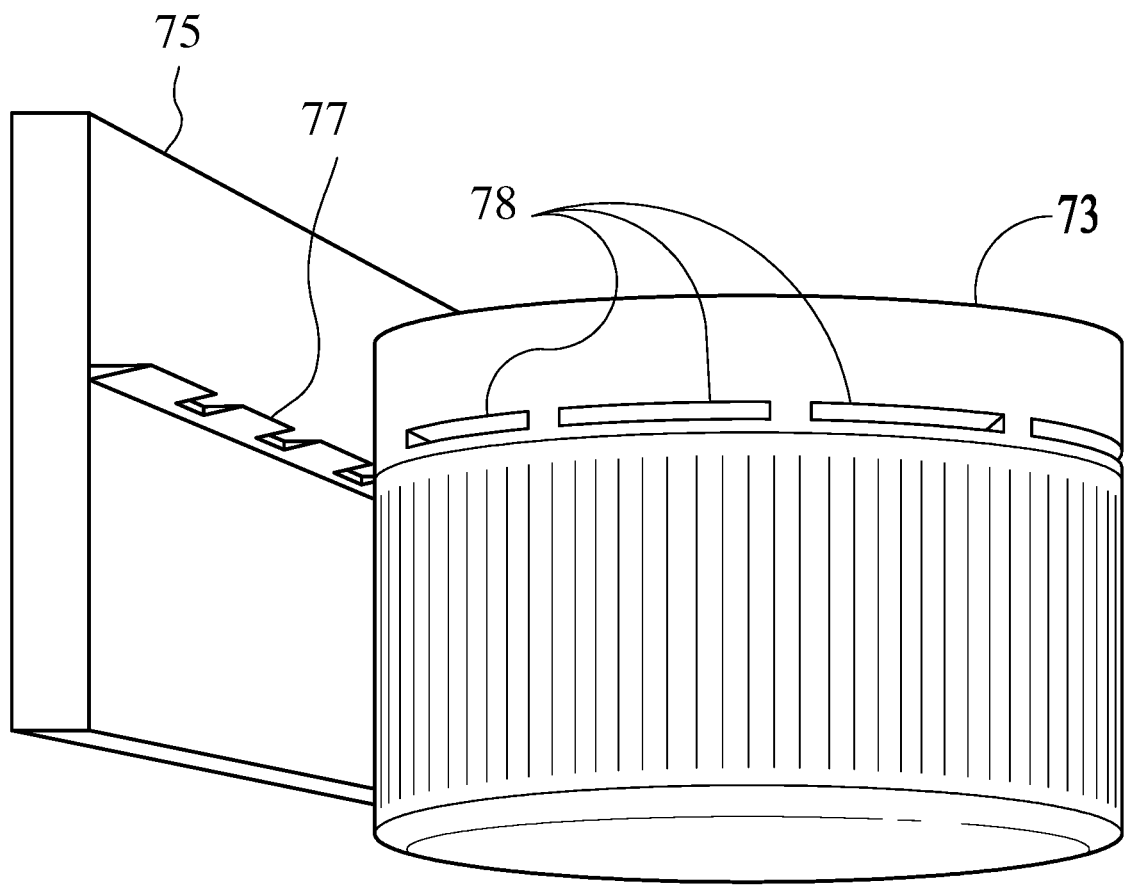
FIG. 5 illustrates incision lines engraved within a cap in accordance with an implementation.

FIG. 4 shows part of a manufacturing system 70 used to engrave incision lines within caps 73. Caps 73 are mounted on spindles 71 and supported by bases 72. Caps 73 are rotated as they pass a blade support structure 75 that holds blade 77, as illustrated by FIG. 5. The rotation of caps 73 against blade 77 result in incision lines 78 engraved within caps 73.

Figure 6:
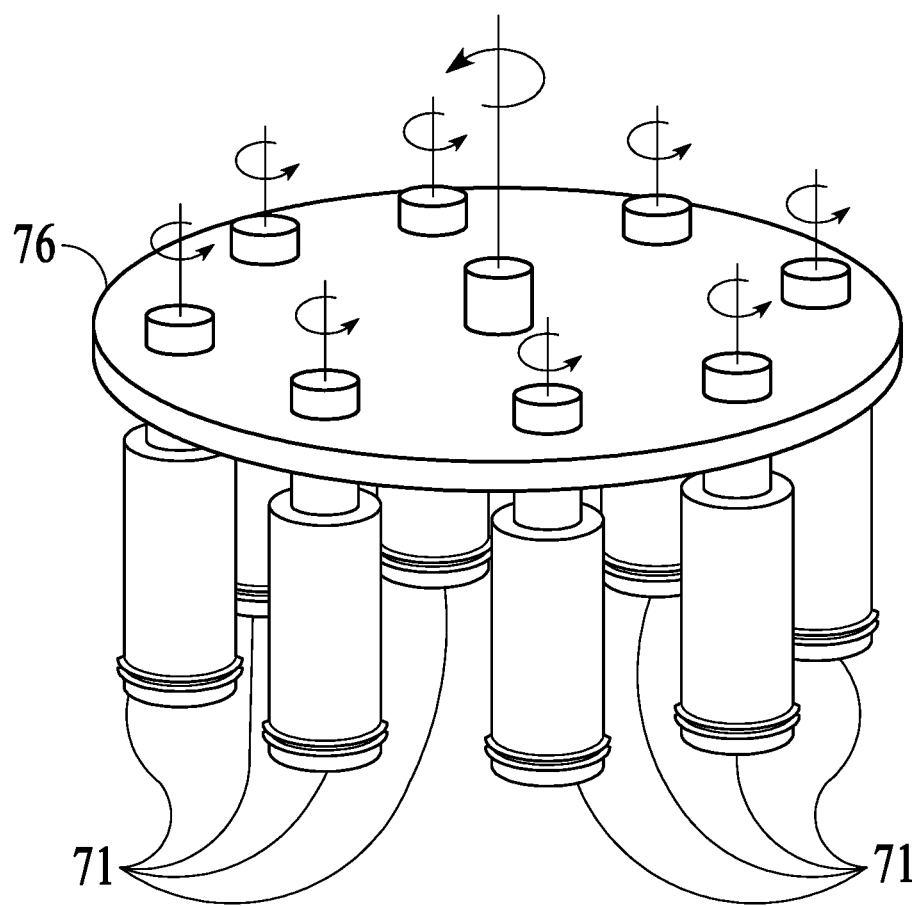
FIG. 6 shows spindles of a manufacturing system used to engrave incision lines within a cap in accordance with an implementation.

FIG. 6 shows spindles 71 mounted on a spindle support 76.

Figure 7:
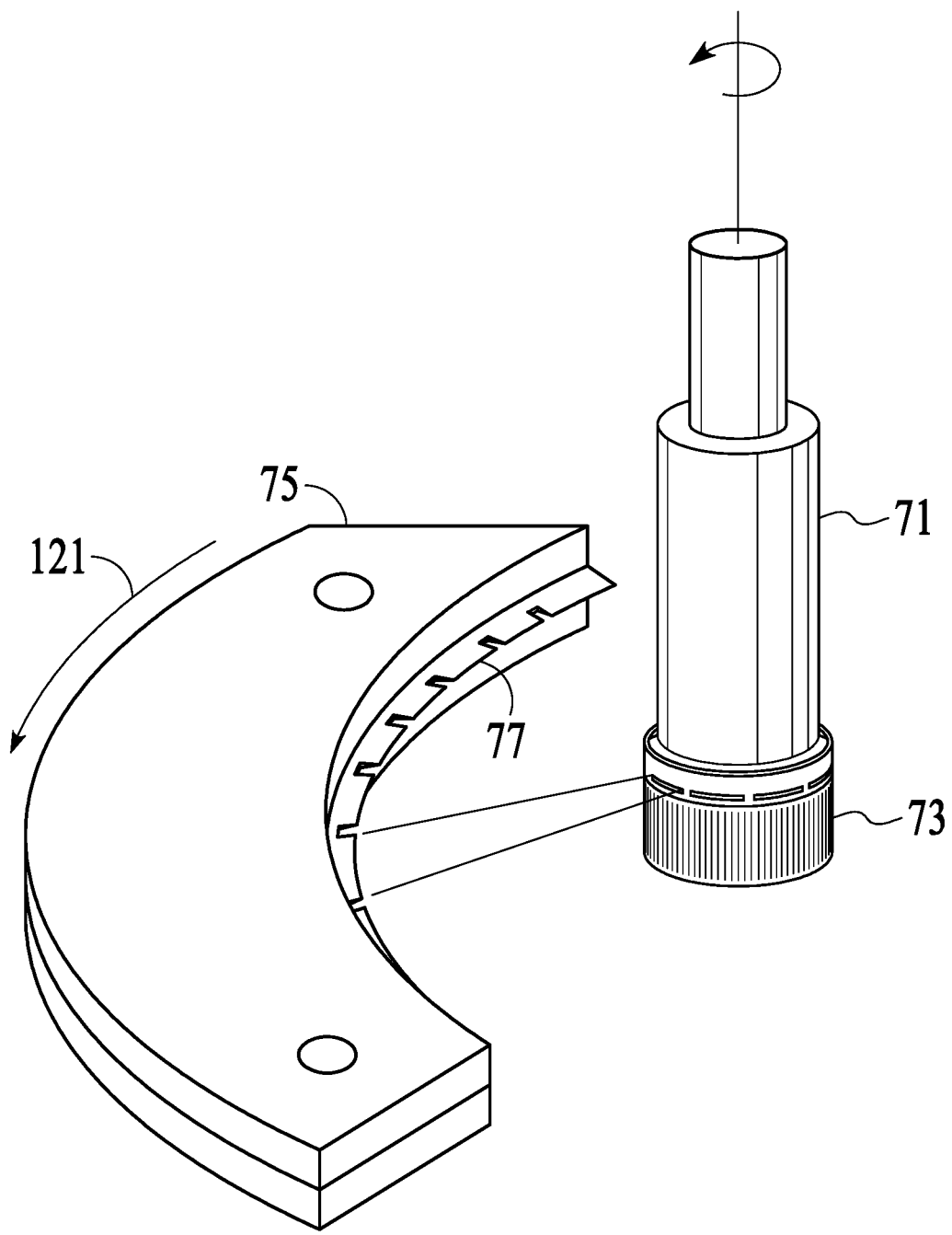
FIG. 7 shows blades used to engrave incision lines within a cap in accordance with an implementation.

FIG. 7 shows a path 121 that caps 73 travels along blade 77 in order to produce incision lines in caps 73.

FIG. 8, FIG. 9, FIG. 10, FIG. 11 and FIG. 12 show blade patterns for blades used to engrave incision lines within caps.

Figure 8:
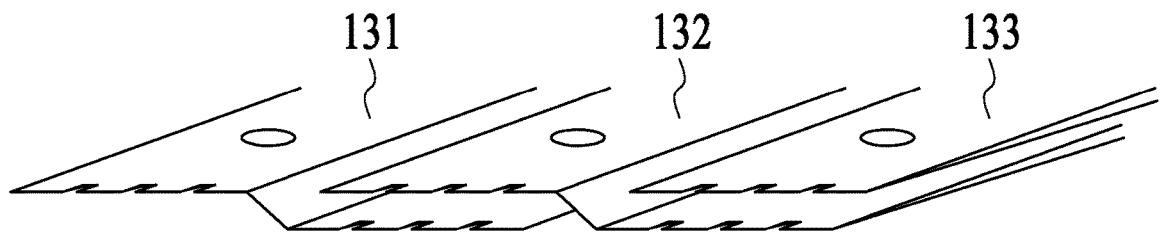
FIG. 8, FIG. 9, FIG. 10, FIG. 11 and FIG. 12 show blade patterns for blades used to engrave incision lines within a cap in accordance with implementations.

FIG. 8 shows a blade pattern 130 that uses a blade 131, a blade 132 and a blade 133 to produce incision lines in caps 73 that will result in connecting portions of each cap attaching the cap to a ring section. Blade 131 includes a first knife and a second knife located on a different plane than the first knife. A third knife forms a diagonal connection between the first knife and the second knife. Likewise, blade 132 includes a first knife and a second knife located on a different plane than the first knife. The first knife is located on a same plane as the first knife 131. The second knife is located on a same plane as the second knife 131. A third knife forms a diagonal connection between the first knife and the second knife. Blade 133 is located on the same plane as the first knife of blade 131. When the cap is mounted on a container, the connection portions assure the cap, through attachment to the ring, remains attached to the container even after the cap is removed the container opening, as described above. Notches in blade 131, blade 132 and blade 133 form bridge connection portions between the cap and the ring section. The bridge connection portions are broken when the cap is mounted on a container and the container is opened by unscrewing the cap.

Figure 9:
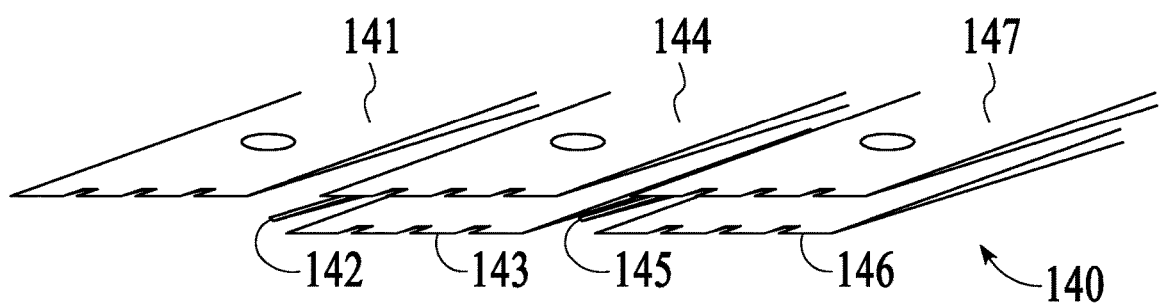

FIG. 9 shows a blade pattern 140 that uses a blade 141, a blade 142, blade 143, a blade 144, a blade 145, a blade 146 and a blade 147 to produce incision lines in caps 73 that will result in connecting portions of each cap attaching the cap to a ring section. Blades 141, 144 and 147 are all located on a first plane. Blades 143 and 146 are both located on a second plane. Blades 142 and 145 are both located on a third plane between the first plane and the second plane. Blades 142 and 145 make smaller incisions that the other blades in the plurality of blades. Blade 142 and blade 145 are in a diagonal orientation between the first plane and the second plane. Alternatively, blade 142 and a blade 145 can be in a horizontal or a vertical orientation while located between the first plane and the second plane.

When a cap is mounted on a container, the connection portions assure the cap, through attachment to the ring, remains attached to the container even after the cap is removed the container opening, as described above. Notches in blade 141, blade 143, blade 146 and blade 147 form bridge connection portions between the cap and the ring section. The bridge connection portions are broken when the cap is mounted on a container and the container is opened by unscrewing the cap.

Figure 10:
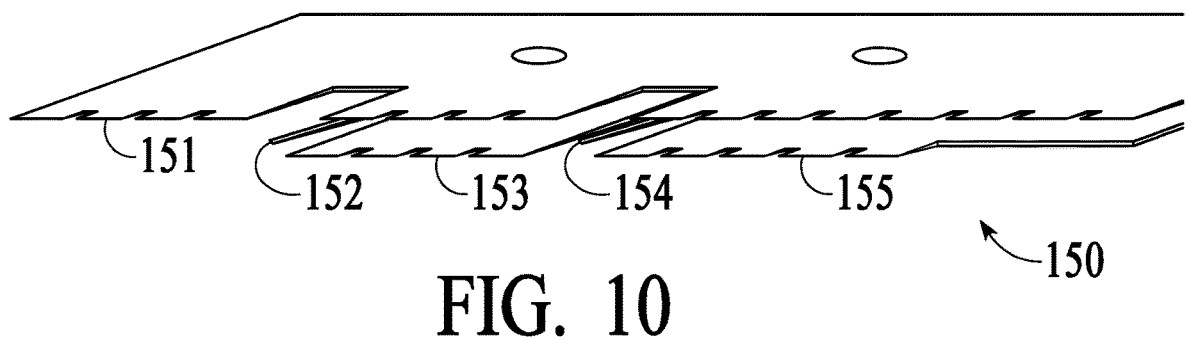

FIG. 10 shows a blade pattern 150 that uses a blade 151, a blade 152, blade 153, a blade 154 and a blade 155 to produce incision lines in caps 73 that will result in connecting portions of each cap attaching the cap to a ring section. Blade 151 is located on a first plane and has a first gap and a second gap. Blade 153 and blade 155 are both located on a second plane. Blade 152 and blade 154 are both located on a third plane between the first plane and the second plane. Blade 152 is located near the first gap and blade 154 is located near the second gap. Blades 152 and 154 make smaller incisions that the other blades in this configuration. Blade 152 and blade 154 are in a diagonal orientation between the first plane and the second plane. Alternatively, blade 152 and a blade 154 can be in a horizontal or a vertical orientation while located between the first plane and the second plane. When the cap is mounted on a container, the connection portions assure the cap, through attachment to the ring, remains attached to the container even after the cap is removed the container opening, as described above. Notches in blade 151, blade 153 and blade 155 form bridge connection portions between the cap and the ring section. The bridge connection portions are broken when the cap is mounted on a container and the container is opened by unscrewing the cap.

Figure 11:
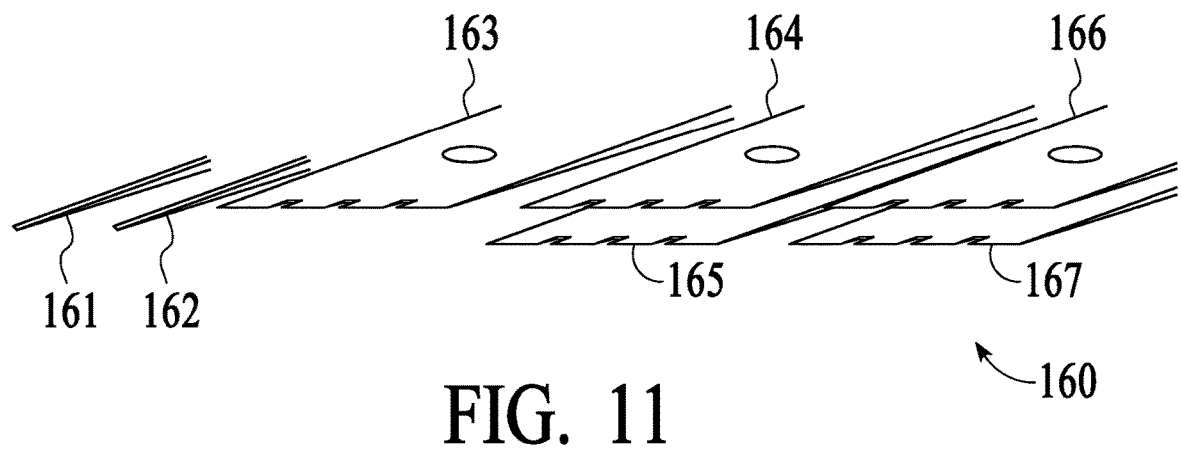

FIG. 11 shows a blade pattern 160 that uses a blade 161, a blade 62, blade 163, a blade 164, a blade 165, a blade 166 and a blade 167 to produce incision lines in caps 73 that will result in connecting portions of each cap attaching the cap to a ring section. Blades 163, 164 and 146 are all located on a first plane. Blades 165 and 167 are both located on a second plane. Blades 161 and 162 are both located on a third plane between the first plane and the second plane. Blades 161 and 162 make smaller incisions that the other blades in the plurality of blades. Blade 161 and blade 162 are in a diagonal orientation between the first plane and the second plane. Alternatively, blade 161 and a blade 162 can be in a horizontal or a vertical orientation while located between the first plane and the second plane. When the cap is mounted on a container, the connection portions assure the cap, through attachment to the ring, remains attached to the container even after the cap is removed the container opening, as described above. Notches in blade 163, blade 164, blade 165, blade 166 and blade 167 form bridge connection portions between the cap and the ring section. The bridge connection portions are broken when the cap is mounted on a container and the container is opened by unscrewing the cap.

Figure 12:
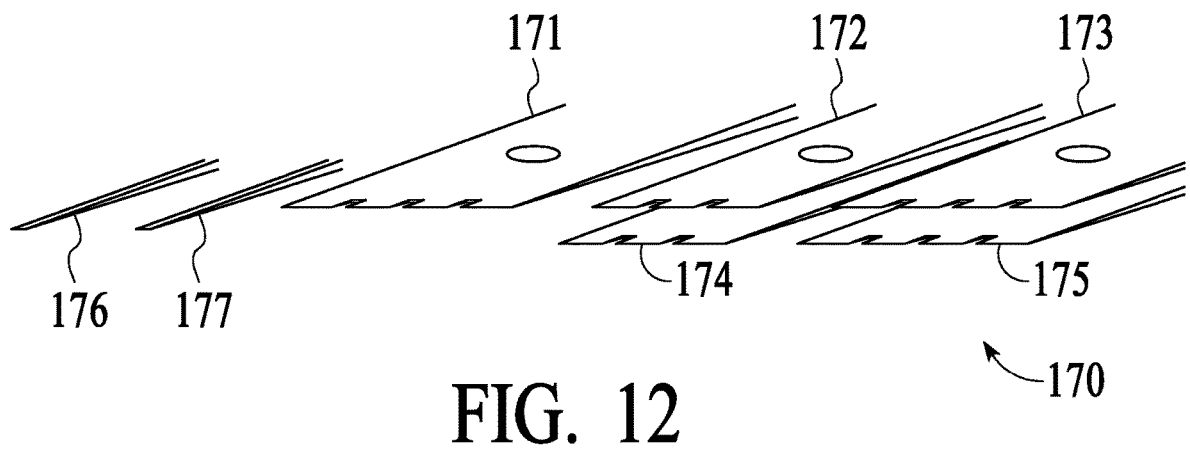

FIG. 12 shows a blade pattern 170 that uses a blade 171, a blade 172 and a blade 173 in a first plane. A blade 174 and a blade 175 are located in a second plane. A blade 176 and a blade 177 are in a horizontal orientation between the first plane and the second plane. Alternatively, blade 176 and a blade 177 can be in a diagonal or a vertical orientation while located between the first plane and the second plane. When the cap is mounted on a container, the connection portions assure the cap, through attachment to the ring, remains attached to the container even after the cap is removed the container opening, as described above. Notches in blade 163, blade 164, blade 165, blade 166 and blade 167 form bridge connection portions between the cap and the ring section. The bridge connection portions are broken when the cap is mounted on a container and the container is opened by unscrewing the cap.

Figure 13:
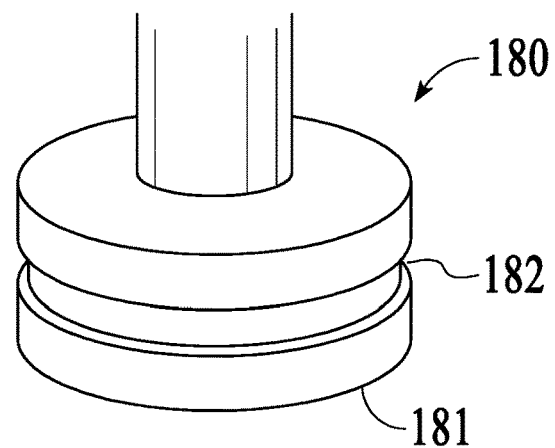
FIG. 13, FIG. 14, FIG. 15 and FIG. 16 illustrate grooves placed within a spindle to aid in engraving incision lines in accordance with implementations.

The spindles can include grooves that mirror location of blades in order to aid in engraving incision lines in the caps. For example, FIG. 13 shows a spindle 180 with a spindle head 181 that includes a groove 182 that is wide enough to accommodate all blades edges of a blade or a blade pattern.

Figure 14:
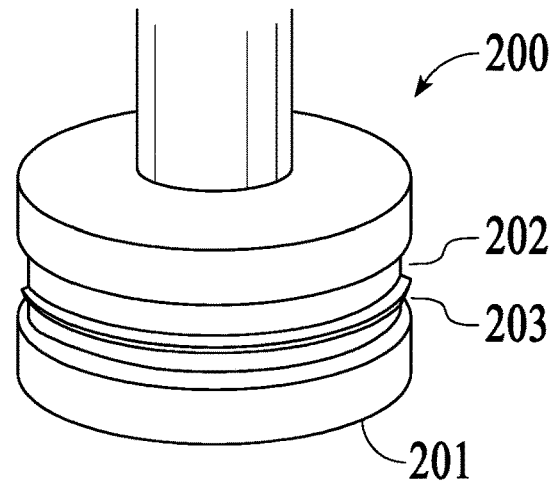

FIG. 14 shows a spindle 200 with a spindle head 201 that includes a groove 202 and a groove 203 that each are wide enough to accommodate one blade edge from a blade or blade composite of a blade pattern. In the implementation shown in FIG. 14, each "horizontal" blade edge has its own matching groove, where there are no grooves for vertical or diagonal blades or blade portions.

Figure 15:
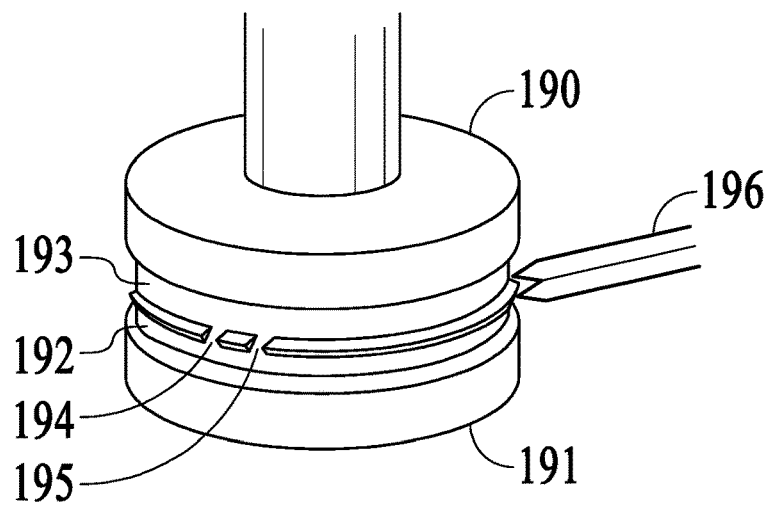

FIG. 15 shows a spindle 190 with a spindle head 191 that includes a groove 192, a groove 193, a groove 194 and a groove 195 that each are wide enough to accommodate one blade edge from a blade or blade portion as represented by blade edges of blade 196. In the implementation shown in FIG. 15, each "horizontal" blade has its own matching groove and each vertical or diagonal blade or blade portion has its own matching groove.

Figure 16:
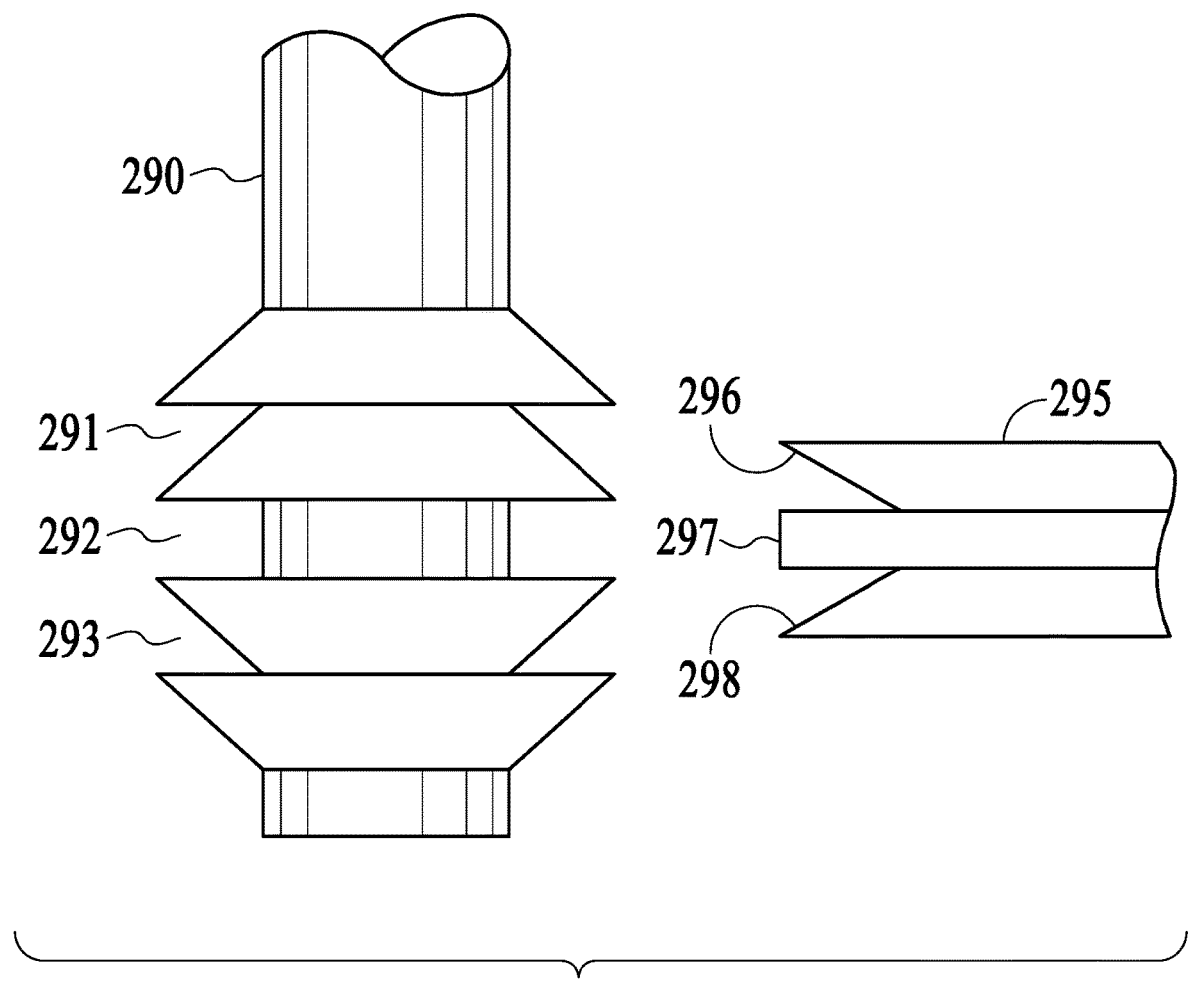
Figure 17:
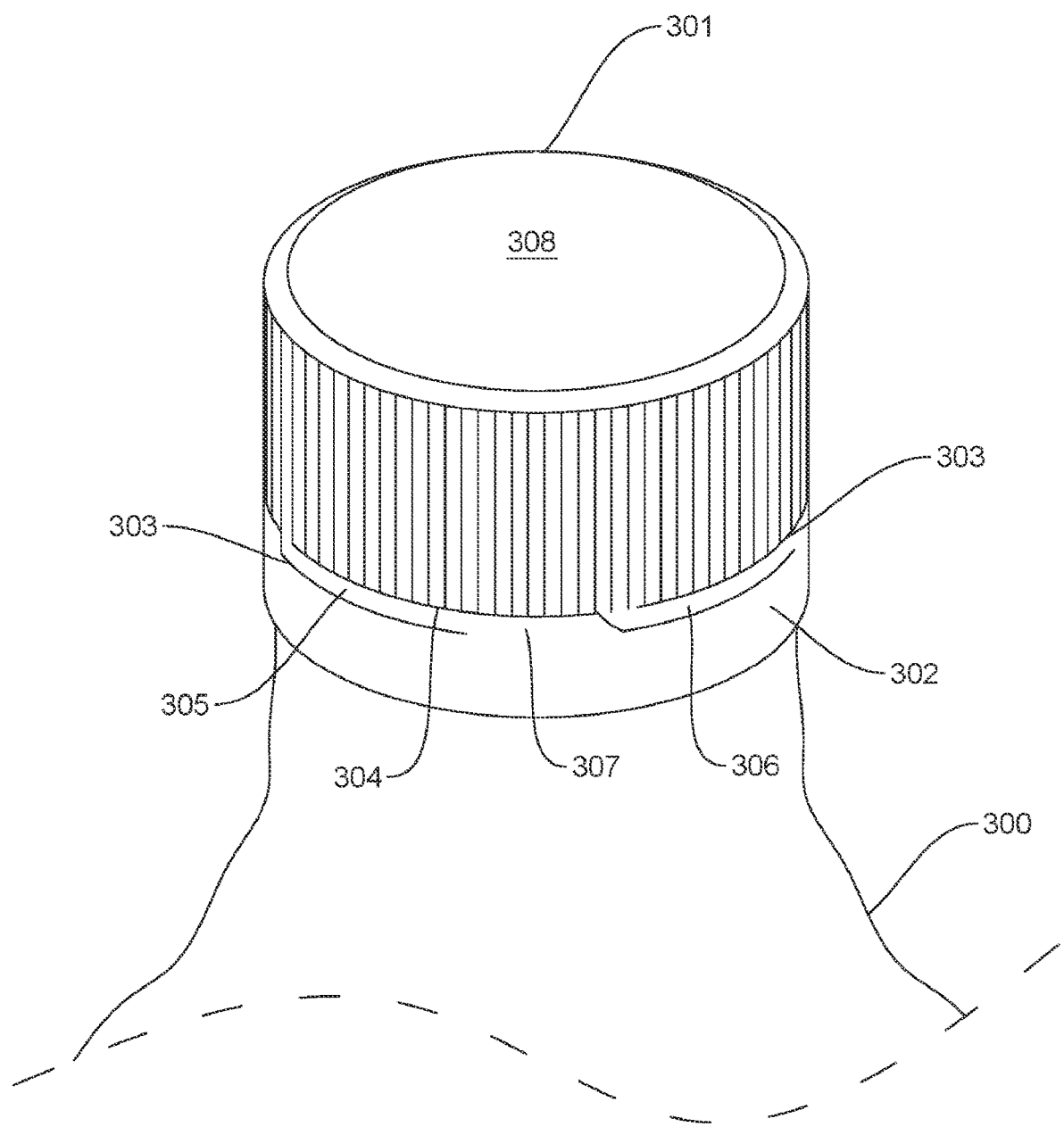
FIG. 17, FIG. 18, FIG. 19, FIG. 20, FIG. 21, FIG. 22 and FIG. 23 illustrate a cap that after being removed from a container, may be held against the container in a flipped position in accordance with implementations.

FIG. 16 shows a spindle 290 with a spindle head 294 that includes a groove 291, a groove 292 and a groove 293 that each are wide enough to accommodate one blade or one blade portion from a blade pattern. For example, blade combination 295 has a blade edge 296, a blade edge 297 and a blade edge 298. For example, groove 292 is present to allow for diagonal blades such as diagonal blades 152 and 154 shown in FIG. 10.

FIG. 17, FIG. 18, FIG. 19, FIG. 20, FIG. 21, FIG. 22 and FIG. 23 illustrate a cap 301 that after being removed from a container 300, may be held against container 300 in a flipped position. Specifically, in FIG. 17, a cap 301 is shown secured on a container 300. A first incision 303 and a second incision 304 form a connection portion 305 and a connection portion 306 between cap 301 and a ring member 302. In the embodiment shown in FIG. 17, a region 307 exists between a location where connection portion 305 is connected to ring member 302 and where connection portion 306 is connected to cap 301. A height of cap 301 and a diameter of cap 301 affect a length of region 307 and whether region 307 even exists, as dimensions of region 307, first incision 303 and second incision 304 are all dependent on sizing connection portion 305 and sizing connection portion 306 so that when cap 301 is removed from container 300, cap 301 may be held in a flipped position against container 300 by connection portion 305 and connection portion 306.

In the flipped position, a top surface 308 of cap 301 is held in a position where top surface 308 faces container 300. The length of connection portion 305 and the length of connection portion 306 are selected so that the elasticity of connection portion 305 and the elasticity of connection portion 306 allows cap 301 to be moved by a user into the flipped position against container 300 by stretching connection portion 305 and connection portion 306 and then the elasticity of connection portion 305 and the elasticity of connection portion 306 holds cap 301 in the flipped position against container 300 while a user drinks from the container.

When the user is temporarily done drinking from container 300, the elasticity of connection portion 305 and the elasticity of connection portion 306 allow cap 301 to be moved by a user out of the flipped position into an initial open position from which cap 301 can be screwed back onto container 300. For the case where a cap has a flip top design, the cap may be reattached by snapping the cap back onto the container.

Figure 18:
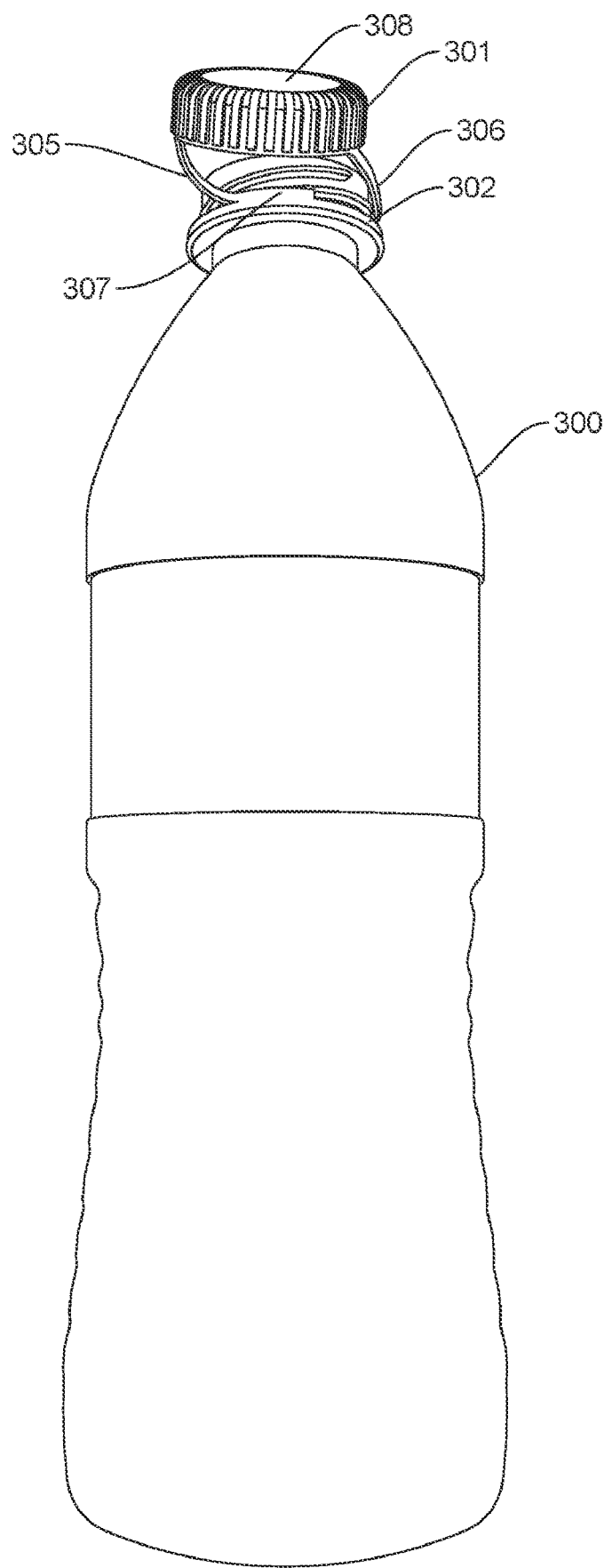

FIG. 18 shows cap 301 after cap 301 has been unscrewed from container 300. Connection portion 305 and connection portion 306 hold cap 301 to ring member 302. Top surface 308 of cap 301 is facing away from container 300.

Figure 19:
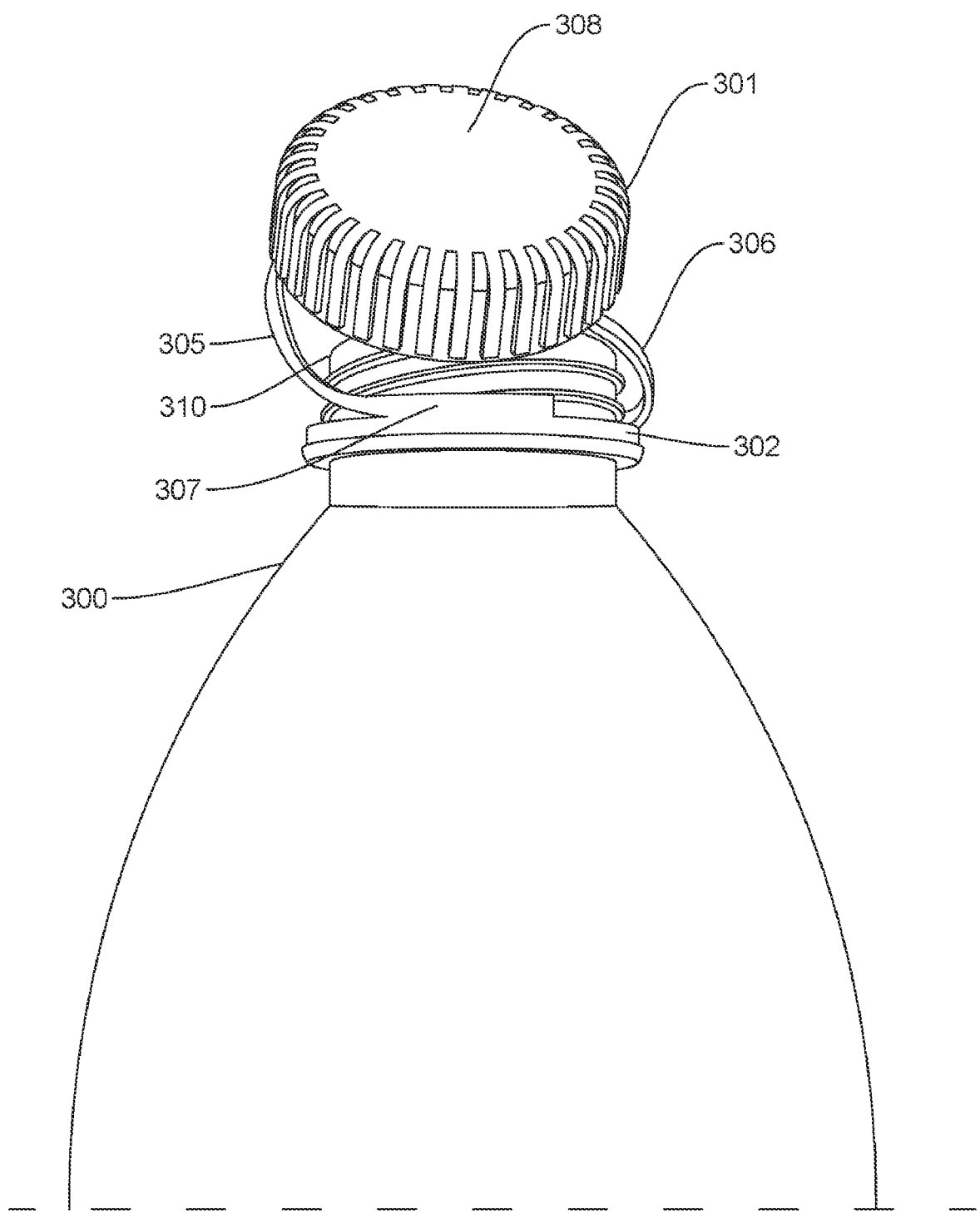

FIG. 19 shows a close up view of cap 301 after cap 301 has been unscrewed from container 300. Upon removal of cap 301 a lip 310 of cap 301 is exposed. Connection portion 305 and connection portion 306 hold cap 301 to ring member 302. Top surface 308 of cap 301 is facing away from container 300.

Figure 20:
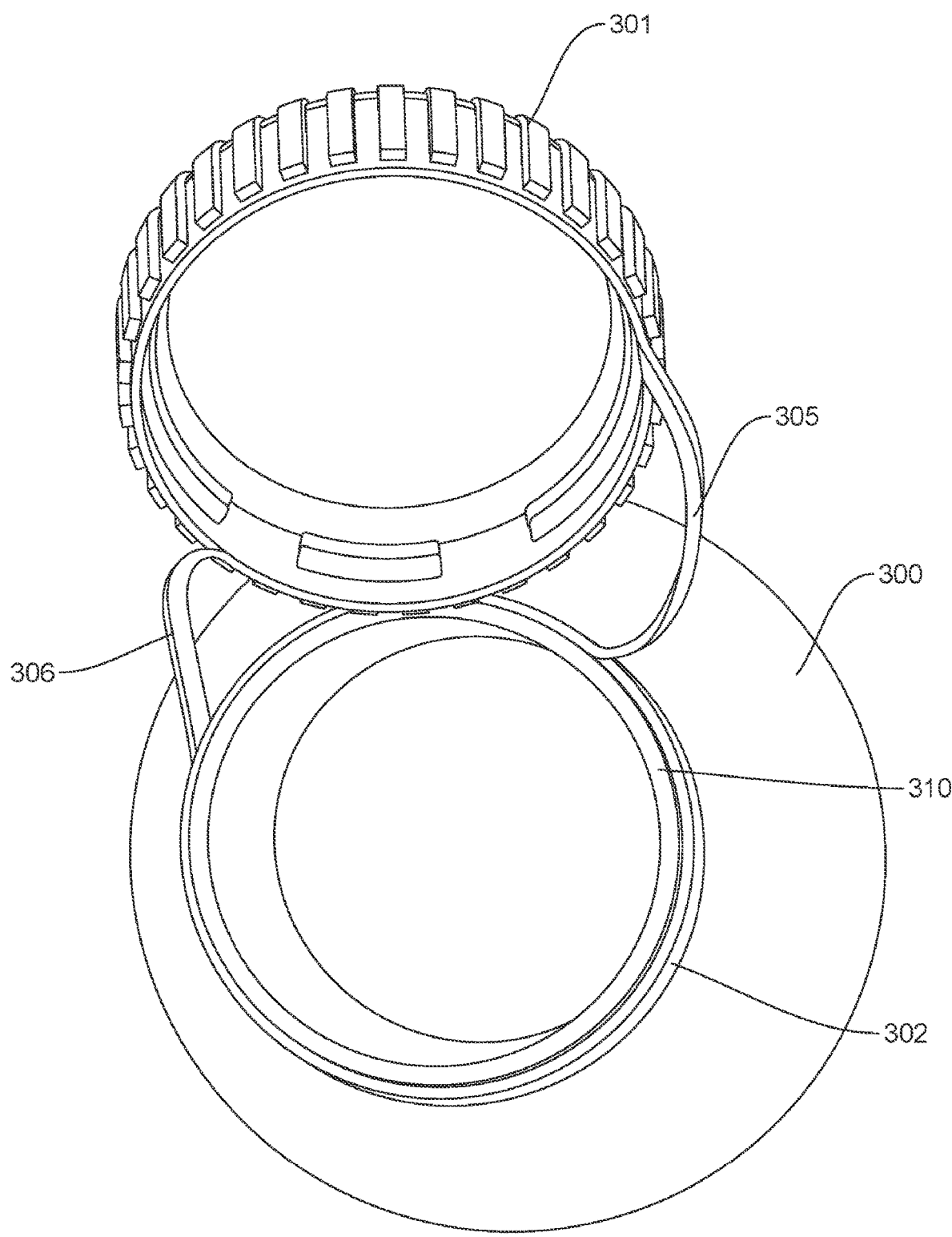

FIG. 20 shows a close up view of cap 301 where cap 301 has been pushed open from container 300. Connection portion 305 and connection portion 306 hold cap 301 to ring member 302. Until sufficient force is applied to cap 301, connection portion 305 and connection portion 306 are not long enough to let cap 301 flip past lip 310 of container 300. Because of the shortness of connection portion 305 and connection portion 306, lip 310 is in the way of cap 301 being placed in a flipped position where top surface 308 faces container 300. Once a user exerts more pressure, connection portion 305 and connection portion 306 stretch sufficiently to let cap 301 flip past lip 310 so that cap 301 is in the flipped position where top surface 308 faces container 300.

Figure 21:
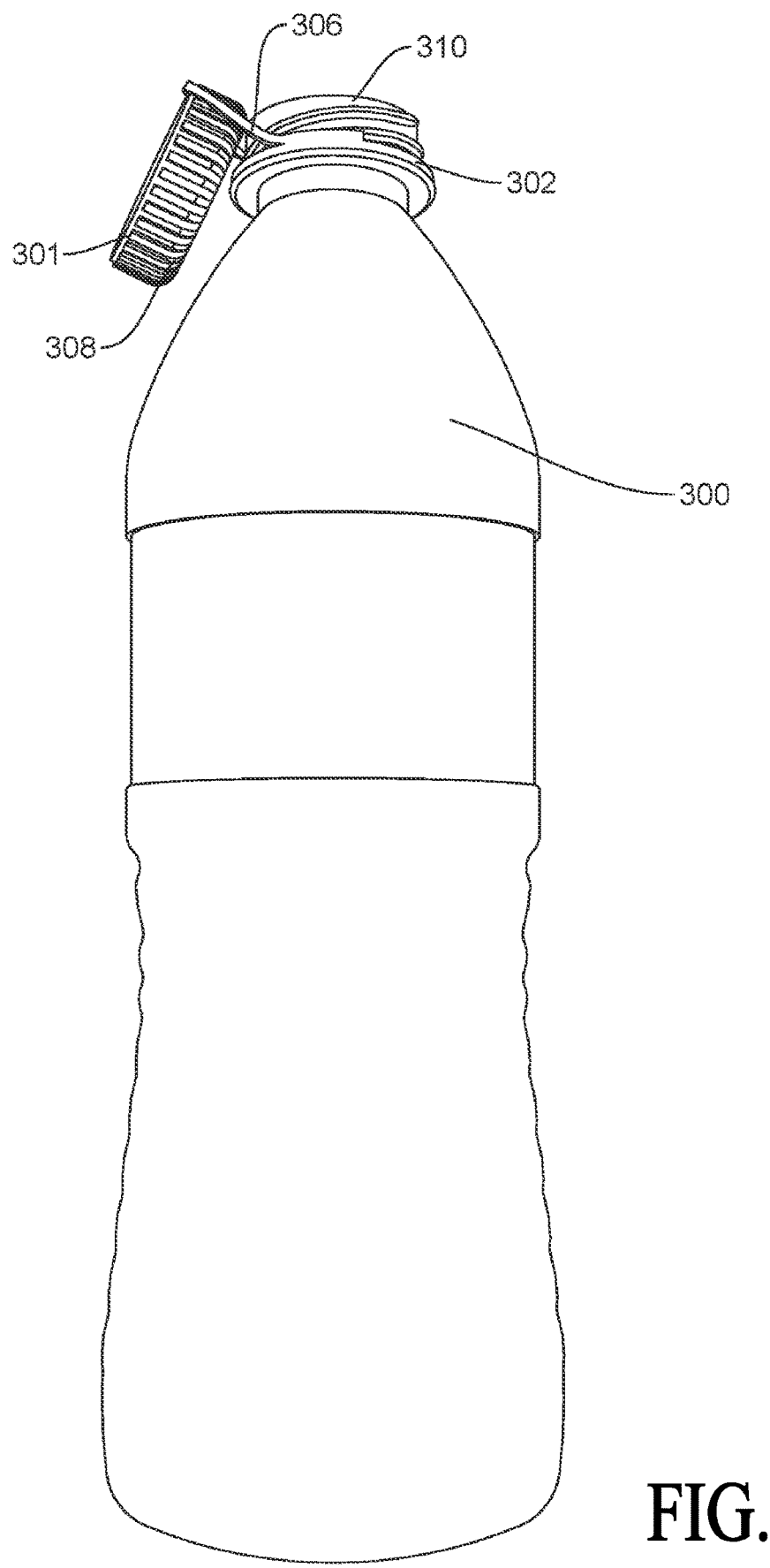
Figure 22:
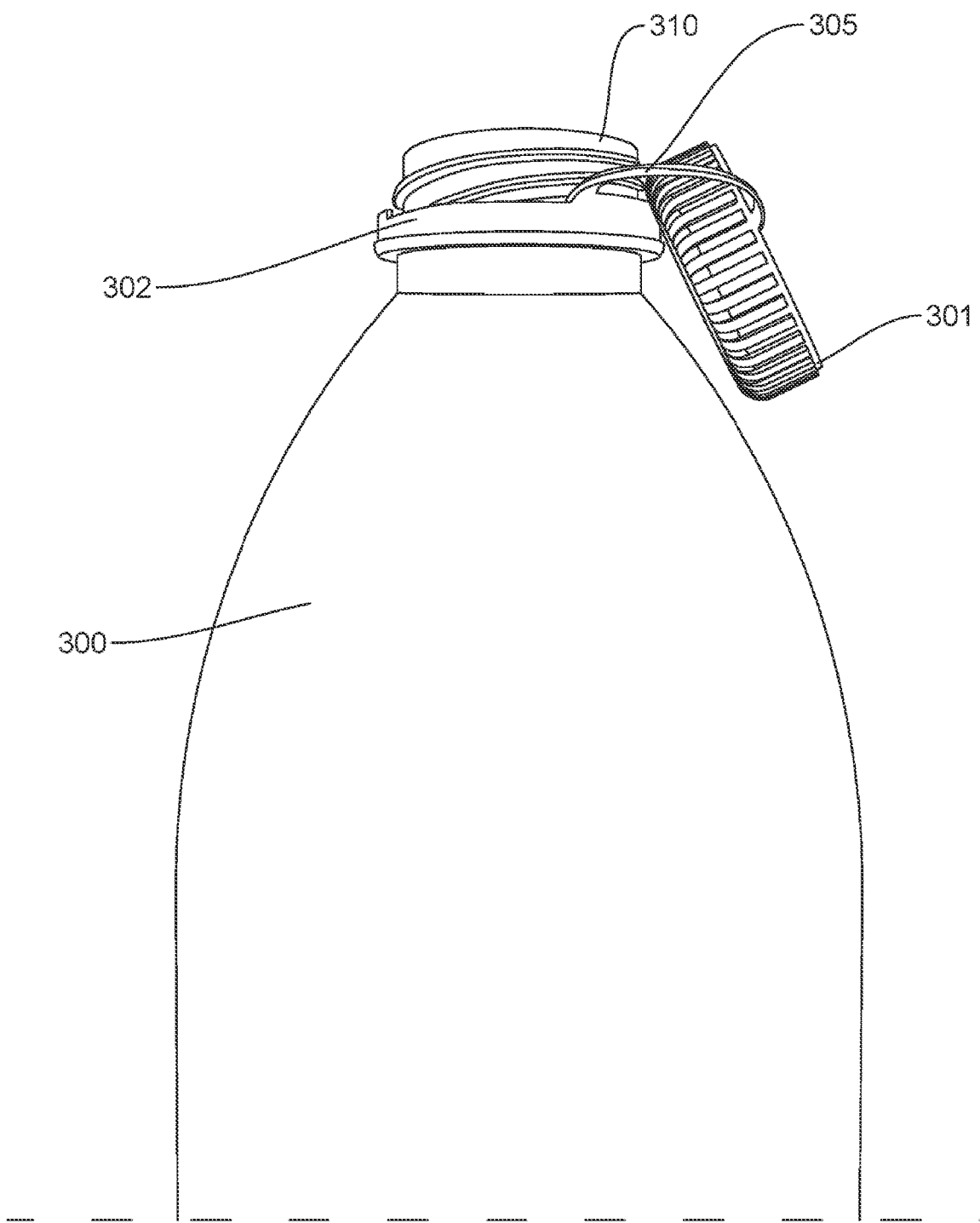

FIG. 21 and FIG. 22 show cap 301 in the flipped position where top surface 308 faces container 300. The elasticity of connection portion 305 and connection portion 306 hold cap 301 in the flipped position where top surface 308 faces container 300.

Figure 23:
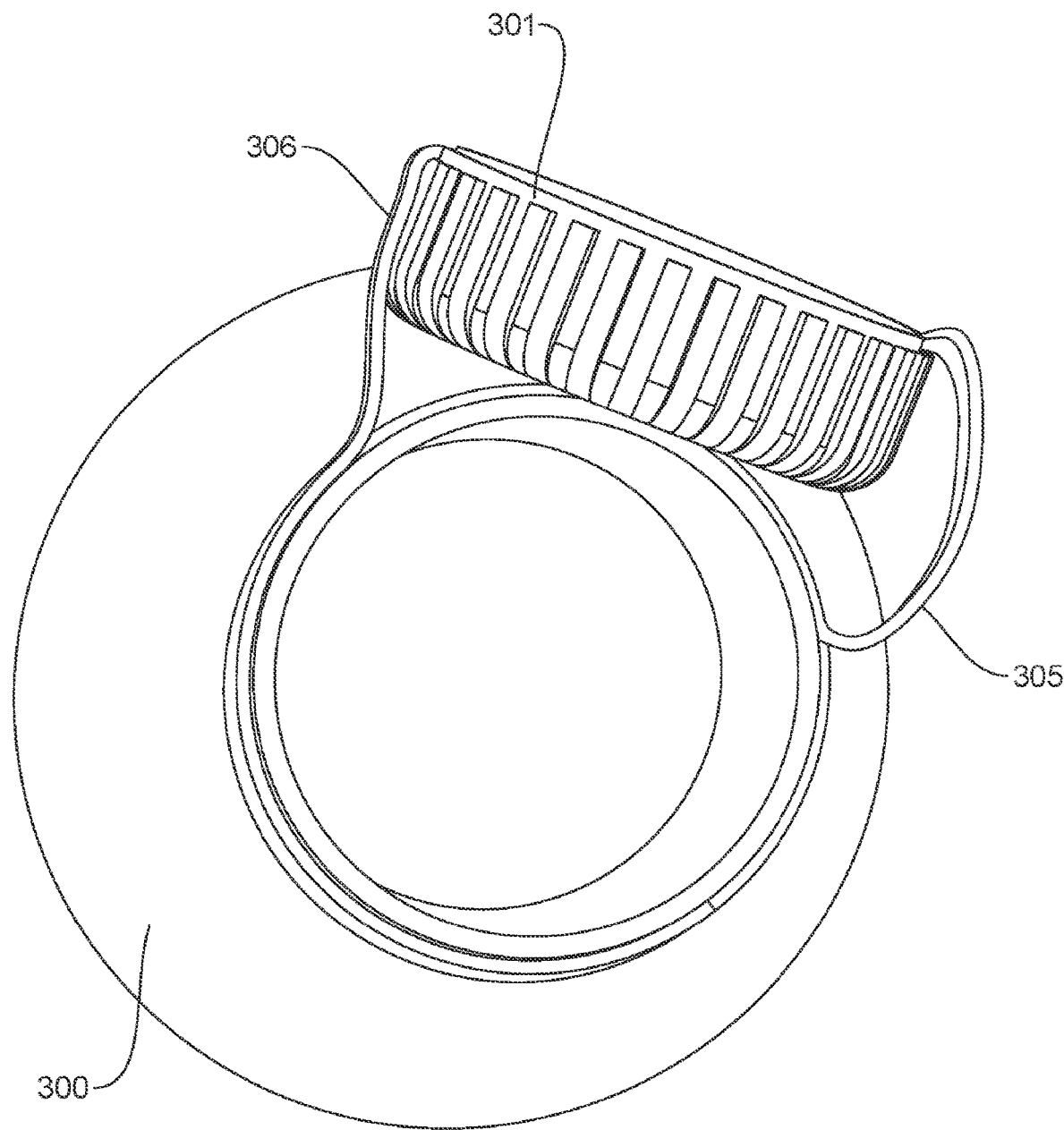

FIG. 23 is a top view illustrating that the elasticity of connection portion 305 and connection portion 306 hold cap 301 in the flipped position where top surface 308 faces container 300.

Figure 24:
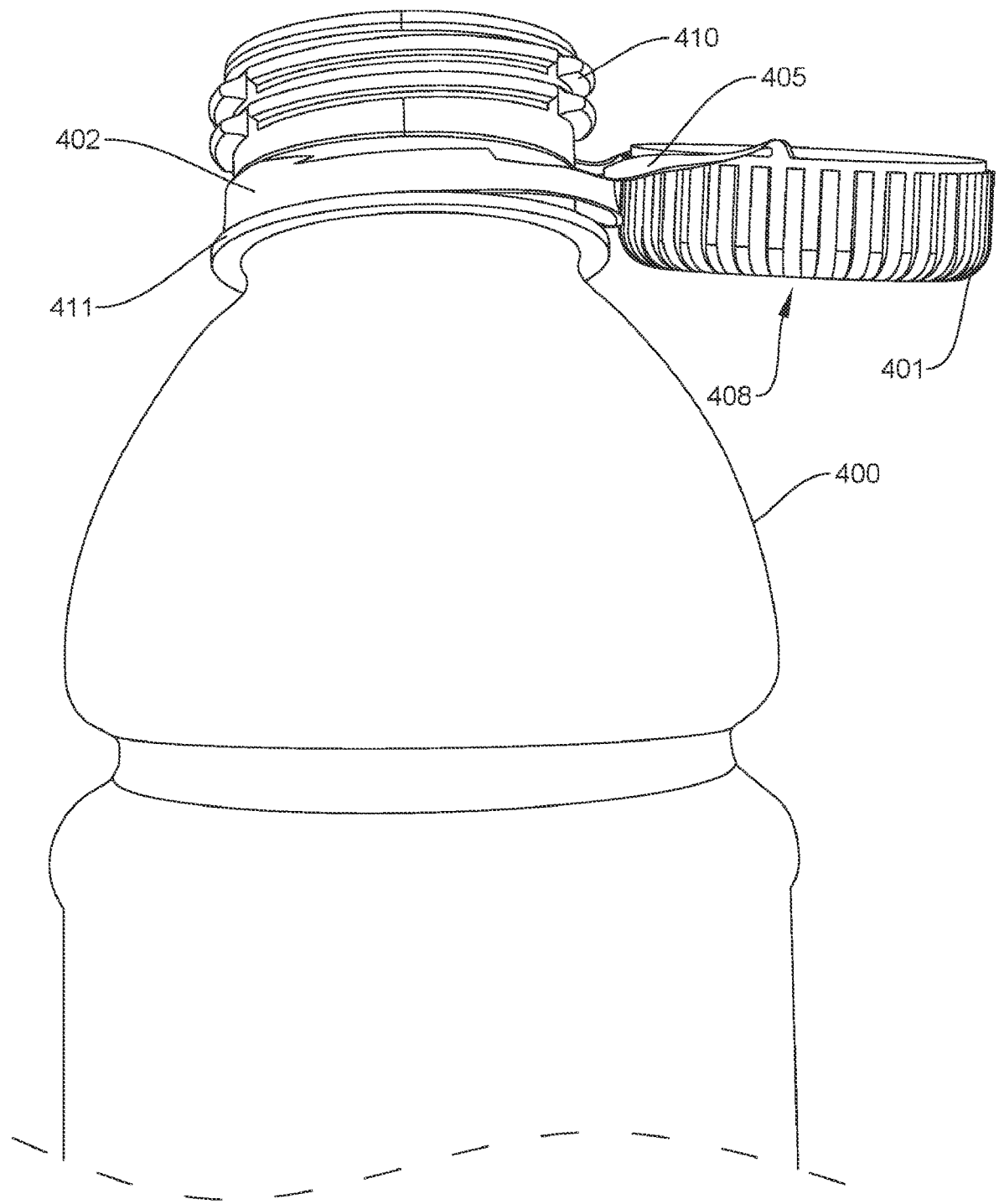
FIG. 24, FIG. 25, FIG. 26 and FIG. 27 illustrate another cap that after being removed from a container, may be held against the container in a flipped position.
Figure 25:
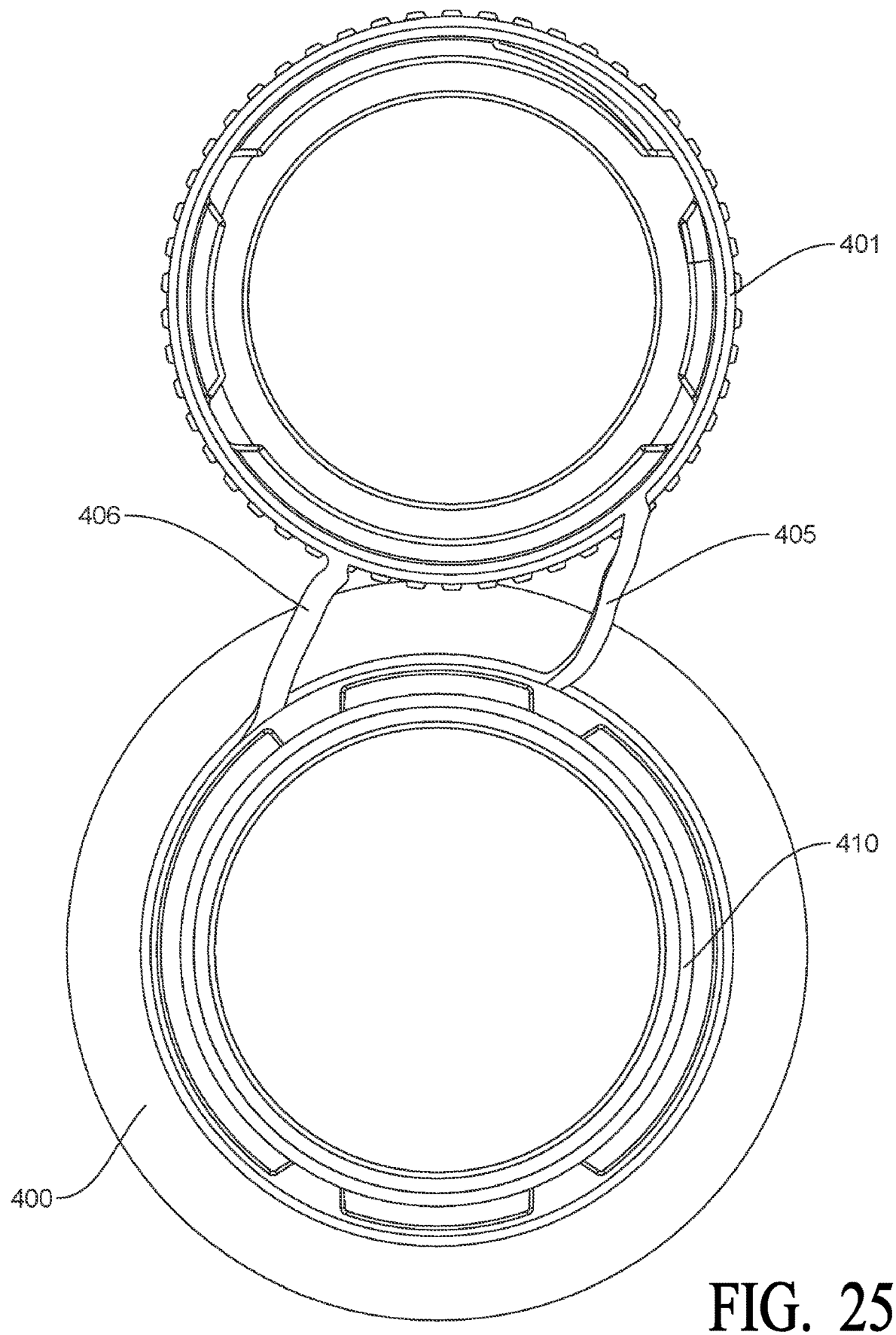

The height and diameter of a cap determine the length of connection portions necessary to allow a cap to be placed and held in a flipped position where the top surface of the cap faces the container. FIG. 24 and FIG. 25 show a container 400 with a cap 401 sized to fit over a lip 410 of container 400.

FIG. 24 and FIG. 25 show cap 401 having been unscrewed and pushed open from container 400. A connection portion 405 and a connection portion 406 hold cap 401 to a ring member 402. Until sufficient force is applied to cap 401, connection portion 405 and connection portion 406 are not long enough to let cap 401 flip past lip 410 of container 400, a ring member 402 and a ridge 411 of container 400. Because of the shortness of connection portion 405 and connection portion 406, lip 410, ring member 402 and ridge 411 are in the way of cap 401 being placed in a flipped position where top surface 408 faces container 400. Once a user exerts more pressure, connection portion 405 and connection portion 406 stretch sufficiently to let cap 401 flip past lip 410, ring member 402 and ridge 411 so that cap 401 is in the flipped position where top surface 408 faces container 400.

Figure 26:
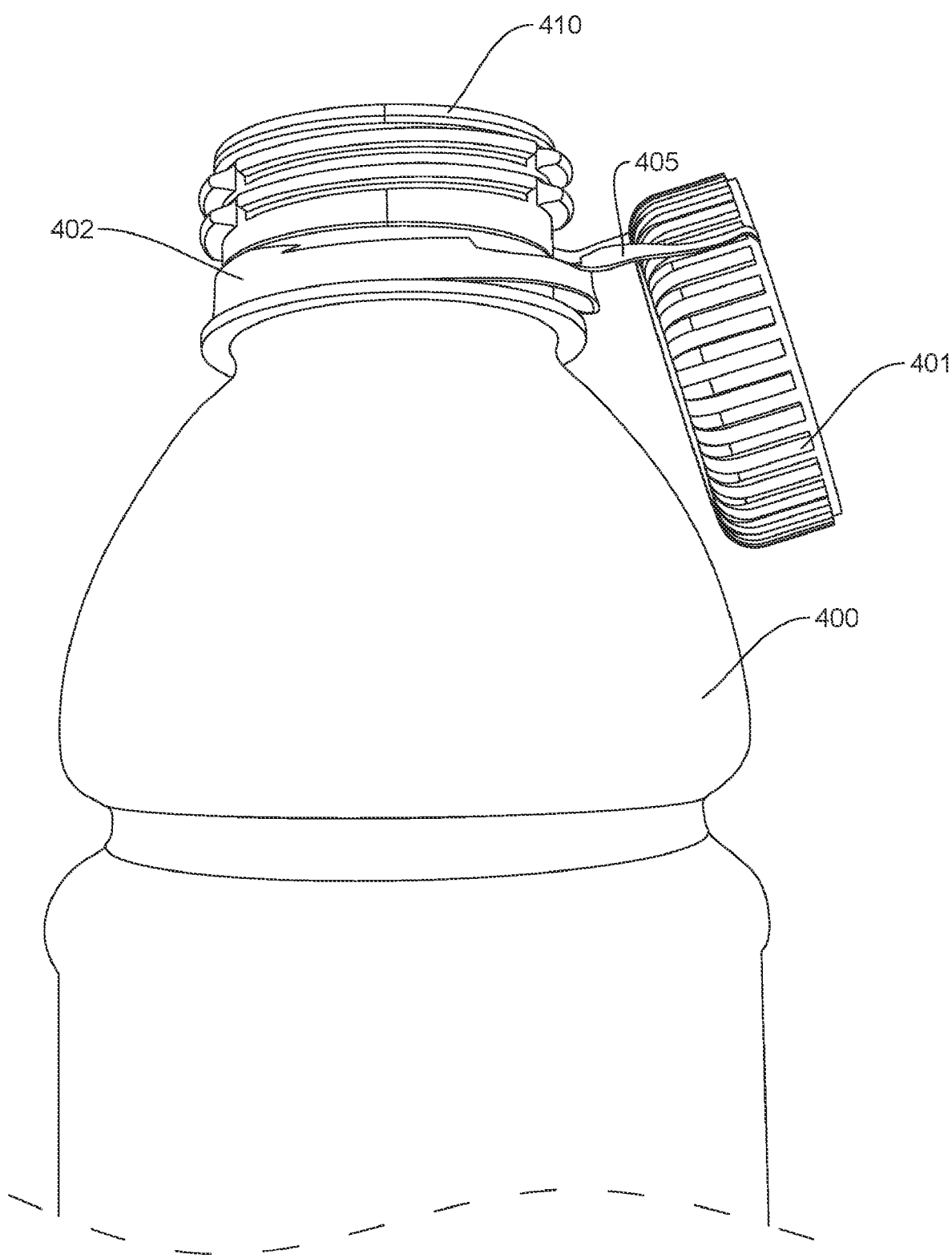

FIG. 26 shows cap 401 in the flipped position where top surface 408 faces container 400. The elasticity of connection portion 405 and connection portion 406 hold cap 401 in the flipped position where top surface 408 faces container 400.

Figure 27:
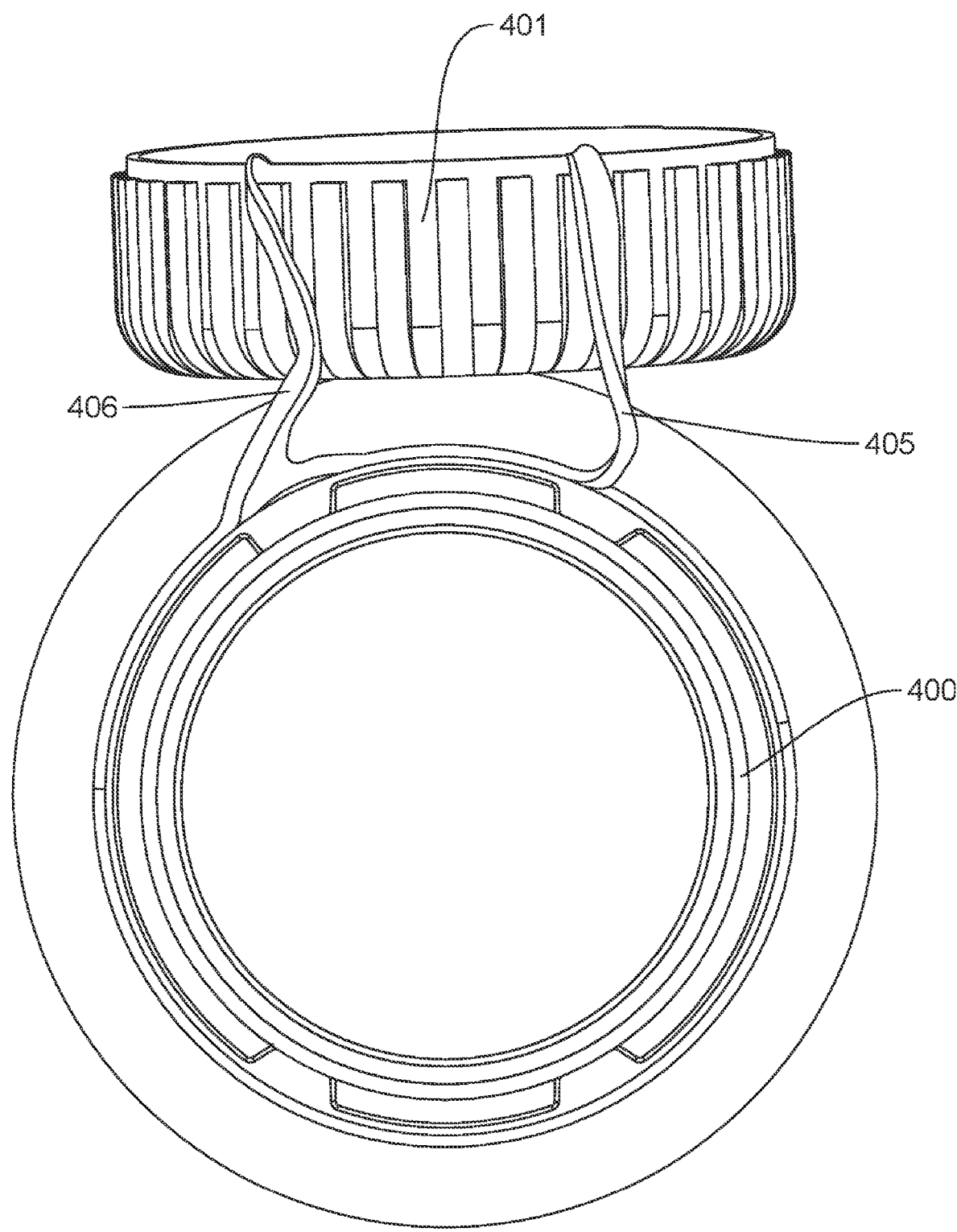

FIG. 27 is a top view illustrating that the elasticity of connection portion 405 and connection portion 406 hold cap 401 in the flipped position where top surface 408 faces container 400.

Figure 28:
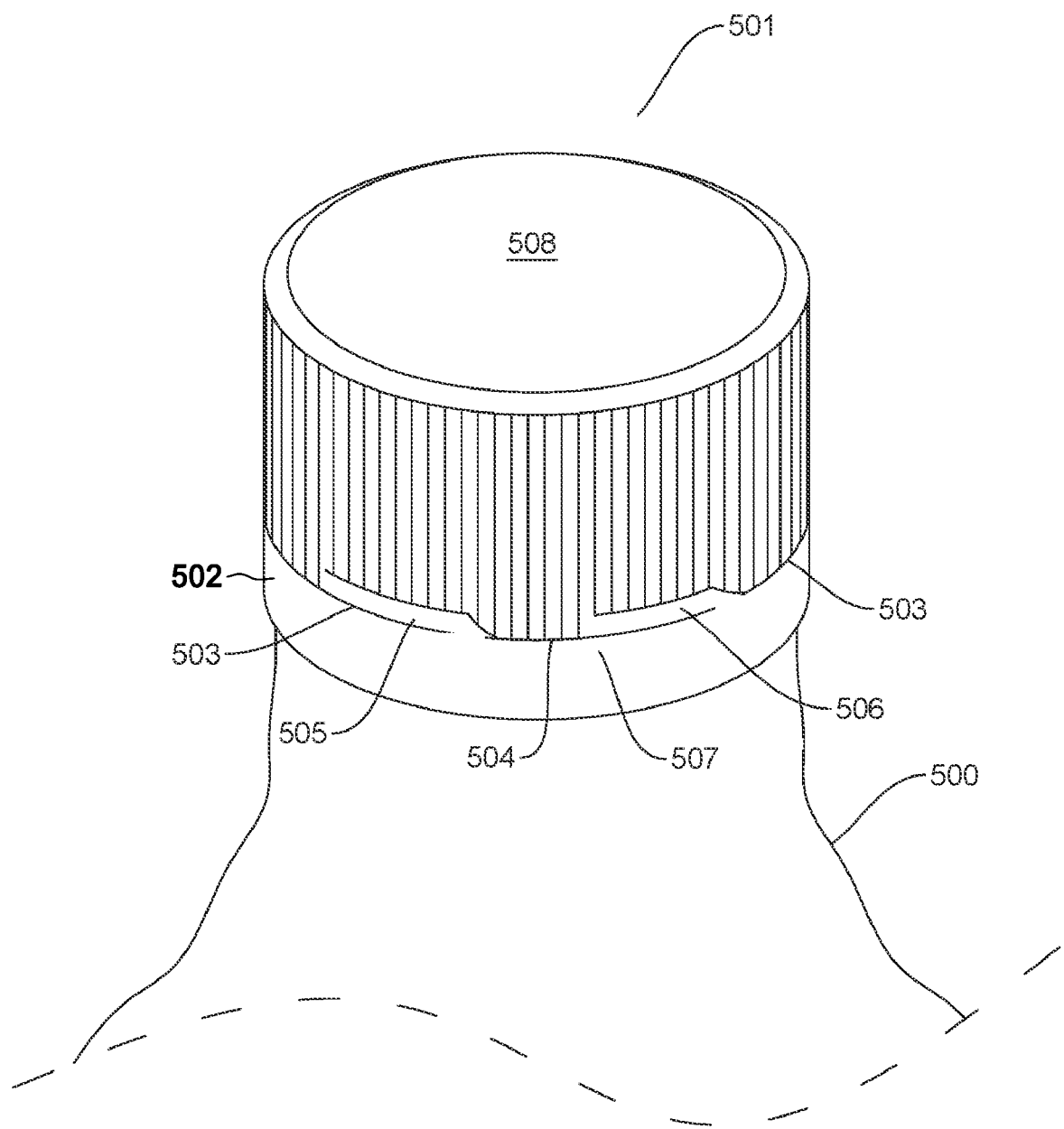
FIG. 28 shows an alternative pattern of incisions on a cap in accordance with an implementation.

The incisions may be inverted. For example, in FIG. 28 shows a cap 501 is shown secured on a container 500. A first incision 503 and a second incision 504 form a connection portion 505 and a connection portion 506 between cap 501 and a ring member 502. In the embodiment shown in FIG. 17, a region 507 exists between a location where connection portion 505 is connected to ring member 502 and where connection portion 506 is connected to cap 501. A height of cap 501 and a diameter of cap 501 affect a length of region 507 and whether region 507 even exists, as dimensions of region 507, first incision 503 and second incision 504 are all dependent on sizing connection portion 505 and sizing connection portion 506 so that when cap 501 is removed from container 500, cap 501 may be held in a flipped position against container 500 by connection portion 505 and connection portion 506.

Figure 29:
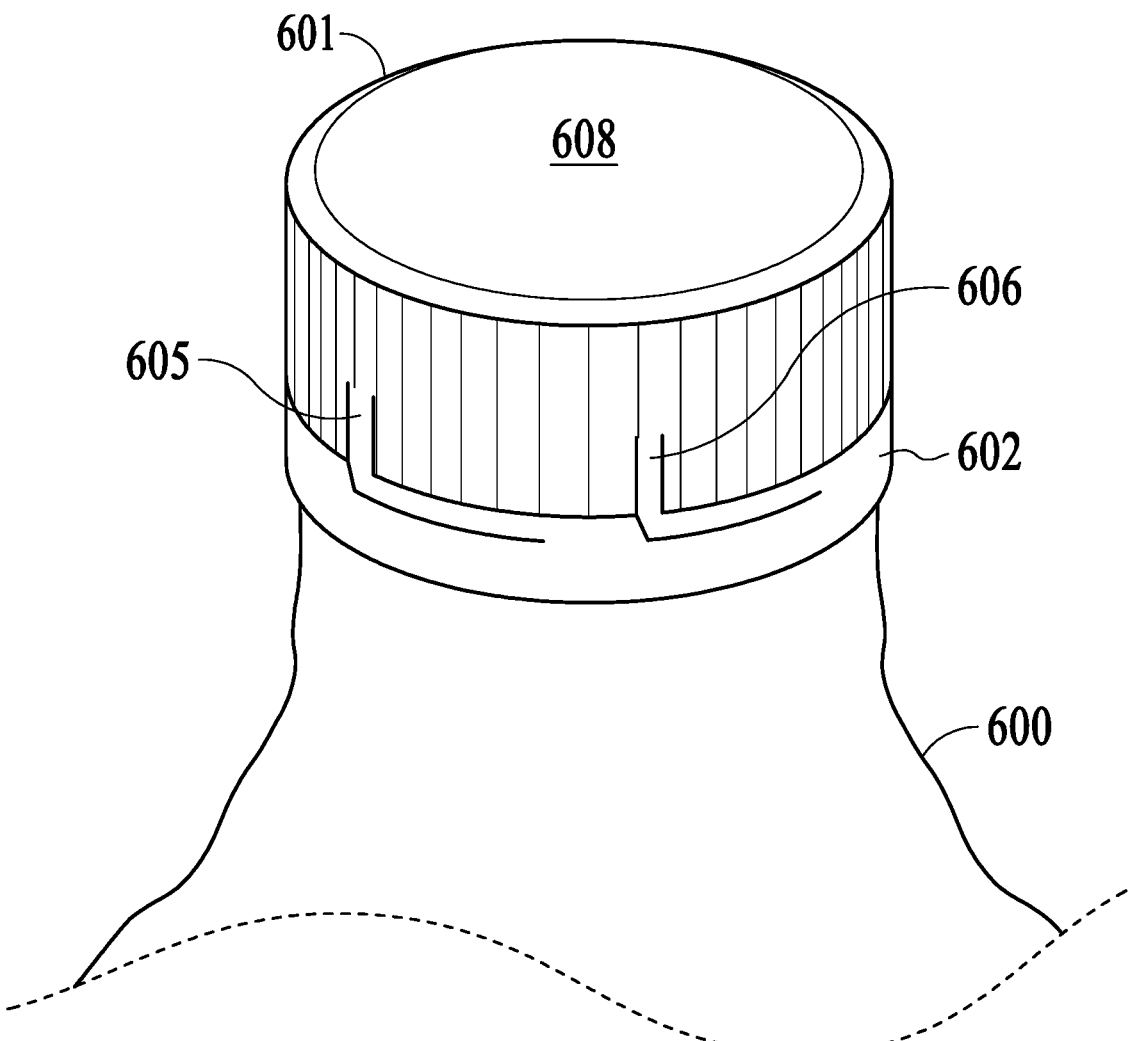
FIG. 29, FIG. 30 and FIG. 31 show another alternative pattern of incisions on a cap in accordance with an implementation.
Figure 30:
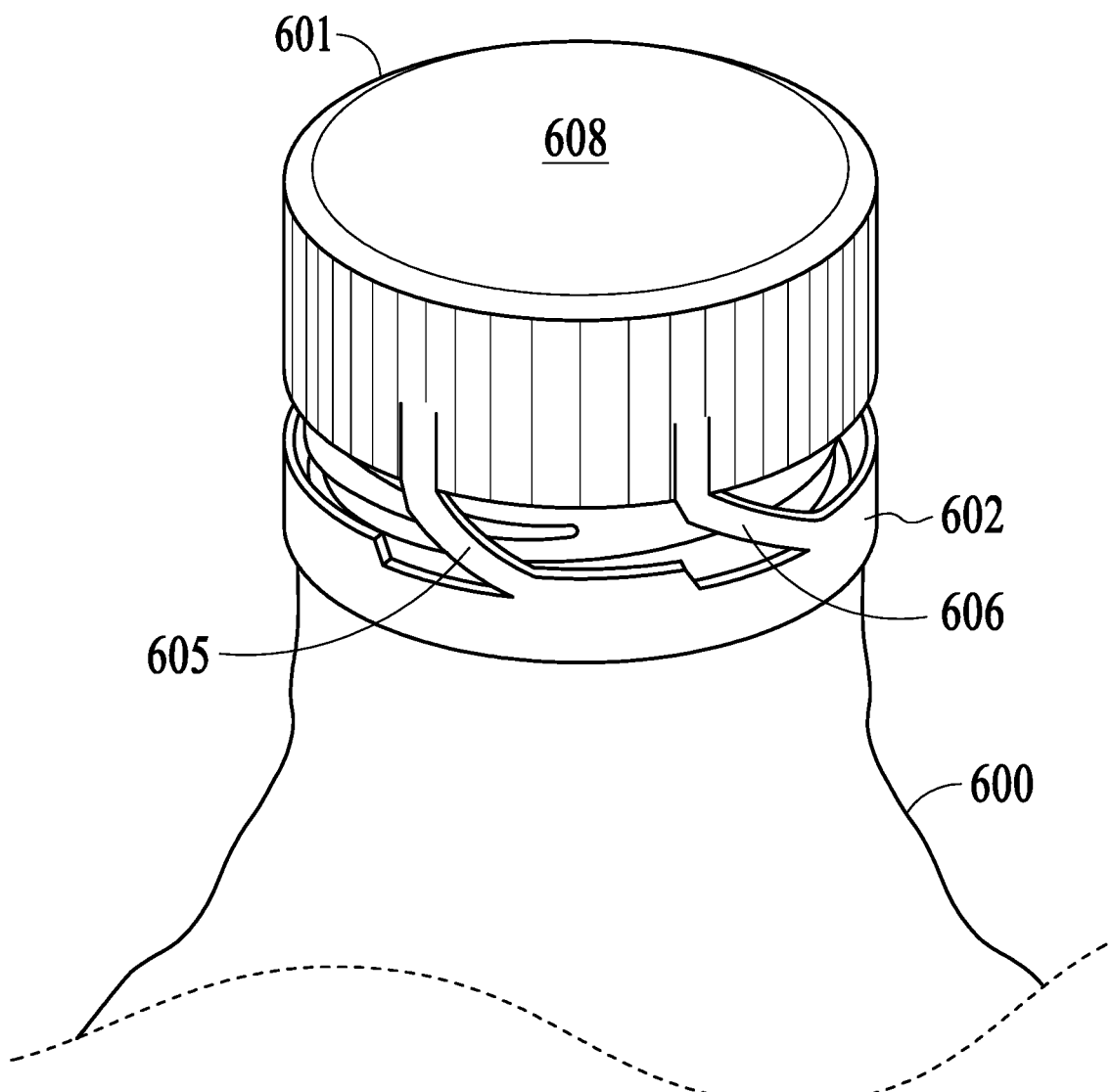

Incisions can extend into the cap to make it easier for the cap to flip into the flipped position. For example, FIG. 29 shows a cap 601 on a container 600. FIG. 30 shows cap 601 having been unscrewed and pushed open from container 600. A connection portion 605 and a connection portion 606 hold cap 601 to a ring member 602. Incisions to form connector portion 605 extend into cap 601. Incisions to form connector portion 606 extend into cap 601.

Until sufficient force is applied to cap 601, connection portion 605 and connection portion 606 are not long enough to let cap 601 flip past a lip 610 of the container. Once a user exerts more pressure, connection portion 605 and connection portion 606 stretch sufficiently to let cap 601 flip past the lip.

Figure 31:
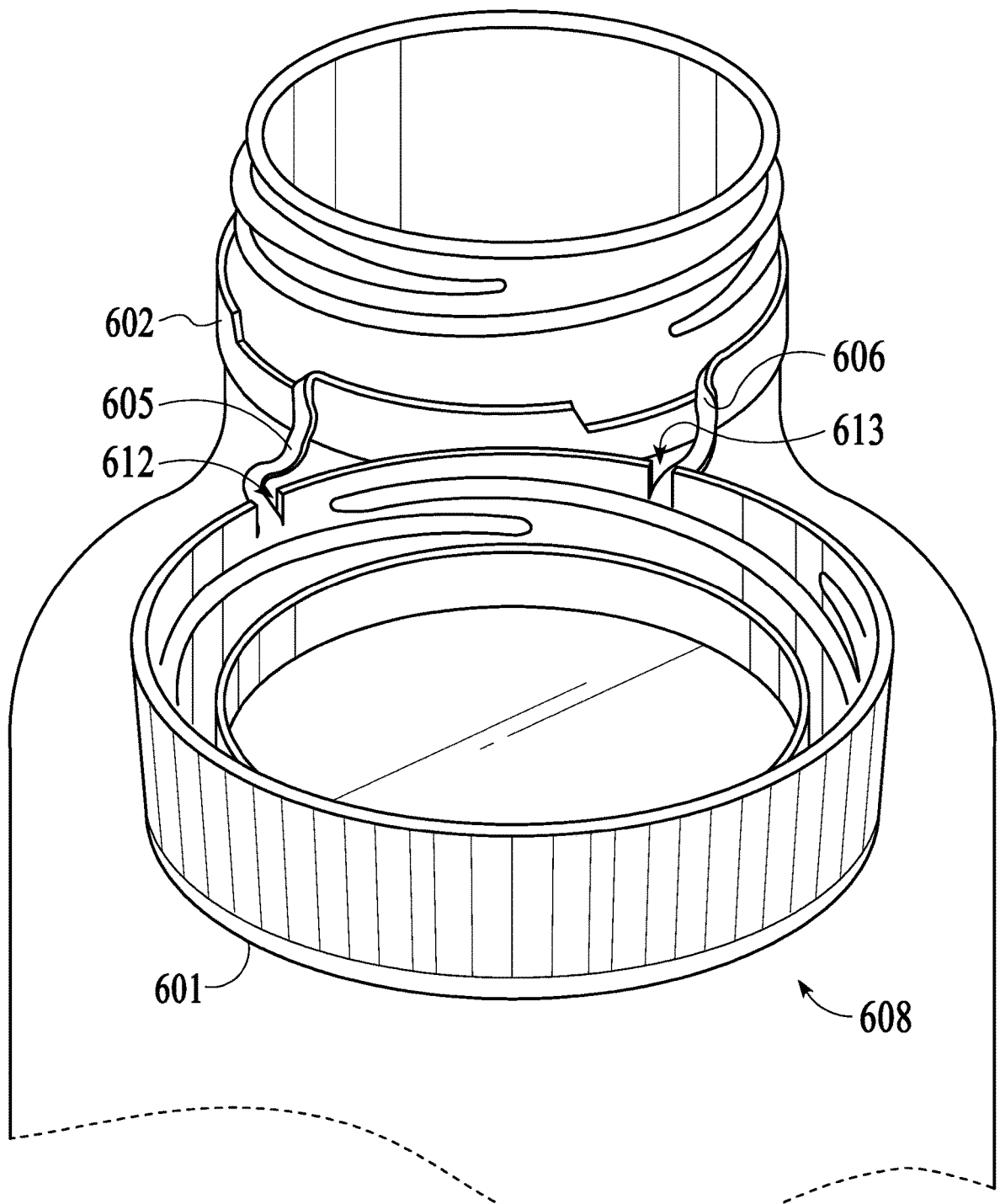

FIG. 31 shows cap 601 in the flipped position where top surface 608 faces in a downward direction. The elasticity of connection portion 605 and connection portion 606 hold cap 601 in a flipped position where top surface 608 faces in a downward direction. The connection location of connector portion 605 and cap 601 at the bottom of a notch 612 and the connection location of connector portion 606 and cap 601 at the bottom of a notch 613 results in less stretching of connector portion 605 and connector portion 606 to place cap 601 into the flipped position. This means it takes less force, and is therefore easier, to place cap 601 into the flipped position. Alternatively, cap 601 can be placed in a flipped position where top surface 608 faces container 600.

Figure 32:
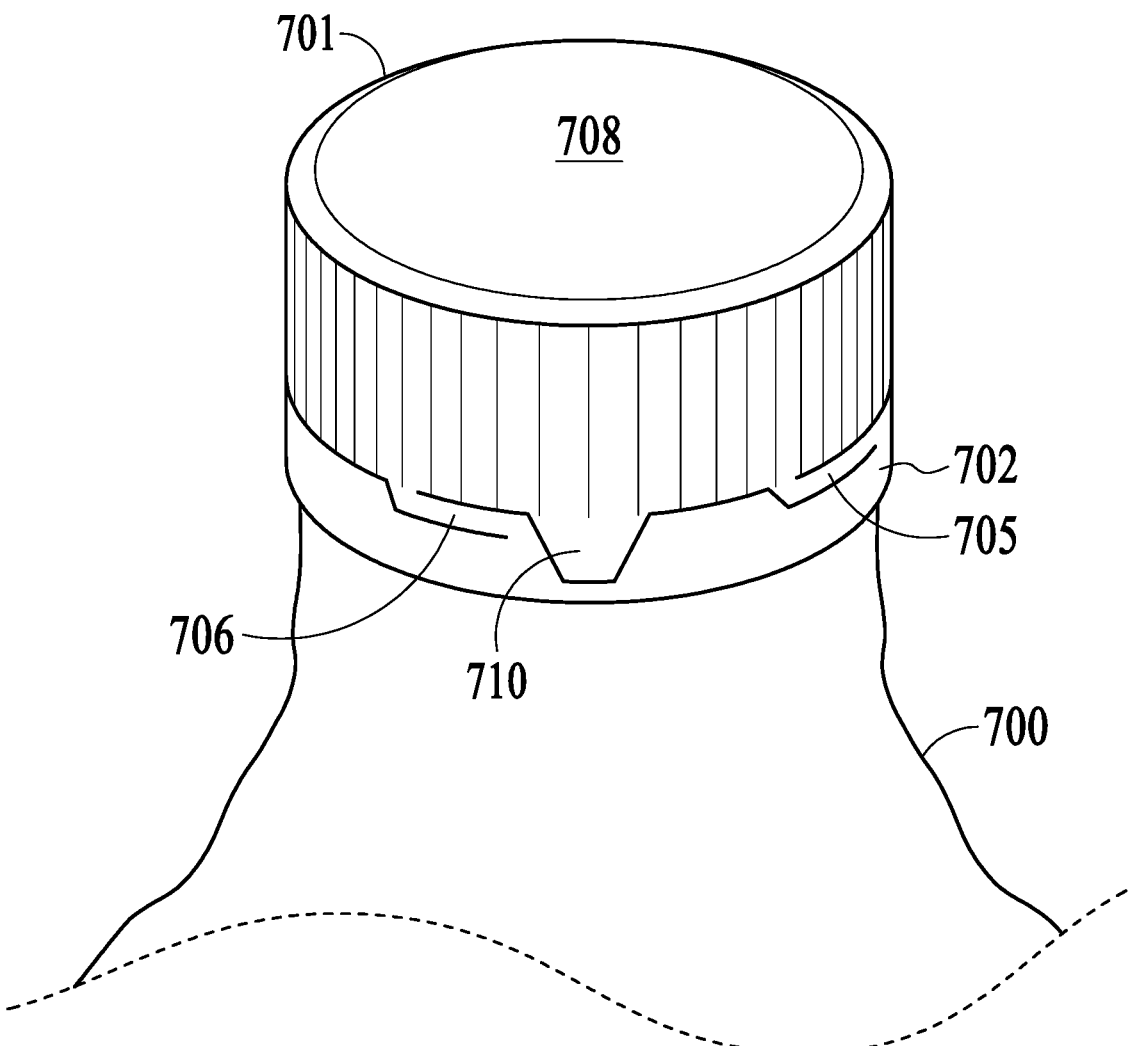
FIG. 32, FIG. 33 and FIG. 34 show another alternative pattern of incisions on a cap in accordance with an implementation.

A tab extending from the cap can be added in a shape that holds the cap in the flipped position. For example, FIG. 32 shows a cap 701 with a top surface 708 on a container 700. The two incision lines outline a connection portion 705, a connection portion 706 and a tab 710 as shown. Tab 710 extends into a gap 711 of a ring member 702.

Figure 33:
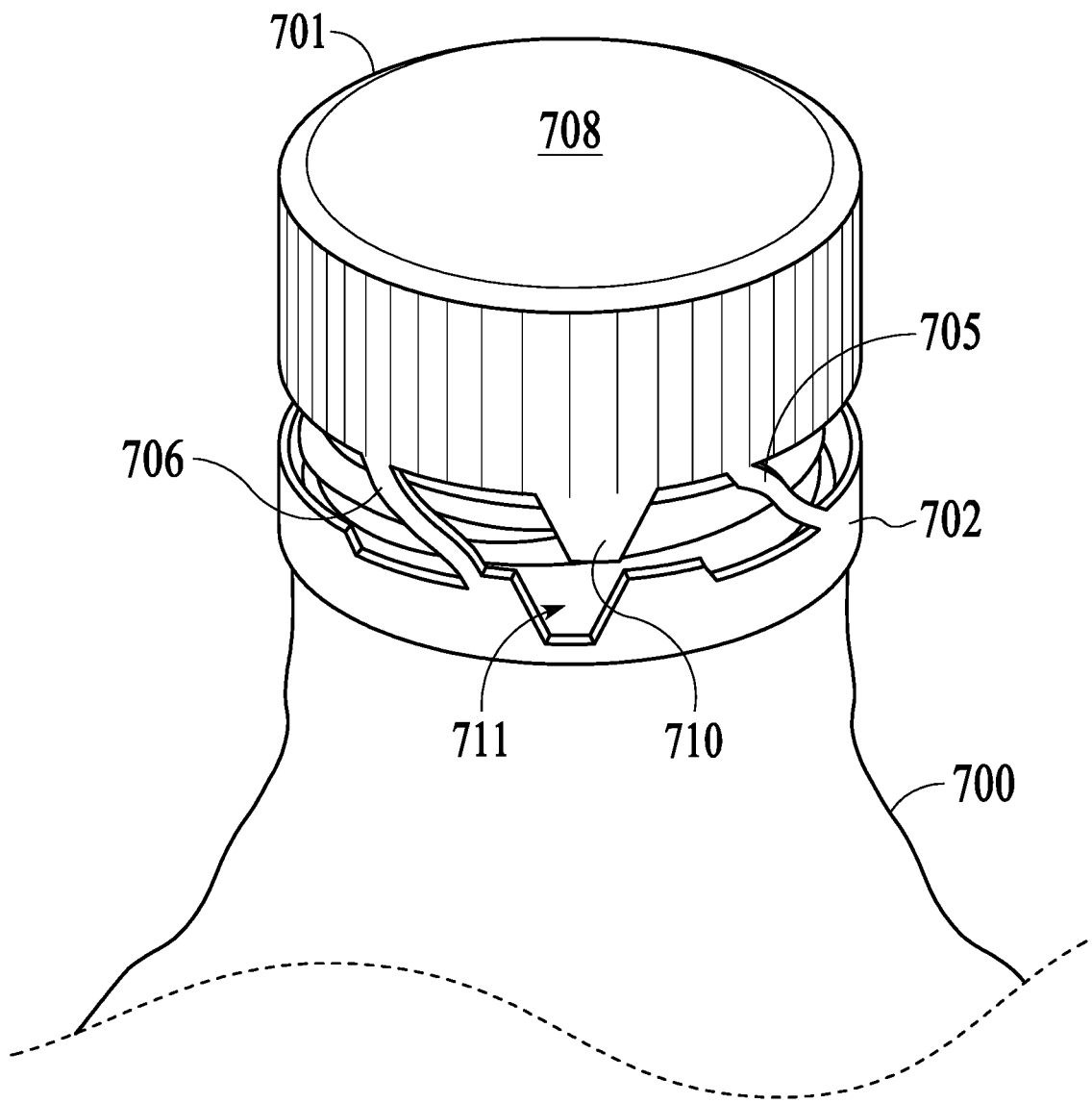

FIG. 33 shows cap 701 being unscrewed and pushed open from container 700. Connection portion 705 and connection portion 706 hold cap 701 to ring member 702.

Figure 34:
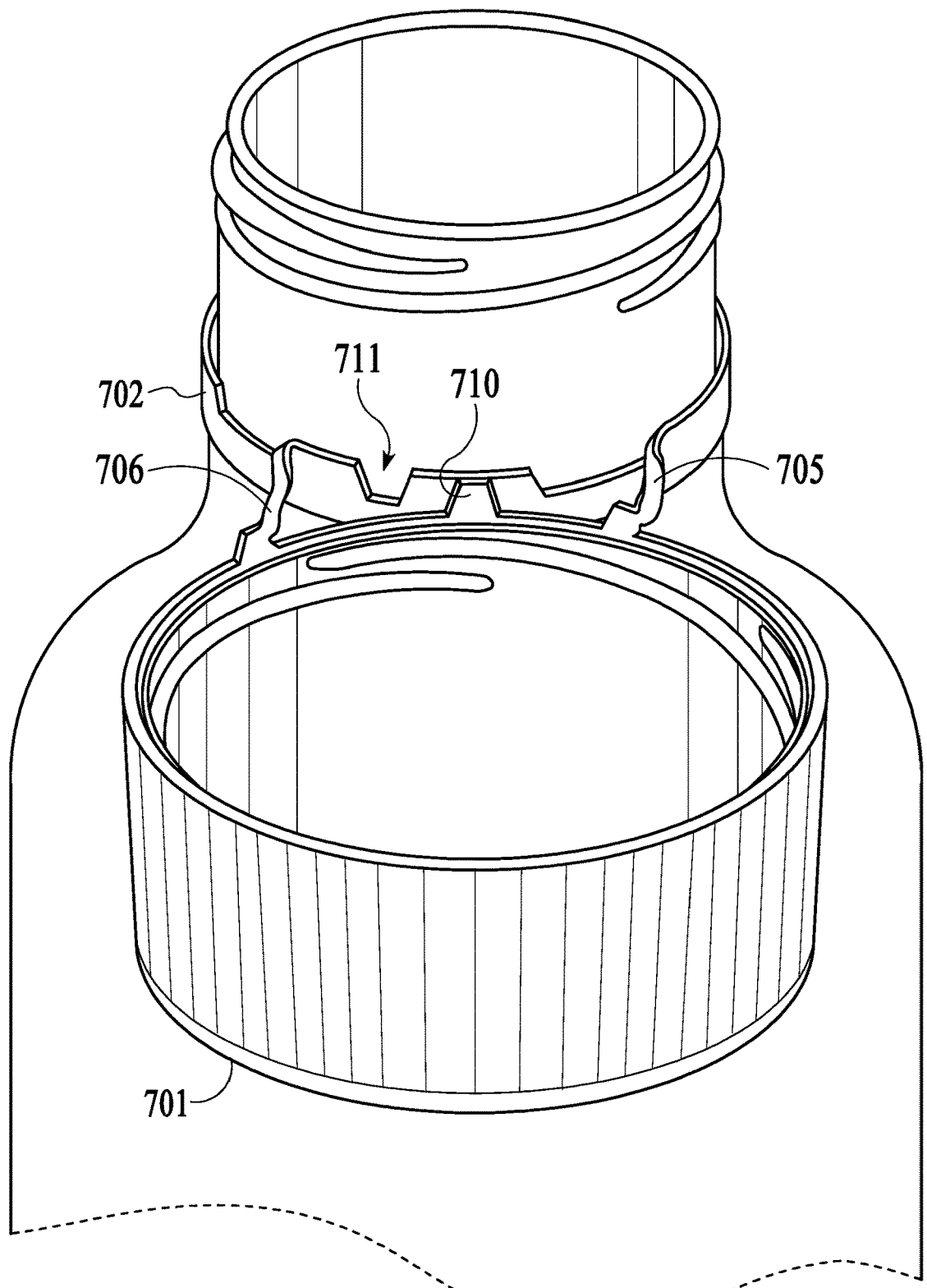

FIG. 34 shows cap 701 in the flipped position where top surface 708 faces in a downward direction. The elasticity of connection portion 705 and connection portion 706 plus the shape and location of tab 710 hold cap 701 in a flipped position where top surface 708 faces in a downward direction.

Figure 35:
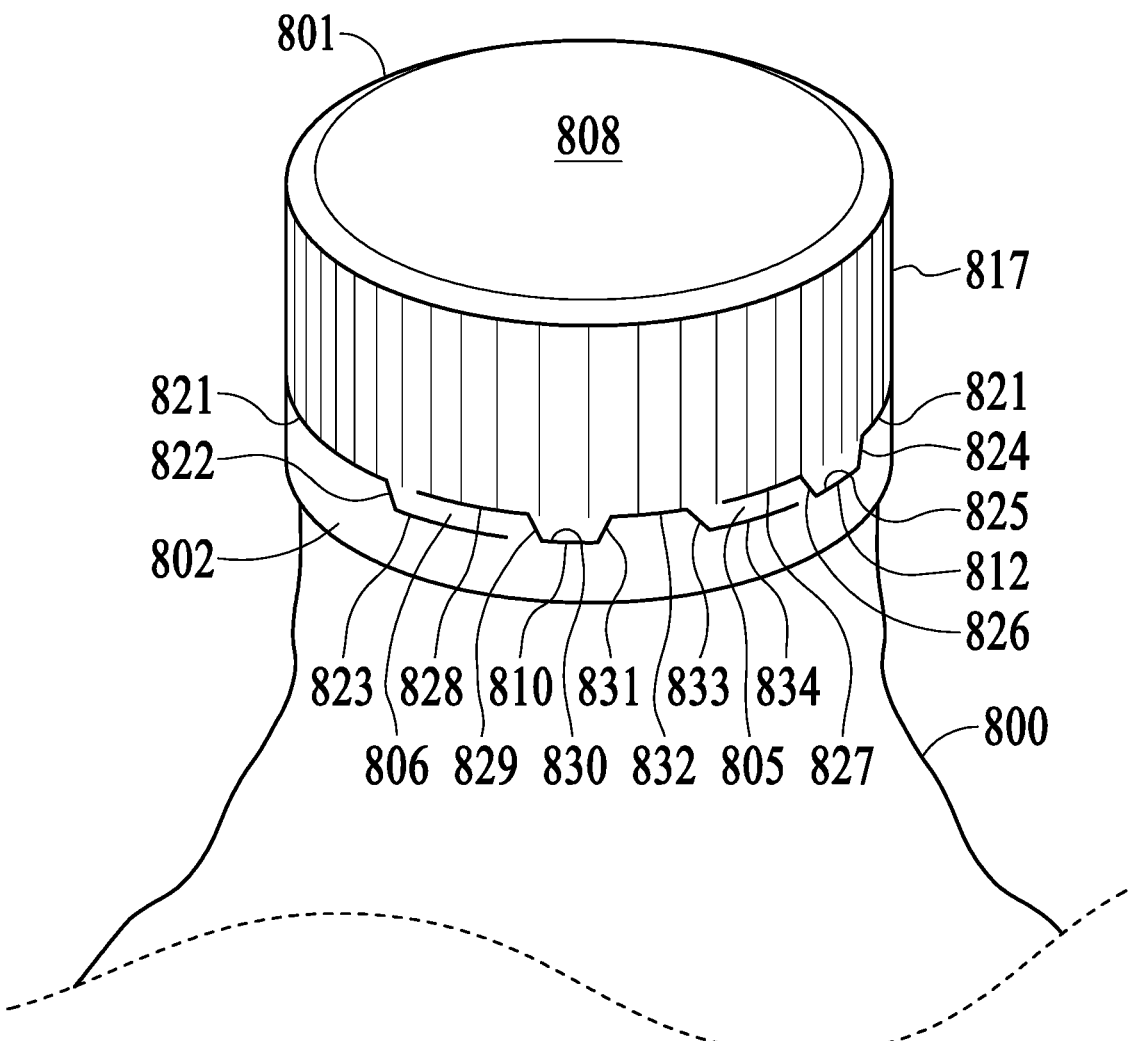
FIG. 35, FIG. 36 and FIG. 37 show another alternative pattern of incisions on a cap in accordance with an implementation.

FIG. 35 illustrates an improved incision pattern that simplifies manufacture and improves operation. For example, FIG. 35 shows a cap 801 on a container 800. Cap 801 has a top surface 808 and a circular sidewall 817. Two incisions outline a connection portion 805, a connection portion 806, a tab 810, a tab 812 and a tab 816 as shown. The first incision includes an incision section 821, an incision section 822, an incision section 823, an incision section 824, an incision section 825, an incision section 826 and an incision section 827. The second incision includes an incision section 828, an incision section 829, an incision section 830, an incision section 831, an incision section 832, an incision section 833 and an incision section 834. While connecting pins are not specifically shown in FIG. 35, they may be included along the first incision and the second incision, as described above in other implementations.

Connection portion 805, connection portion 806, tab 810, tab 812 and tab 816 are all formed between the same two incision planes. The first incision plane is delineated by incision section 821 and incision section 827 of the first incision and by incision section 828 and incision section 832 of the second incision, which are all incision sections placed on the first incision plane. The second incision plane is delineated by incision section 823 and incision section 825 of the first incision and by incision section 830 and incision section 834 of the second incision, which are all incision sections placed on the second incision plane.

The boundaries of connection portion 806 are defined by incision section 822 and incision section 823 of the first incision and by incision section 828 and incision section 829 of the second incision.

The boundaries of connection portion 805 are defined by incision section 826 and incision section 827 of the first incision and by incision section 833 and incision section 834 of the second incision.

The boundaries of tab 810 are defined by incision section 829, incision section 830 and incision section 831 of the second incision. The boundaries of tab 812 are defined by incision section 824, incision section 825 and incision section 826 of the first incision. The boundaries of tab 816 are defined by incision section 831, incision section 832 and incision section 833 of the second incision. Incision section 832 serves as a boundary incision section for both tab 810 and tab 816.

The incision pattern shown in FIG. 35 has several advantages over the incision shown in FIG. 32. For example, as shown in FIG. 32, while connecting portion 705 and connecting portion 706 are formed between two incision planes, tab 710 extends below these incision plane requiring another plane of blades to be used manufacture of cap 801.

This can be understood by FIG. 9, which shows blades 141, 144 and 147 are all located on a first plane, blades 143 and 146 are both located on a second plane and blades 142 and 145 are both located on a third plane. Like the blade configuration shown in FIG. 9, the incision pattern shown in FIG. 32 requires blades placed in three different planes. However, the incision pattern shown in FIG. 35, allows the elimination of one of the planes of blades, so that only two of the planes of blades are required.

Figure 36:
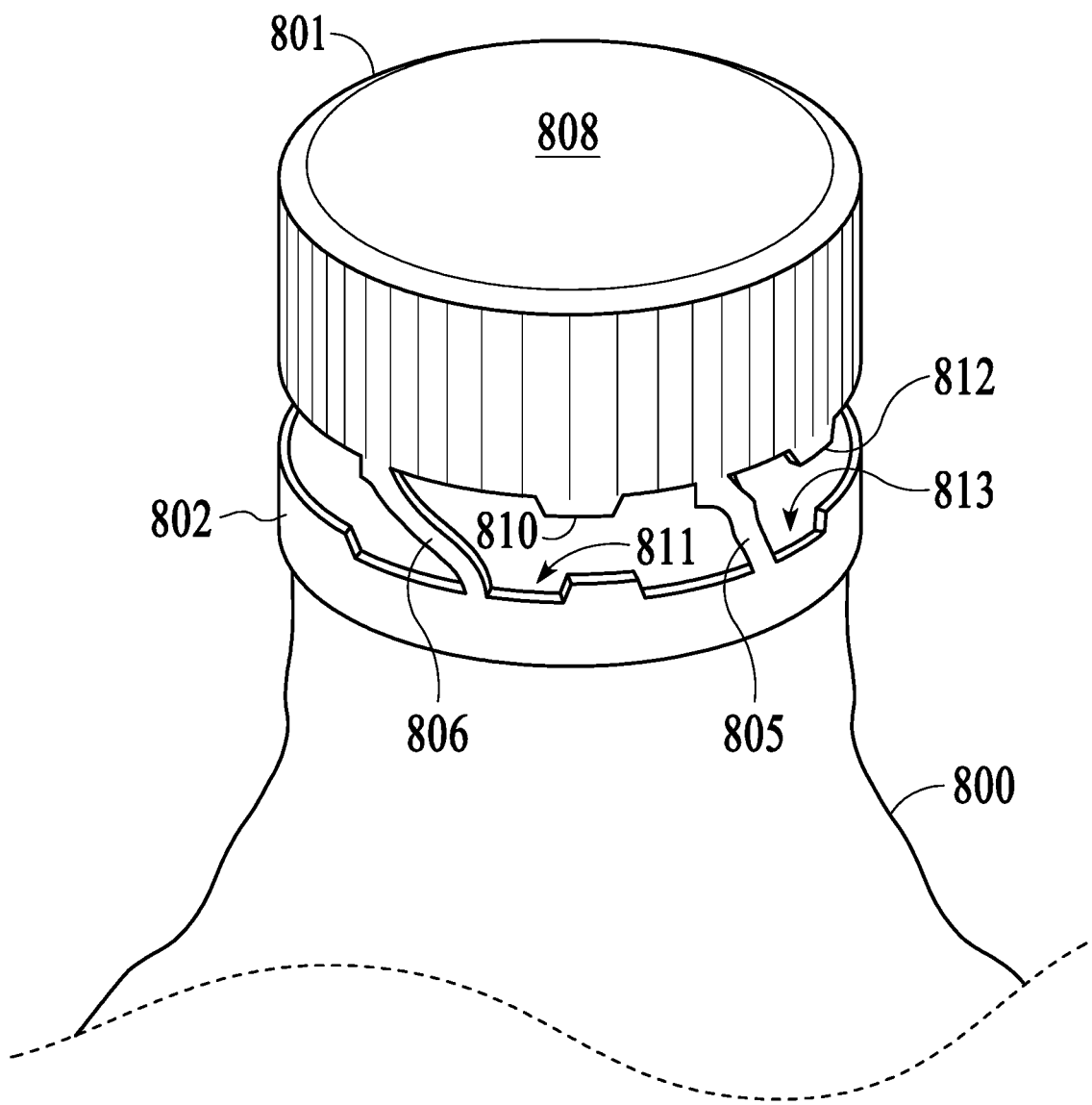

Another advantage of the incision pattern can be understood by considering FIG. 36. FIG. 36 shows cap 801 being unscrewed and pushed open from container 800. Connection portion 805 and connection portion 806 hold cap 801 to ring member 802. Removal of tab 810 leaves a gap 811 in a ring member 802. Removal of tab 812 leaves a gap 813 in ring member 802.

As shown in FIG. 36, both sides of connection portion 806 extend out of the second incision plane as delineated by incision section 823 of the first incision and by incision section 830 of the second incision. Likewise, both sides of connection portion 805 extend out of the second incision plane as delineated by incision section 825 of the first incision and by incision section 834 of the second incision.

In incision pattern shown in FIG. 33, however, the sides of connection portion 705 and connection portion 706 extend out of different incision planes. This effects the aesthetics and optimal function of connection portion 705 and connection portion 706. The optional function is further illustrated by FIG. 37.

Figure 37:
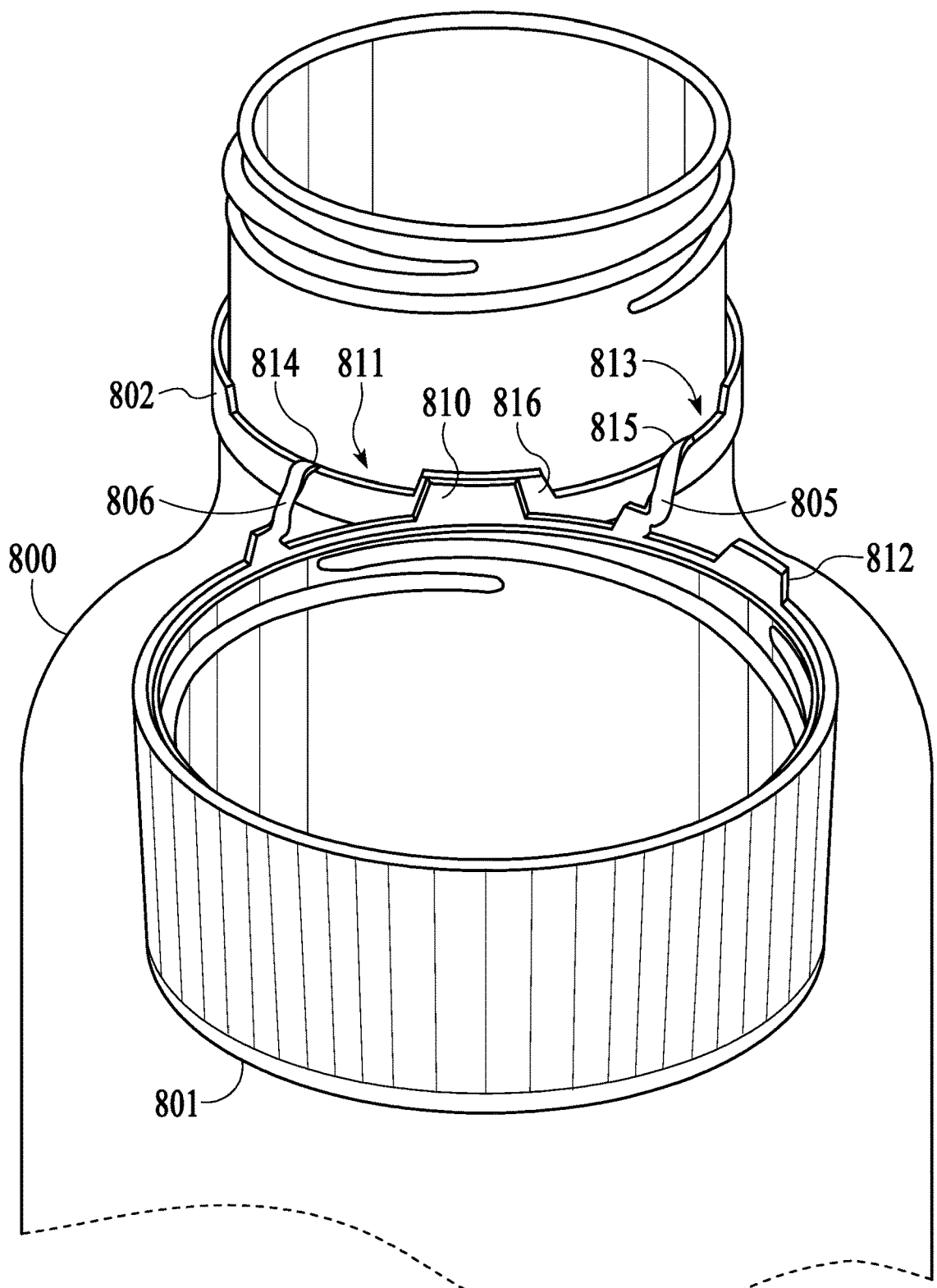

FIG. 37 shows cap 801 in the flipped position where top surface 808 faces in a downward direction. In the flipped position, tab 810 of cap 801 aligns to rest on tab 816 of ring member 802. The elasticity of connection portion 805 and connection portion 806 plus the shape and location of tab 810 hold cap 801 in a flipped position where top surface 808 faces in a downward direction. As shown in FIG. 37, because both sides of connection portion 806 extend out of the second incision plane, connection portion 806 is able to fold over and extend out flat from an intersection area 814 of ring member 802. Likewise, because both sides of connection portion 805 extend out of the second incision plane, connection portion 805 is able to fold over and extend out flat from an intersection area 815 of ring member 802. Compare this to FIG. 34 where sides of connection portion 706 extends out of from ring member 702 on two different incision planes resulting in a looping effect where connection portion 706 connects to ring member 702. Likewise, where sides of connection portion 705 extends out of from ring member 702 on two different incision planes resulting in a looping effect where connection portion 705 connects to ring member 702. This looping effect increases the effort needed to remove and flip cap 701. Removing this source of tension, as is accomplished by the design shown in FIG. 35 and FIG. 37.

Another way tension is reduced when elevating (e.g. by unscrewing) cap 801 in the system shown in FIG. 36 is that connecting portion 805 and connection portion 806 are at parallel angles during the time cap 808 is separated and elevated from ring member 802. This feature of parallel angle of connection portion 805 and connection portion 806 is also present in other embodiments such as shown in FIG. 3, FIG. 18 and FIG. 33.

Further, because both connection portion 806 and connection portion 805 fold over and extend out flat from ring member 802, this allows ring member to have reduced width, lowering the location of flipped cap 801 relative to container 800. Tab 810 therefore can have a lower profile, as shown in FIG. 37 as compared to tab 710 shown in FIG. 34. The reduced profile (i.e. lower height) of tab 810 allows for less tension on connecting portion 805 and connecting portion 806 when flipping and flipping back allowing connection portion 806 and connection portion 805 to be shortened.

While the incision pattern shown in FIG. 35 allows for all the above-described advantages, similar incision patterns can also be used to accomplish the same end result.

Figure 38:
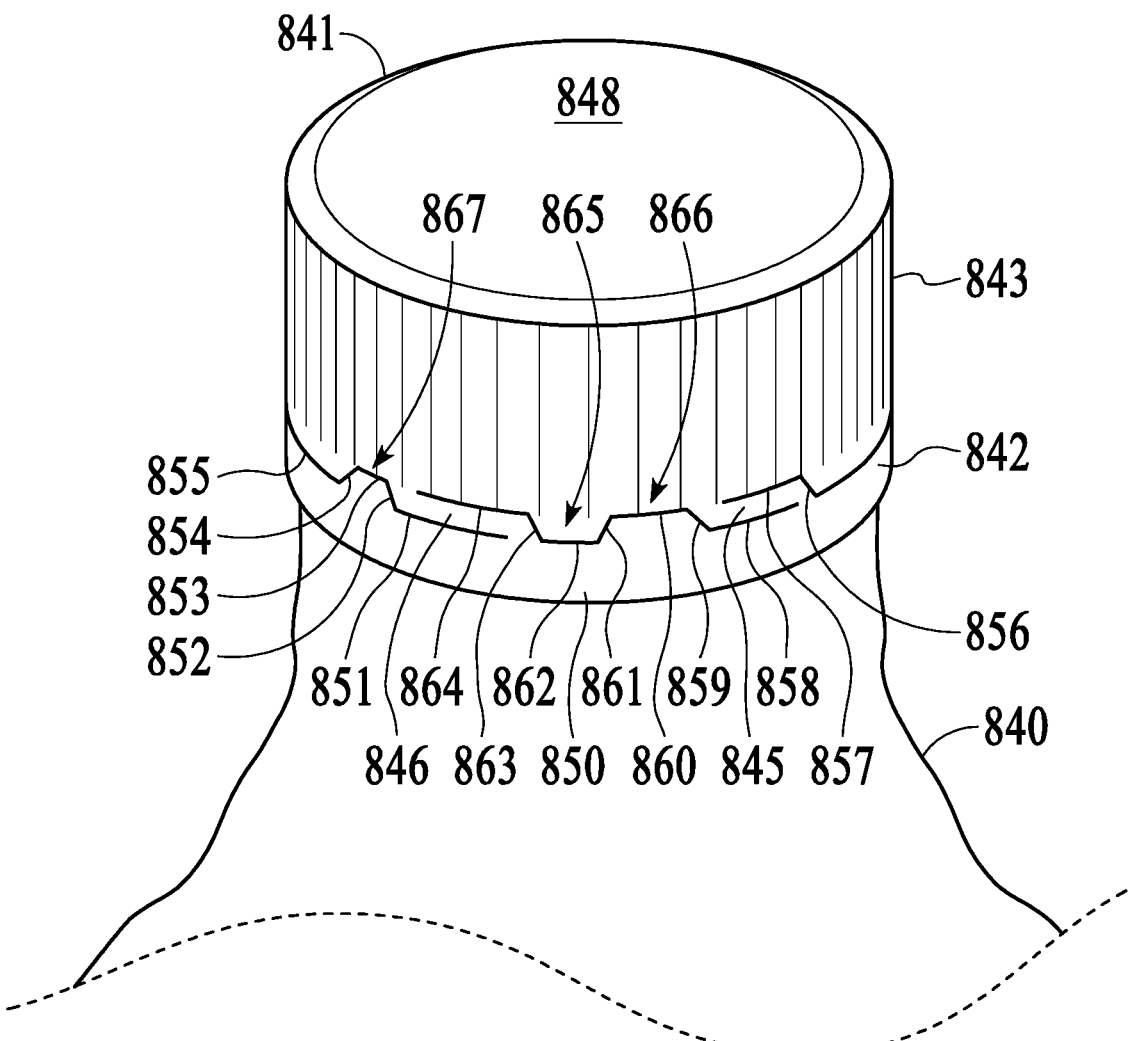
FIG. 38 shows another alternative pattern of incisions on a cap in accordance with an implementation.

For example, FIG. 38 shows a cap 841 on a container 840. Cap 841 has a top surface 848 and a circular sidewall 843. Two incisions outline a connection portion 845, a connection portion 846, a tab 865, a tab 866 and a tab 867 as shown. The first incision includes an incision section 851, an incision section 852, an incision section 853, an incision section 854, an incision section 855, an incision section 856 and an incision section 857. The second incision includes an incision section 858, an incision section 859, an incision section 860, an incision section 861, an incision section 862, an incision section 863 and an incision section 864. While connecting pins are not specifically shown in FIG. 38, they may be included along the first incision and the second incision, as described above in other implementations.

Connection portion 845, connection portion 846, tab 865, tab 866 and tab 867 are all formed between the same two incision planes. The first incision plane is delineated by incision section 851 and incision section 855 of the first incision and by incision section 858 and incision section 862 of the second incision, which are all incision sections placed on the first incision plane. The second incision plane is delineated by incision section 853 and incision section 857 of the first incision and by incision section 864 and incision section 860 of the second incision, which are all incision sections placed on the second incision plane.

The boundaries of connection portion 846 are defined by incision section 851 and incision section 852 of the first incision and by incision section 863 and incision section 864 of the second incision.

The boundaries of connection portion 845 are defined by incision section 856 and incision section 857 of the first incision and incision section 858 and incision section 859 of the second incision.

The boundaries of tab 865 are defined by incision section 861, incision section 862 and incision section 863 of the second incision. The boundaries of tab 866 are defined by incision section 859, incision section 860 and incision section 861 of the second incision. The boundaries of tab 867 are defined by incision section 852, incision section 853 and incision section 854 of the first incision. Incision section 861 serves as a boundary incision section for both tab 865 and tab 866.

In the flipped position, tab 865 of cap 841 aligns to rest on tab 860 of ring member 842. In some implementations, tab 867 can be omitted by omitting incision sections 852, 853 and 854 and extending incision section 851 to connect directly with incision section 855.

Figure 39:
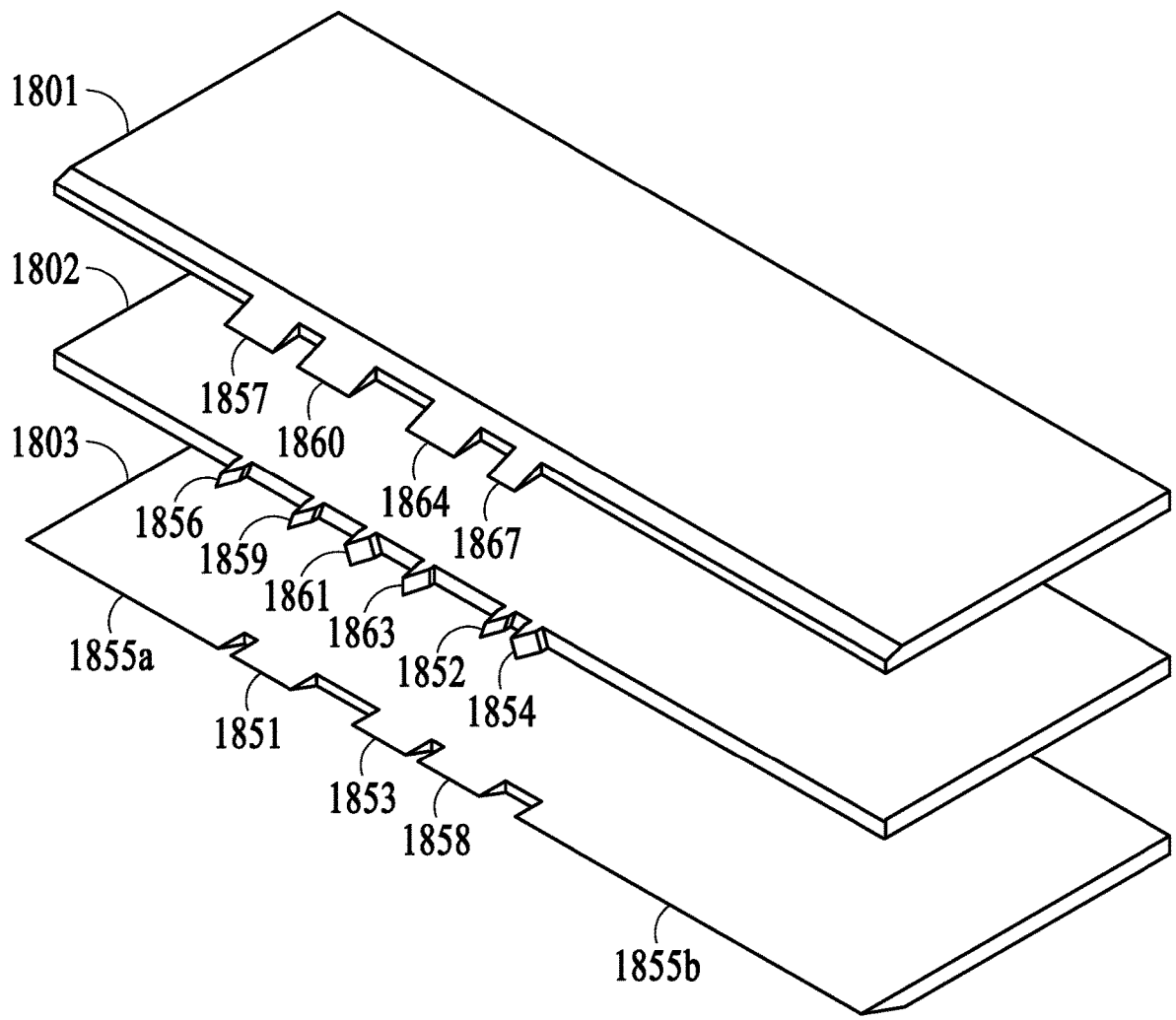
FIG. 39 shows tools used for making the incisions shown in FIG. 35 and FIG. 38.

FIG. 39 shows blades that are used to make incisions when manufacturing cap 801 shown in FIG. 35, FIG. 36, and FIG. 37 and cap 841 shown in FIG. 38. The tools work for both embodiments because the incision pattern for FIG. 38 is the same pattern as the incision pattern for FIG. 35, only in a upside down orientation relative to the incision pattern for FIG. 35.

Caps are manufactured upside down, so when manufacturing cap 841 shown in FIG. 35, blade 1801 functions as an upper blade and includes a knife 1857 that is used to form incision section 823, a knife 1860 that is used to form incision section 830, a knife 1864 that is used to form incision section 834 and a knife 1853 that is used to form incision section 825.

Blade 1802 functions a middle blade and includes a knife 1856 that is used to form incision section 822, a knife 1859 that is used to form incision section 829, a knife 1861 that is used to form incision section 831, a knife 1863 that is used to form incision section 833, a knife 1852 that is used to form incision section 826 and a knife 1854 that is used to form incision section 824.

A blade 1803 functions as a lower blade and includes a knife 1855a and a knife 1855b that are used to form incision section 821, a knife 1851 that is used to form incision section 828, a knife 1864 that is used to form incision section 832 and a knife 1858 that is used to form incision section 827.

The upper blade, the middle blade and the lower blade form a blade set. While in FIG. 39 the knives are shown incorporated in three blades, other configurations of blades could be used. For example, the knives could all be included on one wide or multiple level blade. Alternatively, each knife could be included on its own dedicated blade. Alternatively any combination of knives could be included on any number of blades of a blade set. However, regardless of the number of blades used, the knives in each case can still configured so that a first row of the knives includes knife 1857, knife 1860, knife 1864 and knife 1877, a second row of the knives includes knife 1856, knife 1859, knife 1861, knife 1863, knife 1852 and knife 1854, and a third row of the knives include knife 1855a, knife 1855b, knife 1851, knife 1853 and knife 1858.

Notches in the knives form bridge connection portions between the cap and the ring section. The bridge connection portions are broken when the cap is mounted on a container and the container is opened by unscrewing the cap.

Upper blade 1801, middle blade 1802 and lower blade 1803 are included as part of manufacturing system such as manufacturing 70 shown in FIG. 4

When manufacturing cap 841 shown in FIG. 38, blade 1801 functions as a lower blade and includes a knife 1857 that is used to form incision section 857, a knife 1860 that is used to form incision section 860, a knife 1864 that is used to form incision section 864 and a knife 1853 that is used to form incision section 853.

Blade 1802 functions a middle blade and includes a knife 1856 that is used to form incision section 856, a knife 1859 that is used to form incision section 859, a knife 1861 that is used to form incision section 861, a knife 1863 that is used to form incision section 863, a knife 1852 that is used to form incision section 852 and a knife 1854 that is used to form incision section 854.

Blade 1803 functions as an upper blade and includes a knife 1855a and a knife 1855b that are used to form incision section 855, a knife 1851 that is used to form incision section 851, a knife 1862 that is used to form incision section 862 and a knife 1858 that is used to form incision section 858.

While in FIG. 39, knife 1857, knife 1860, knife 1864 and knife 1867 are all shown included on a single blade, that is blade 1801, in alternative embodiments, knife 1857, knife 1860, knife 1864 and knife 1867 can be configured so that there are included as part of more than one blade. For example, knife 1857 and knife 1860 could be mounted on one blade, while knife 1864 and knife 1867 could be mounted on a different blade. Alternatively, each knife could be included on its own separate blade. Alternatively, three knives could be mounted on one blade and the remaining knife mounted on a separate blade, and so on.

Likewise, in alternative embodiments, knife 1855a, knife 1855b, knife 1851, knife 1853 and knife 1858 are all shown included on a single blade, that is blade 1803, in alternative embodiments, knife 1855a, knife 1855b, knife 1851, knife 1853 and knife 1858 can be configured so that there are included as part of more than one blade.

Likewise, in alternative embodiments, knife 1856, knife 1859, knife 1861, knife 1863, knife 1852 and knife 1854 are all shown included on a single blade, that is blade 1802, in alternative embodiments, knife 1856, knife 1859, knife 1861, knife 1863, knife 1852 and knife 1854 can be configured so that there are included as part of more than one blade.

Figure 40:
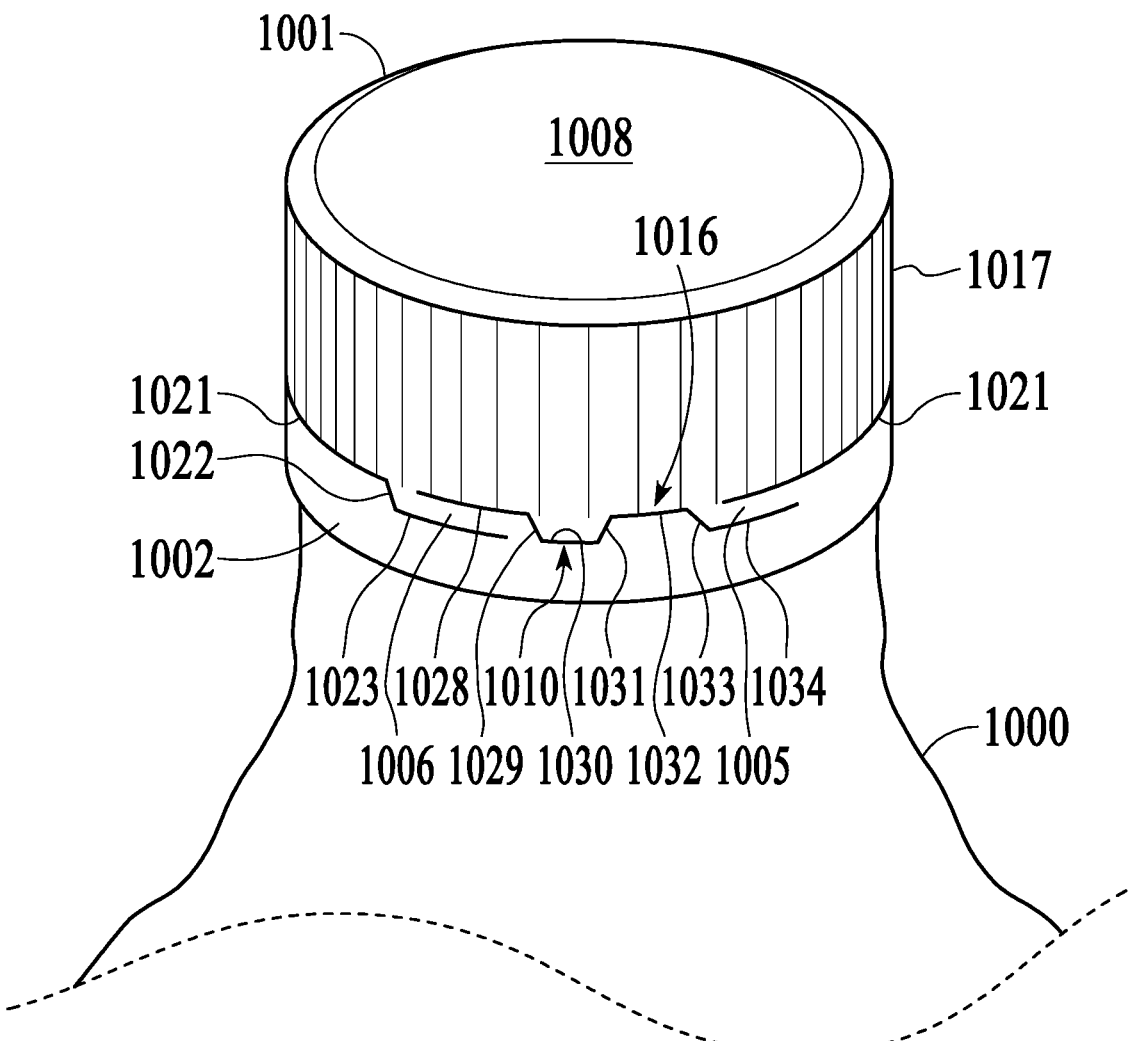
FIG. 40 and FIG. 41 illustrate another alternative pattern of incisions on a cap in accordance with an implementation.

FIG. 40 illustrates another improved incision pattern that simplifies manufacture and improves operation. For example, FIG. 40 shows a cap 1001 on a container 1000. Cap 1001 has a top surface 1008 and a circular sidewall 1017. Two incisions outline a connection portion 1005, a connection portion 1006, a tab 1010 and a tab 1016 as shown. The first incision includes an incision section 1021, an incision section 1022 and an incision section 1023. The second incision includes an incision section 1028, an incision section 1029, an incision section 1030, an incision section 1031, an incision section 1032, an incision section 1033 and an incision section 1034. While connecting pins are not specifically shown in FIG. 40, they may be included along the first incision and the second incision, as described above in other implementations.

Connection portion 1005, connection portion 1006, tab 1010 and tab 1016 are all formed between the same two incision planes. The first incision plane is delineated by incision section 1021 of the first incision and by incision section 1028 and incision section 1032 of the second incision, which are all incision sections placed on the first incision plane. The second incision plane is delineated by incision section 1023 of the first incision and by incision section 1030 and incision section 1034 of the second incision, which are all incision sections placed on the second incision plane.

The boundaries of connection portion 1006 are defined by incision section 1022 and incision section 1023 of the first incision and by incision section 1028 and incision section 1029 of the second incision.

The boundaries of connection portion 1005 are defined by incision section 1027 of the first incision and by incision section 1033 and incision section 1034 of the second incision.

The boundaries of tab 1010 are defined by incision section 1029, incision section 1030 and incision section 1031 of the second incision. The boundaries of tab 1016 are defined by incision section 1031, incision section 1032 and incision section 1033 of the second incision. Incision section 1031 serves as a boundary incision section for both tab 1010 and tab 1016.

Figure 41:
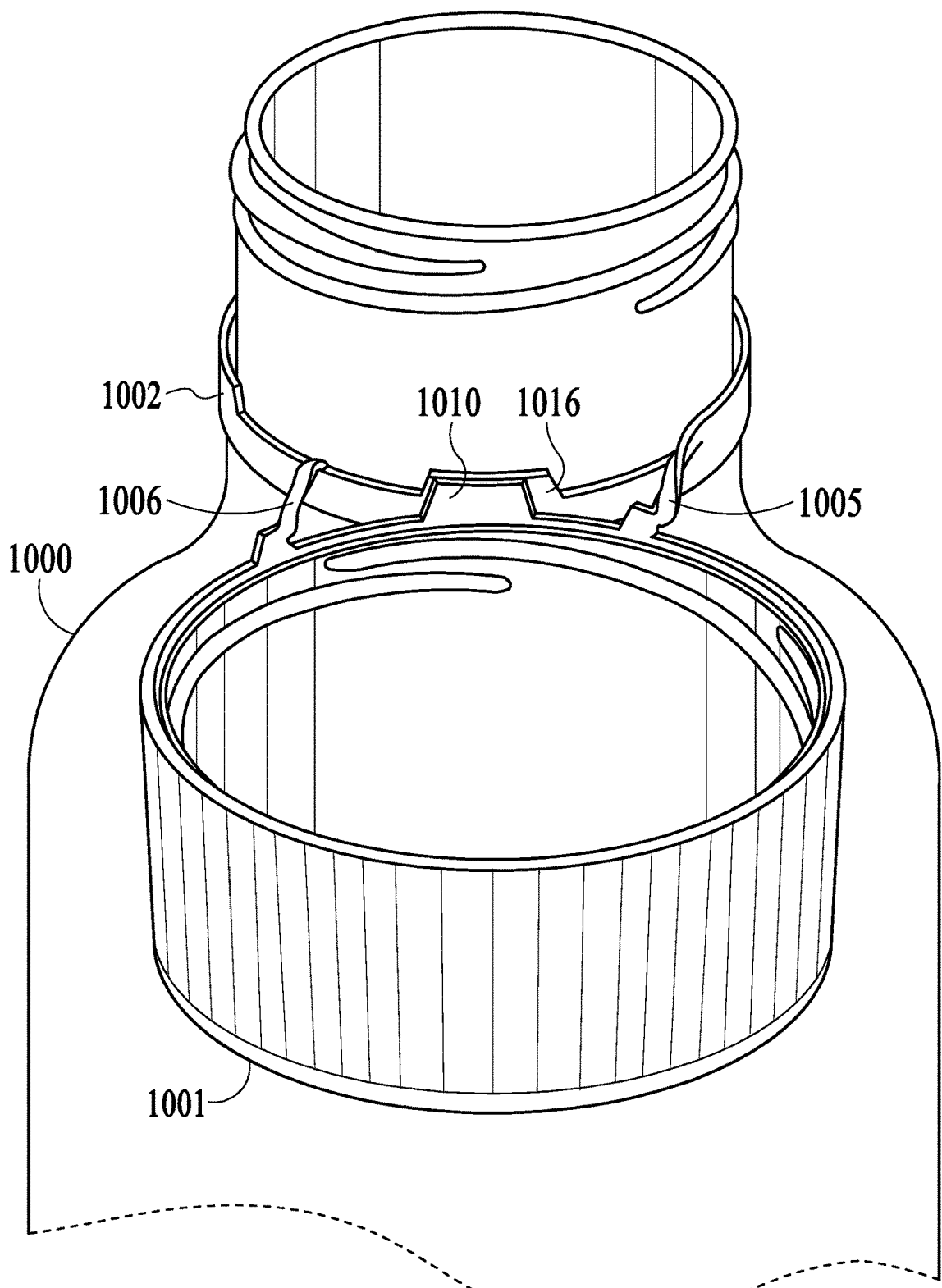

FIG. 41 shows cap 1001 in the flipped position where top surface 1008 faces in a downward direction. In the flipped position, tab 1010 of cap 1001 aligns to rest on tab 1016 of ring member 1002. The elasticity of connection portion 1005 and connection portion 1006 plus the shape and location of tab 1010 and tab 1016 hold cap 1001 in a flipped position where top surface 1008 faces in a downward direction.

Further, because both connection portion 1006 and connection portion 1005 fold over and extend out flat from ring member 1002, this allows ring member to have reduced width, lowering the location of flipped cap 1001 relative to container 1000. Tab 1010 therefore can have a lower profile, as shown in FIG. 41. The reduced profile (i.e. lower height) of tab 1010 allows for less tension on connecting portion 1005 and connecting portion 1006 when flipping and flipping back allowing connection portion 1006 and connection portion 1005 to be shortened.

Figure 42:
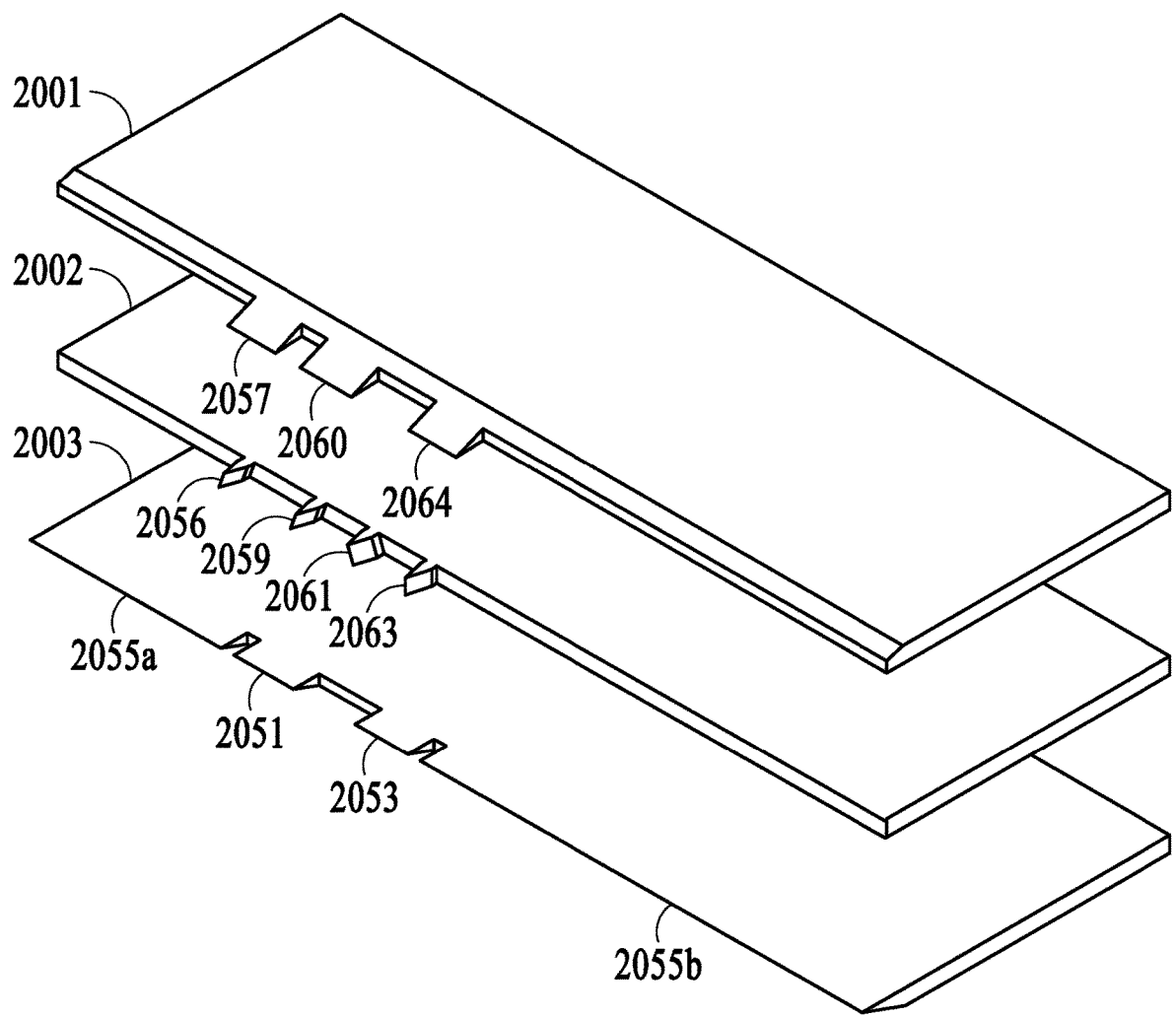
FIG. 42 shows tools used for making the incisions shown in FIG. 40.

FIG. 42 shows blades that are used to make incisions when manufacturing cap 1001 shown in FIG. 40 and FIG. 41. The tools additionally work an incision pattern that is the same pattern as the incision pattern for FIG. 40, only in a upside down orientation relative to the incision pattern for FIG. 40.

Caps are manufactured upside down, so when manufacturing cap 1041 shown in FIG. 40, blade 2001 functions as an upper blade and includes a knife 2057 that is used to form incision section 1023, a knife 2060 that is used to form incision section 1030, a knife 2064 that is used to form incision section 1034 and a knife 2053 that is used to form incision section 1025.

Blade 2002 functions a middle blade and includes a knife 2056 that is used to form incision section 1022, a knife 2059 that is used to form incision section 1029, a knife 2061 that is used to form incision section 1031 and a knife 2063 that is used to form incision section 1033.

A blade 2003 functions as a lower blade and includes a knife 2055a and a knife 2055b that are used to form incision section 1021, a knife 2051 that is used to form incision section 1028 and a knife 2064 that is used to form incision section 1032.

The upper blade, the middle blade and the lower blade form a blade set. While in FIG. 42 the knives are shown incorporated in three blades, other configurations of blades could be used. For example, the knives could all be included on one wide or multiple level blade. Alternatively, each knife could be included on its own dedicated blade. Alternatively any combination of knives could be included on any number of blades of a blade set. However, regardless of the number of blades used, the knives in each case can still configured so that a first row of the knives includes knife 2057, knife 2060 and knife 2064, a second row of the knives includes knife 2056, knife 2059, knife 2061 and knife 2063, and a third row of the knives include knife 2055a, knife 2055b, knife 2051 and knife 2053.

Notches in the knives form bridge connection portions between the cap and the ring section. The bridge connection portions are broken when the cap is mounted on a container and the container is opened by unscrewing the cap.

Upper blade 2001, middle blade 2002 and lower blade 2003 are included as part of manufacturing system such as manufacturing 70 shown in FIG. 4

While in FIG. 42, knife 2057, knife 2060, knife 2064 and knife 2067 are all shown included on a single blade, that is blade 2001, in alternative embodiments, knife 2057, knife 2060, knife 2064 and knife 2067 can be configured so that there are included as part of more than one blade. For example, knife 2057 and knife 2060 could be mounted on one blade, while knife 2064 and knife 2067 could be mounted on a different blade. Alternatively, each knife could be included on its own separate blade. Alternatively, three knives could be mounted on one blade and the remaining knife mounted on a separate blade, and so on.

Likewise, in alternative embodiments, knife 2055a, knife 2055b, knife 2051 and knife 2053 are all shown included on a single blade, that is blade 2003, in alternative embodiments, knife 2055a, knife 2055b, knife 2051 and knife 2053 can be configured so that there are included as part of more than one blade.

Likewise, in alternative embodiments, knife 2056, knife 2059, knife 2061 and knife 2063 are all shown included on a single blade, that is blade 2002, in alternative embodiments, knife 2056, knife 2059, knife 2061 and knife 2063 can be configured so that there are included as part of more than one blade.

Figure 43:
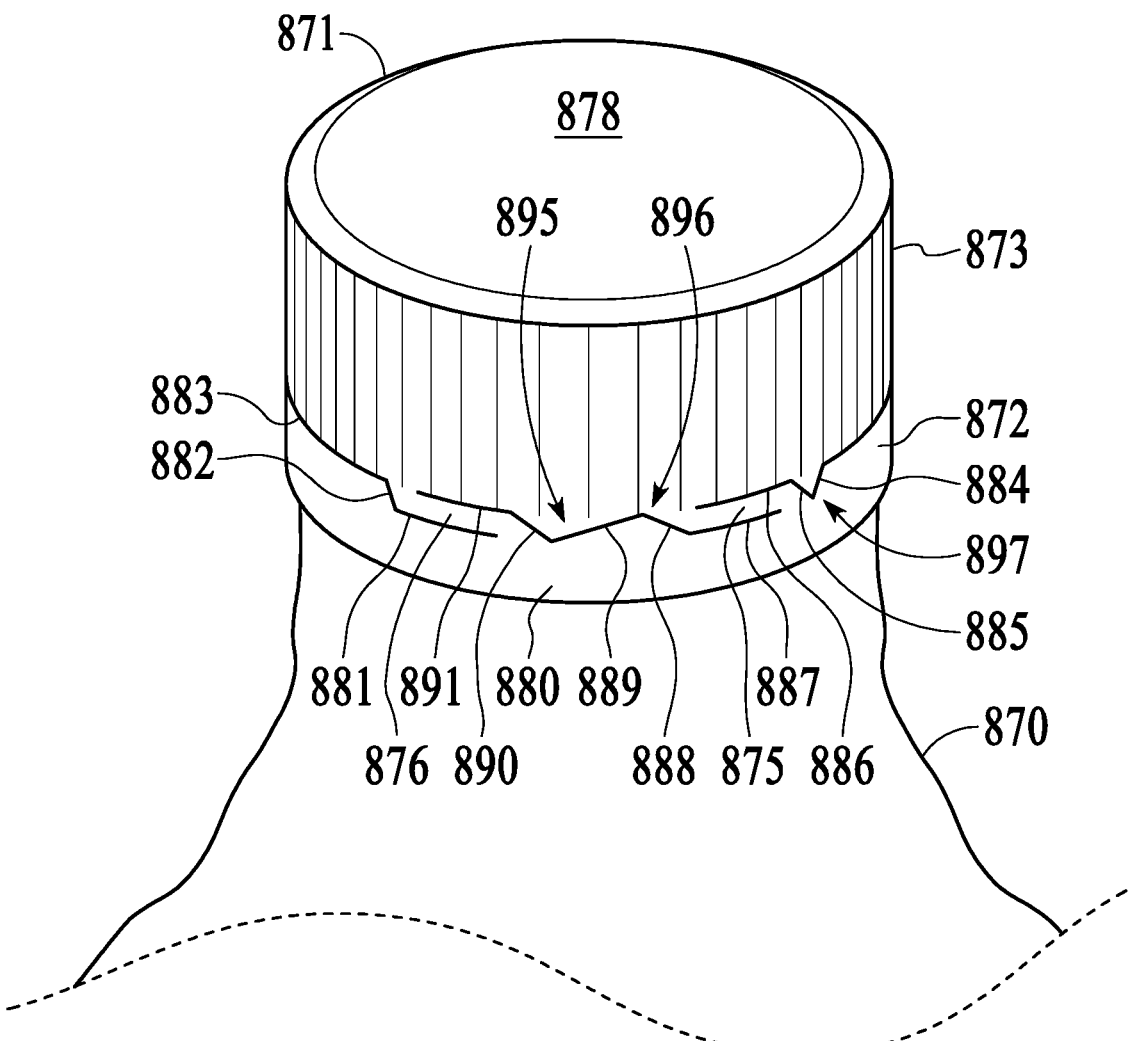
FIG. 43 and FIG. 44 illustrate another alternative pattern of incisions on a cap in accordance with an implementation.

FIG. 43 illustrates another improved incision pattern that simplifies manufacture and improves operation. FIG. 43 shows a cap 871 on a container 870. Cap 871 has a top surface 878 and a circular sidewall 873. Two incisions outline a connection portion 875, a connection portion 876, a tab 895, a tab 896 and a tab 897 as shown. The first incision includes an incision section 881, an incision section 882, an incision section 883, an incision section 884, an incision section 885 and an incision section 886. The second incision includes an incision section 887, an incision section 888, an incision section 889, an incision section 890 and an incision section 891. While connecting pins are not specifically shown in FIG. 43, they may be included along the first incision and the second incision, as described above in other implementations.

Connection portion 875, connection portion 876, tab 895, tab 896 and tab 897 are all formed between the same two incision planes. The first incision plane is delineated by incision section 881 of the first incision and by incision section 887 of the second incision, which are all incision sections placed on the first incision plane. The second incision plane is delineated by incision section 883 and incision section 886 of the first incision and by incision section 891 of the second incision, which are all incision sections placed on the second incision plane.

The boundaries of connection portion 876 are defined by incision section 881 and incision section 882 of the first incision and by incision section 890 and incision section 891 of the second incision.

The boundaries of connection portion 875 are defined by incision section 885 and incision section 886 of the first incision and incision section 887 and incision section 888 of the second incision.

The boundaries of tab 895 are defined by incision section 889 and incision section 890 of the second incision. The boundaries of tab 896 are defined by incision section 888 and incision section 889 of the second incision. The boundaries of tab 897 are defined by incision section 884 and incision section 885 of the first incision. Incision section 889 serves as a boundary incision section for both tab 895 and tab 896.

In the flipped position, tab 895 of cap 871 aligns to rest on tab 896 of ring member 872. In some implementations, tab 897 can be omitted by omitting incision sections 884 and 885 and extending incision section 883 to connect directly with incision section 886.

Figure 44:
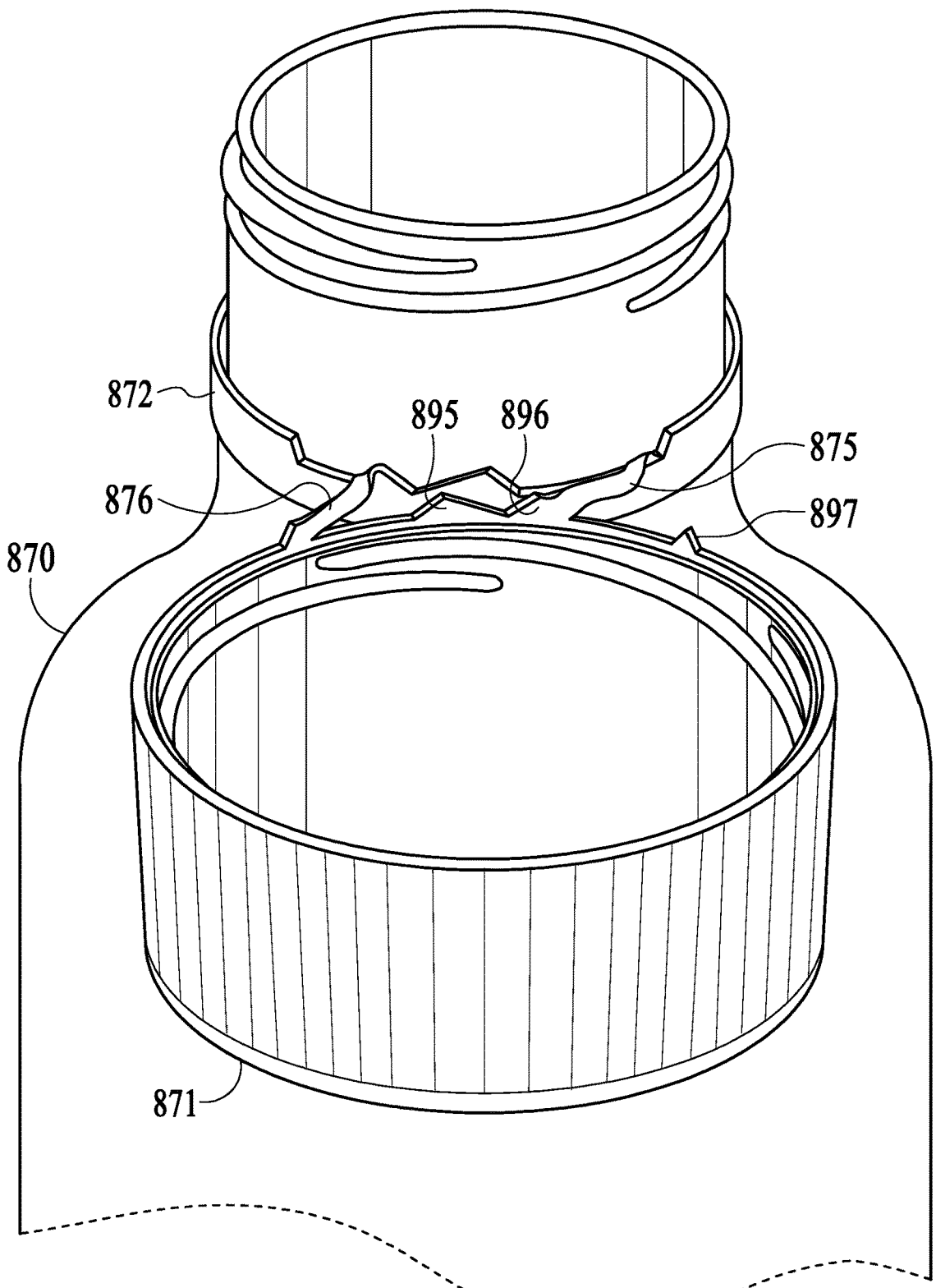

FIG. 44 shows cap 871 in the flipped position where top surface 878 faces in a downward direction. In the flipped position, tab 895 of cap 871 aligns to rest on 896 of ring member 872. The elasticity of connection portion 875 and connection portion 876 plus the shape and location of tab 895 and tab 896 hold cap 871 in a flipped position where top surface 878 faces in a downward direction.

Further, because both connection portion 876 and connection portion 875 fold over and extend out flat from ring member 872, this allows ring member to have reduced width, lowering the location of flipped cap 871 relative to container 870. Tab 895 therefore can have a lower profile, as shown in FIG. 44. The reduced profile (i.e. lower height) of tab 895 allows for less tension on connecting portion 875 and connecting portion 876 when flipping and flipping back allowing connection portion 876 and connection portion 875 to be shortened.

Figure 45:
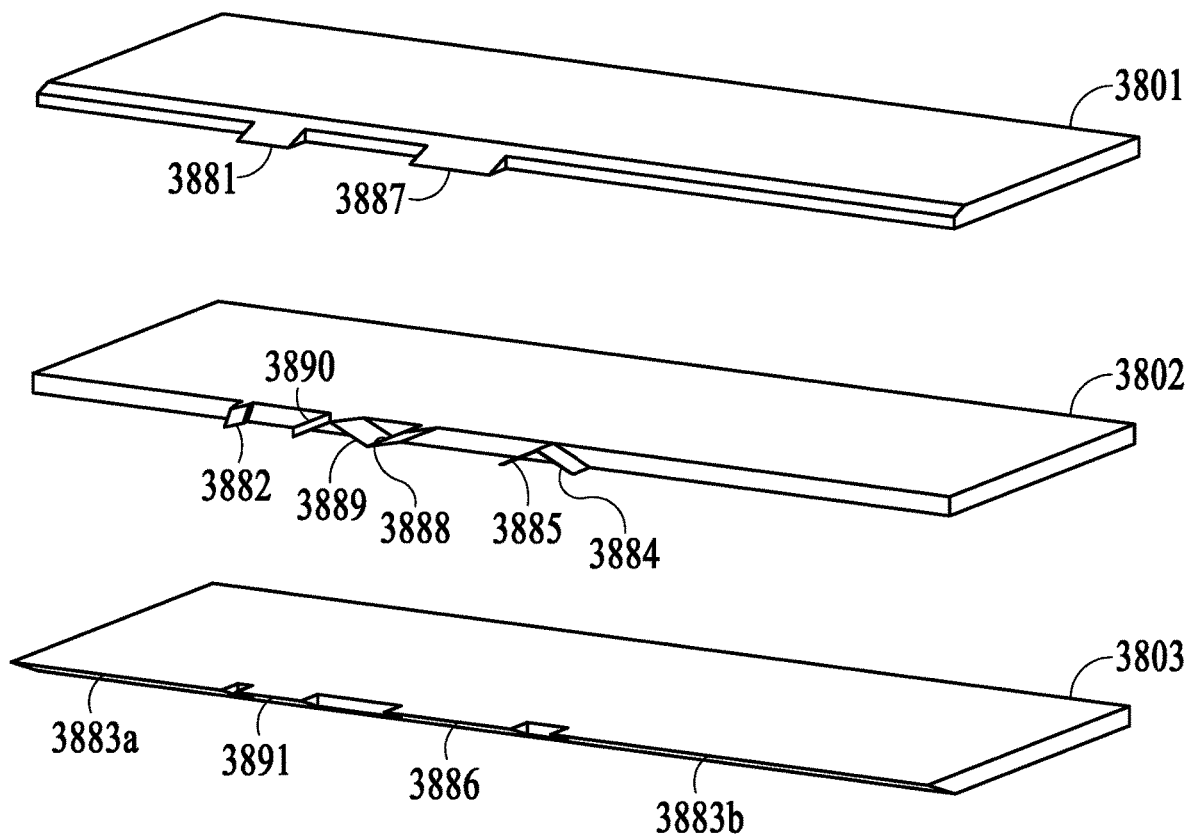
FIG. 45 shows tools used for making the incisions shown in FIG. 43.

FIG. 45 shows blades that are used to make incisions when manufacturing cap 871 shown in FIG. 43 and FIG. 44. The tools additionally work an incision pattern that is the same pattern as the incision pattern for FIG. 43, only in a upside down orientation relative to the incision pattern for FIG. 43.

Caps are manufactured upside down, so when manufacturing cap 871 shown in FIG. 43, blade 3801 functions as an upper blade and includes a knife 3881 that is used to form incision section 881 and a knife 3887 that is used to form incision section 887.

Blade 3802 functions a middle blade and includes a knife 3882 that is used to form incision section 882, a knife 3890 that is used to form incision section 890, a knife 3889 that is used to form incision section 889, a knife 3885 that is used to form incision section 885 and a knife 3884 that is used to form incision section 884.

A blade 3803 functions as a lower blade and includes a knife 3883a and a knife 3883b that are used to form incision section 883, a knife 3891 that is used to form incision section 891 and a knife 3886 that is used to form incision section 896.

Notches in the knives form bridge connection portions between the cap and the ring section. The bridge connection portions are broken when the cap is mounted on a container and the container is opened by unscrewing the cap.

Upper blade 3801, middle blade 3802 and lower blade 3803 are included as part of manufacturing system such as manufacturing 70 shown in FIG. 4

The upper blade, the middle blade and the lower blade form a blade set. While in FIG. 45 the knives are shown incorporated in three blades, other configurations of blades could be used. For example, the knives could all be included on one wide or multiple level blade. Alternatively, each knife could be included on its own dedicated blade. Alternatively any combination of knives could be included on any number of blades of a blade set. However, regardless of the number of blades used, the knives in each case can still configured so that a first row of the knives includes knife 3881 and knife 3887, a second row of the knives includes knife 3882, knife 3890, knife 3889, knife 3888, knife 3885 and knife 3884, and a third row of the knives include knife 3883a, knife 3883b, knife 3891 and knife 3886.

Figure 46:
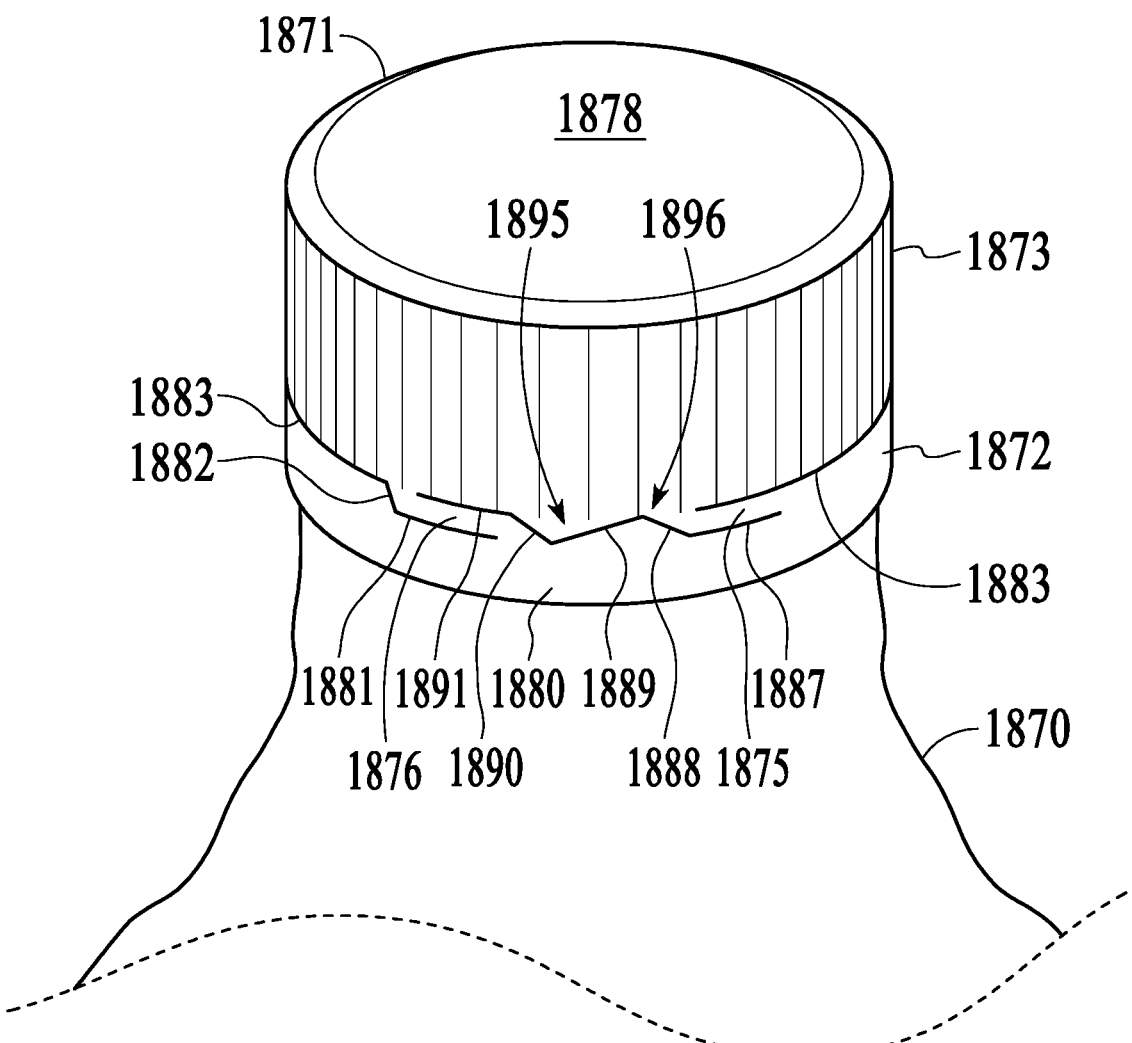
FIG. 46 and FIG. 47 illustrate another alternative pattern of incisions on a cap in accordance with an implementation.

FIG. 46 illustrates another improved incision pattern that simplifies manufacture and improves operation. FIG. 46 shows a cap 1871 on a container 1870. Cap 1871 has a top surface 1878 and a circular sidewall 1873. Two incisions outline a connection portion 1875, a connection portion 1876, a tab 1895, a tab 1896 and a tab 1897 as shown. The first incision includes an incision section 1881, an incision section 1882 and an incision section 1883. The second incision includes an incision section 1887, an incision section 1888, an incision section 1889, an incision section 1890 and an incision section 1891. While connecting pins are not specifically shown in FIG. 46, they may be included along the first incision and the second incision, as described above in other implementations.

Connection portion 1875, connection portion 1876, tab 1895, tab 1896 and tab 1897 are all formed between the same two incision planes. The first incision plane is delineated by incision section 1881 of the first incision and by incision section 1887 of the second incision, which are all incision sections placed on the first incision plane. The second incision plane is delineated by incision section 1883 of the first incision and by incision section 1891 of the second incision, which are all incision sections placed on the second incision plane.

The boundaries of connection portion 1876 are defined by incision section 1881 and incision section 1882 of the first incision and by incision section 1890 and incision section 1891 of the second incision.

The boundaries of connection portion 1875 are defined by incision section 1883 of the first incision and incision section 1887 and incision section 1888 of the second incision.

The boundaries of tab 1895 are defined by incision section 1889 and incision section 1890 of the second incision. The boundaries of tab 1896 are defined by incision section 1888 and incision section 1889 of the second incision. Incision section 1889 serves as a boundary incision section for both tab 1895 and tab 1896.

In the flipped position, tab 1895 of cap 1871 aligns to rest on tab 1896 of ring member 1872.

Figure 47:
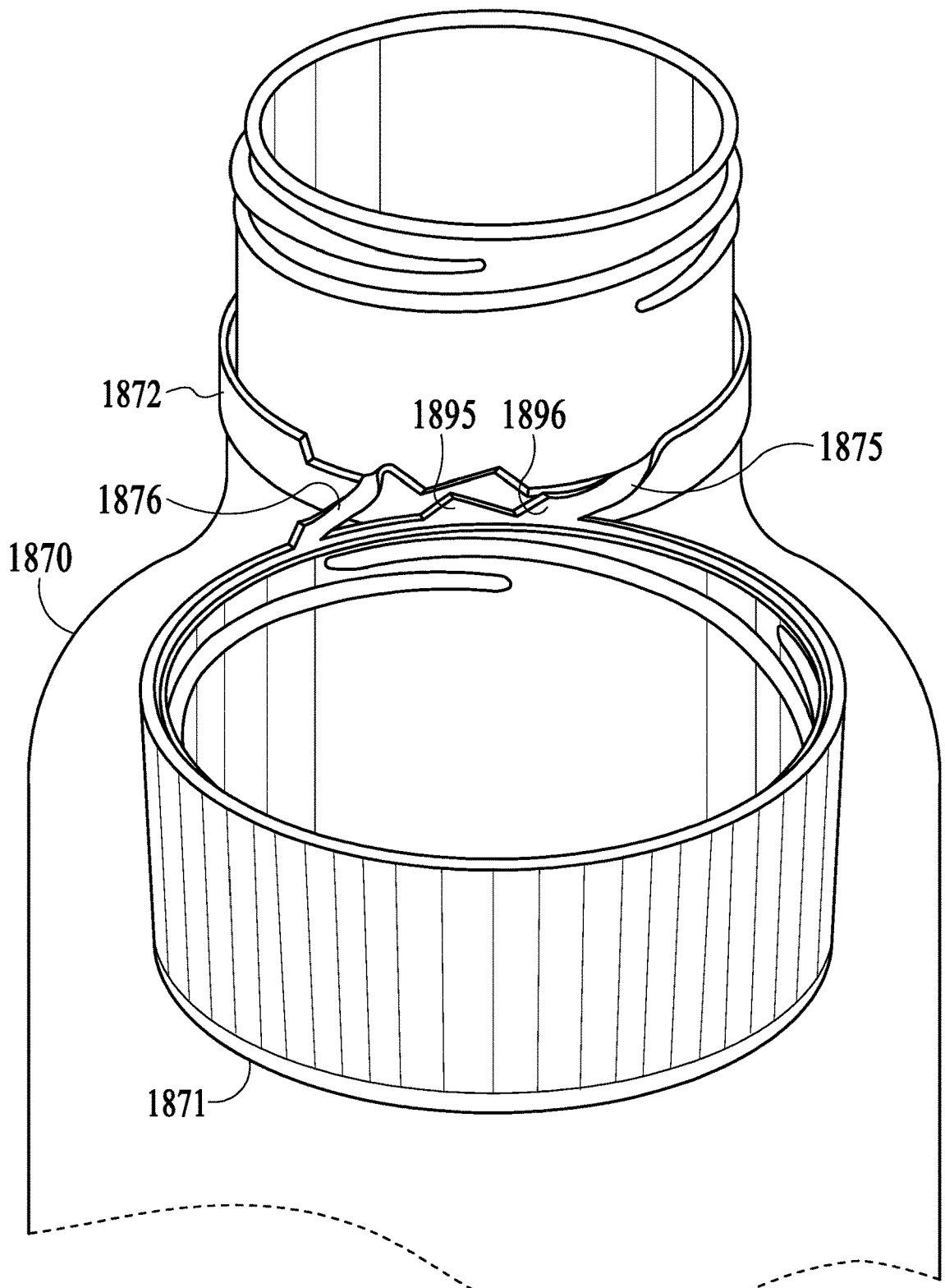

FIG. 47 shows cap 1871 in the flipped position where top surface 1878 faces in a downward direction. In the flipped position, tab 1895 of cap 1871 aligns to rest on 1896 of ring member 1872. The elasticity of connection portion 1875 and connection portion 1876 plus the shape and location of tab 1895 and tab 1896 hold cap 1871 in a flipped position where top surface 1878 faces in a downward direction.

Further, because both connection portion 1876 and connection portion 1875 fold over and extend out flat from ring member 1872, this allows ring member to have reduced width, lowering the location of flipped cap 1871 relative to container 1870. Tab 1895 therefore can have a lower profile, as shown in FIG. 47. The reduced profile (i.e. lower height) of tab 1895 allows for less tension on connecting portion 1875 and connecting portion 1876 when flipping and flipping back allowing connection portion 1876 and connection portion 1875 to be shortened.

Figure 48:
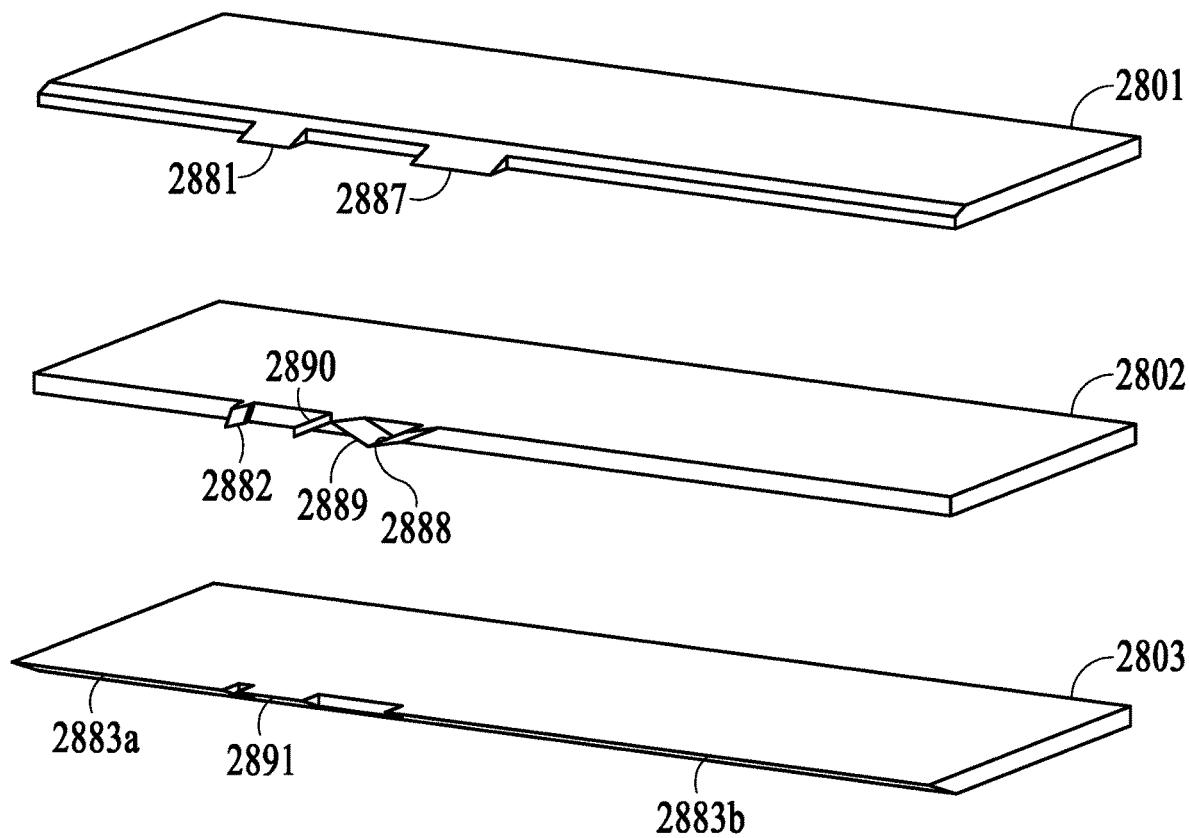
FIG. 48 shows tools used for making the incisions shown in FIG. 46.

FIG. 48 shows blades that are used to make incisions when manufacturing cap 1871 shown in FIG. 46 and FIG. 47. The tools additionally work an incision pattern that is the same pattern as the incision pattern for FIG. 46, only in a upside down orientation relative to the incision pattern for FIG. 46.

Caps are manufactured upside down, so when manufacturing cap 1871 shown in FIG. 46, blade 2801 functions as an upper blade and includes a knife 2881 that is used to form incision section 1881 and a knife 2887 that is used to form incision section 1887.

Blade 2802 functions a middle blade and includes a knife 2882 that is used to form incision section 1882, a knife 2890 that is used to form incision section 1890 and a knife 2889 that is used to form incision section 1889.

A blade 2803 functions as a lower blade and includes a knife 2883a and a knife 2883b that are used to form incision section 1883 and a knife 2891 that is used to form incision section 1891.

Notches in the knives form bridge connection portions between the cap and the ring section. The bridge connection portions are broken when the cap is mounted on a container and the container is opened by unscrewing the cap.

Upper blade 2801, middle blade 2802 and lower blade 2803 are included as part of manufacturing system such as manufacturing 70 shown in FIG. 4

The upper blade, the middle blade and the lower blade form a blade set. While in FIG. 48 the knives are shown incorporated in three blades, other configurations of blades could be used. For example, the knives could all be included on one wide or multiple level blade. Alternatively, each knife could be included on its own dedicated blade. Alternatively any combination of knives could be included on any number of blades of a blade set. However, regardless of the number of blades used, the knives in each case can still configured so that a first row of the knives includes knife 2881 and knife 2887, a second row of the knives includes knife 2882, knife 2890, knife 2889 and knife 2888, and a third row of the knives include knife 2883a, knife 2883b and knife 2891.

Figure 49:
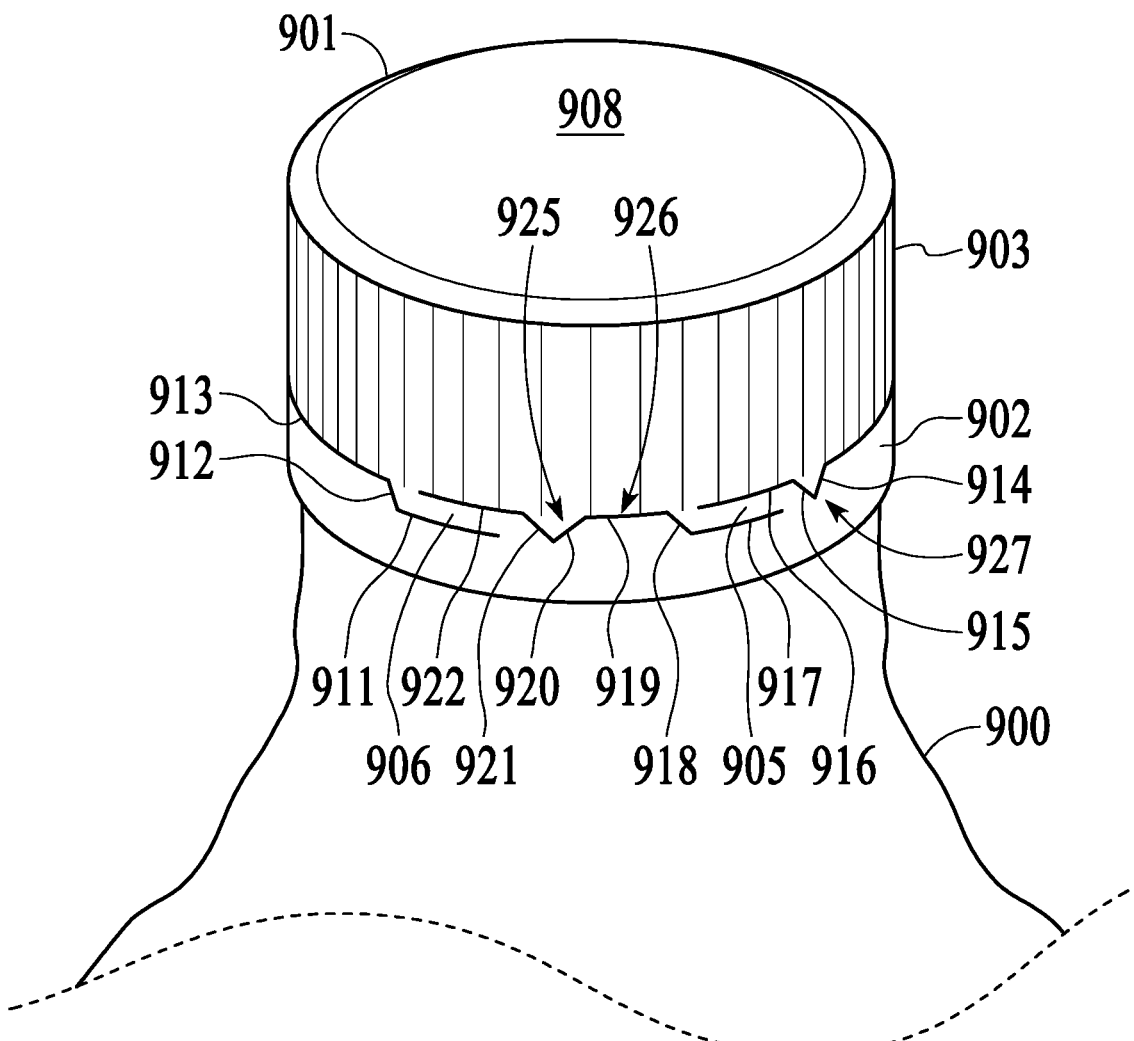
FIG. 49 and FIG. 50 illustrate another alternative pattern of incisions on a cap in accordance with an implementation.

In another example, FIG. 49 shows a cap 901 on a container 900. Cap 901 has a top surface 908 and a circular sidewall 903. Two incisions outline a connection portion 905, a connection portion 906, a tab 925, a tab 926 and a tab 927 as shown. The first incision includes an incision section 911, an incision section 912, an incision section 913, an incision section 914, an incision section 915 and an incision section 916. The second incision includes an incision section 917, an incision section 918, an incision section 919, an incision section 920, an incision section 921 and an incision section 922. While connecting pins are not specifically shown in FIG. 49, they may be included along the first incision and the second incision, as described above in other implementations.

Connection portion 905, connection portion 906, tab 925, tab 926 and tab 927 are all formed between the same two incision planes. The first incision plane is delineated by incision section 911 of the first incision and by incision section 917 of the second incision, which are all incision sections placed on the first incision plane. The second incision plane is delineated by incision section 913 and incision section 916 of the first incision and by incision section 919 and incision section 922 of the second incision, which are all incision sections placed on the second incision plane.

The boundaries of connection portion 906 are defined by incision section 911 and incision section 912 of the first incision and by incision section 921 and incision section 922 of the second incision.

The boundaries of connection portion 905 are defined by incision section 915 and incision section 916 of the first incision and incision section 917 and incision section 918 of the second incision.

The boundaries of tab 925 are defined by incision section 920 and incision section 921 of the second incision. The boundaries of tab 926 are defined by incision section 918, incision section 919 and incision section 920 of the second incision. The boundaries of tab 927 are defined by incision section 914 and incision section 915 of the first incision. Incision section 920 serves as a boundary incision section for both tab 925 and tab 926.

In the flipped position, tab 925 of cap 901 aligns to rest on tab 926 of ring member 902. In some implementations, tab 927 can be omitted by omitting incision sections 914 and 915 and extending incision section 913 to connect directly with incision section 916.

Figure 50:
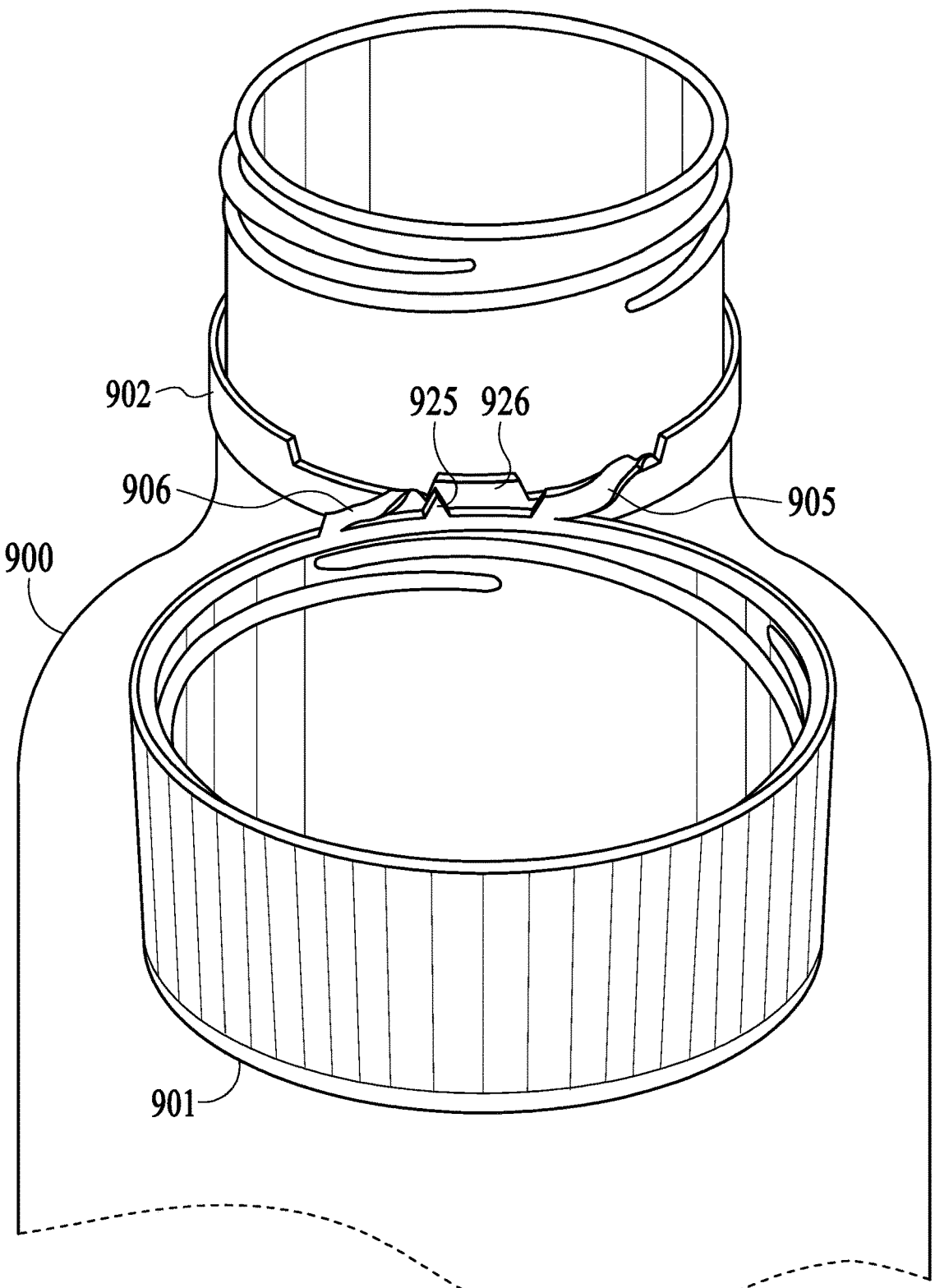

FIG. 50 shows cap 901 in the flipped position where top surface 908 faces in a downward direction. In the flipped position, tab 925 of cap 901 aligns to rest on tab 926 of ring member 902. The elasticity of connection portion 905 and connection portion 906 plus the shape and location of tab 925 and tab 926 hold cap 901 in a flipped position where top surface 908 faces in a downward direction.

Further, because both connection portion 906 and connection portion 905 fold over and extend out flat from ring member 902, this allows ring member to have reduced width, lowering the location of flipped cap 901 relative to container 900. Tab 925 therefore can have a lower profile, as shown in FIG. 50. The reduced profile (i.e. lower height) of tab 925 allows for less tension on connecting portion 905 and connecting portion 906 when flipping and flipping back allowing connection portion 906 and connection portion 905 to be shortened.

Figure 51:
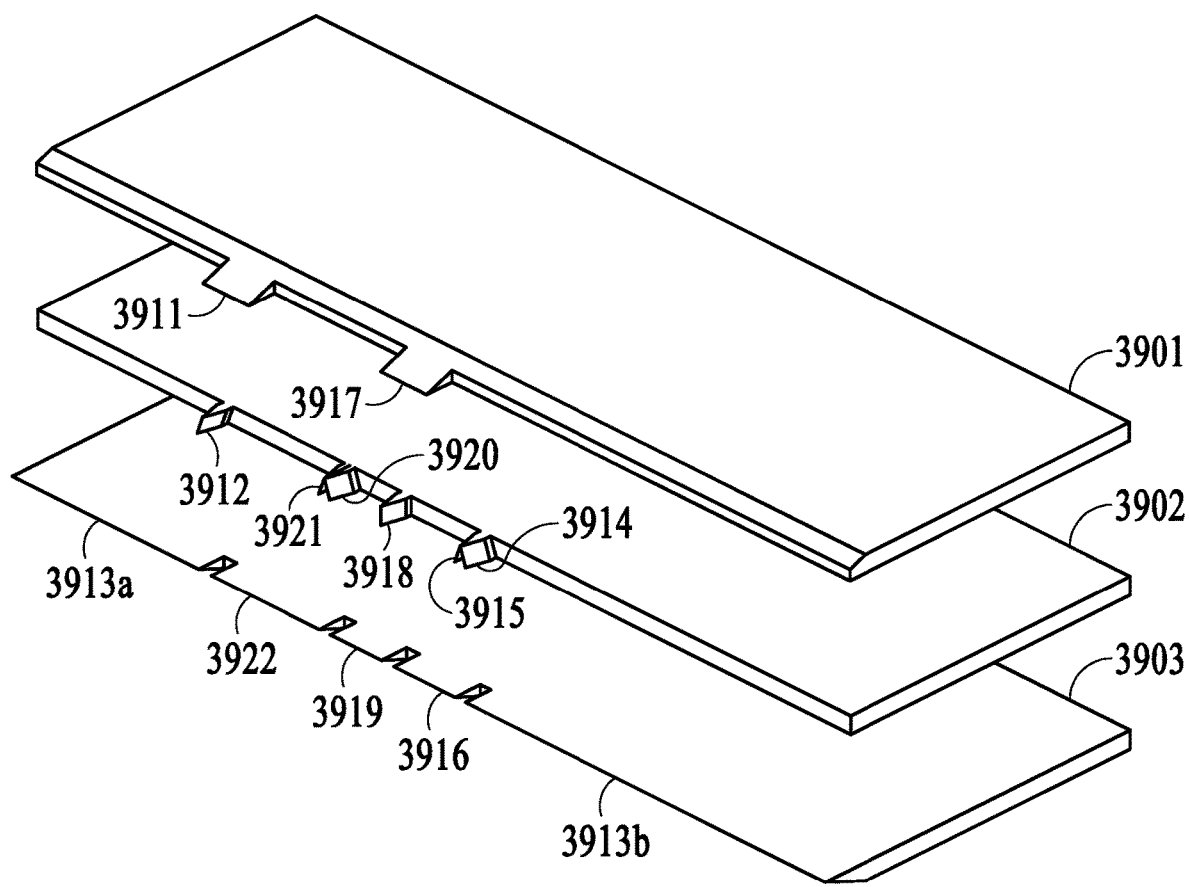
FIG. 51 shows tools used for making the incisions shown in FIG. 49.

FIG. 51 shows blades that are used to make incisions when manufacturing cap 901 shown in FIG. 49 and FIG. 50. The tools additionally work an incision pattern that is the same pattern as the incision pattern for FIG. 48, only in a upside down orientation relative to the incision pattern for FIG. 48.

Caps are manufactured upside down, so when manufacturing cap 901 shown in FIG. 49, blade 3901 functions as an upper blade and includes a knife 3911 that is used to form incision section 911 and a knife 3917 that is used to form incision section 917.

Blade 3902 functions a middle blade and includes a knife 3912 that is used to form incision section 912, a knife 3921 that is used to form incision section 921, a knife 3918 that is used to form incision section 918, a knife 3915 that is used to form incision section 915 and a knife 3914 that is used to form incision section 914.

A blade 3903 functions as a lower blade and includes a knife 3913a and a knife 3913b that are used to form incision section 913, a knife 3922 that is used to form incision section 922, a knife 3919 that is used to form incision section 919 and a knife 3916 that is used to form incision section 916.

Notches in the knives form bridge connection portions between the cap and the ring section. The bridge connection portions are broken when the cap is mounted on a container and the container is opened by unscrewing the cap.

Upper blade 3901, middle blade 3902 and lower blade 3903 are included as part of manufacturing system such as manufacturing 70 shown in FIG. 4

The upper blade, the middle blade and the lower blade form a blade set. While in FIG. 51 the knives are shown incorporated in three blades, other configurations of blades could be used. For example, the knives could all be included on one wide or multiple level blade. Alternatively, each knife could be included on its own dedicated blade. Alternatively any combination of knives could be included on any number of blades of a blade set. However, regardless of the number of blades used, the knives in each case can still configured so that a first row of the knives includes knife 3911 and knife 3917, a second row of the knives includes knife 3912, knife 3921, knife 3918 and knife 3915, and a third row of the knives include knife 3913a, knife 3913b, knife 3922, knife 3919 and knife 3916.

Figure 52:
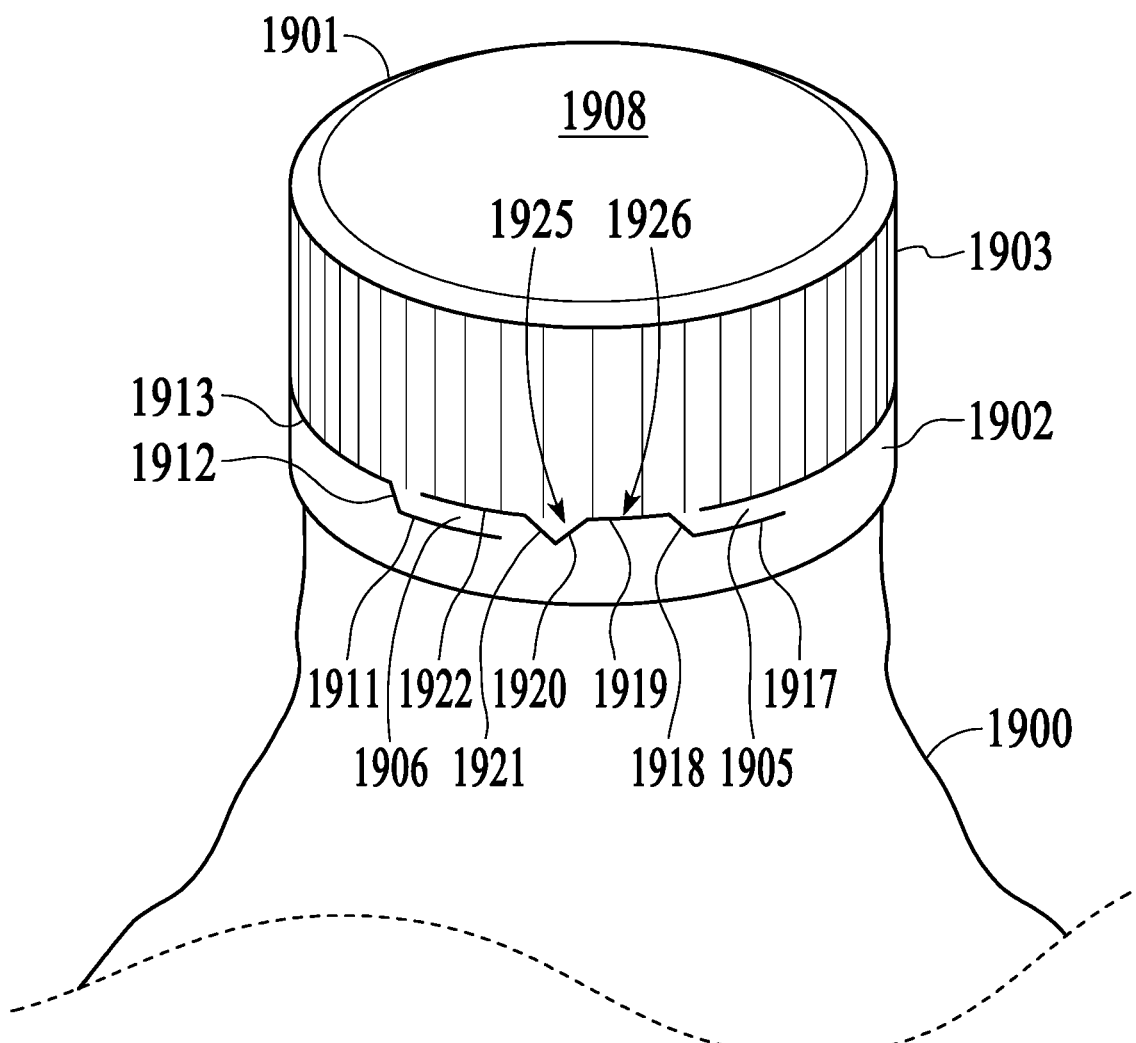
FIG. 52 and FIG. 53 illustrate another alternative pattern of incisions on a cap in accordance with an implementation.

In another example, FIG. 52 shows a cap 1901 on a container 1900. Cap 1901 has a top surface 1908 and a circular sidewall 1903. Two incisions outline a connection portion 1905, a connection portion 1906, a tab 1925 and a tab 1926 a as shown. The first incision includes an incision section 1911, an incision section 1912 and an incision section 1913. The second incision includes an incision section 1917, an incision section 1918, an incision section 1919, an incision section 1920, an incision section 1921 and an incision section 1922. While connecting pins are not specifically shown in FIG. 52, they may be included along the first incision and the second incision, as described above in other implementations.

Connection portion 1905, connection portion 1906, tab 1925 and tab 1926 are all formed between the same two incision planes. The first incision plane is delineated by incision section 1911 of the first incision and by incision section 1917 of the second incision, which are all incision sections placed on the first incision plane. The second incision plane is delineated by incision section 1913 and incision section 1916 of the first incision and by incision section 1919 and incision section 1922 of the second incision, which are all incision sections placed on the second incision plane.

The boundaries of connection portion 1906 are defined by incision section 1911 and incision section 1912 of the first incision and by incision section 1921 and incision section 1922 of the second incision.

The boundaries of connection portion 1905 are defined by incision section 1913 of the first incision and incision section 1917 and incision section 1918 of the second incision.

The boundaries of tab 1925 are defined by incision section 1920 and incision section 1921 of the second incision. The boundaries of tab 1926 are defined by incision section 1918, incision section 1919 and incision section 1920 of the second incision. Incision section 1920 serves as a boundary incision section for both tab 1925 and tab 1926.

In the flipped position, tab 1925 of cap 1901 aligns to rest on tab 1926 of ring member 1902.

Figure 53:
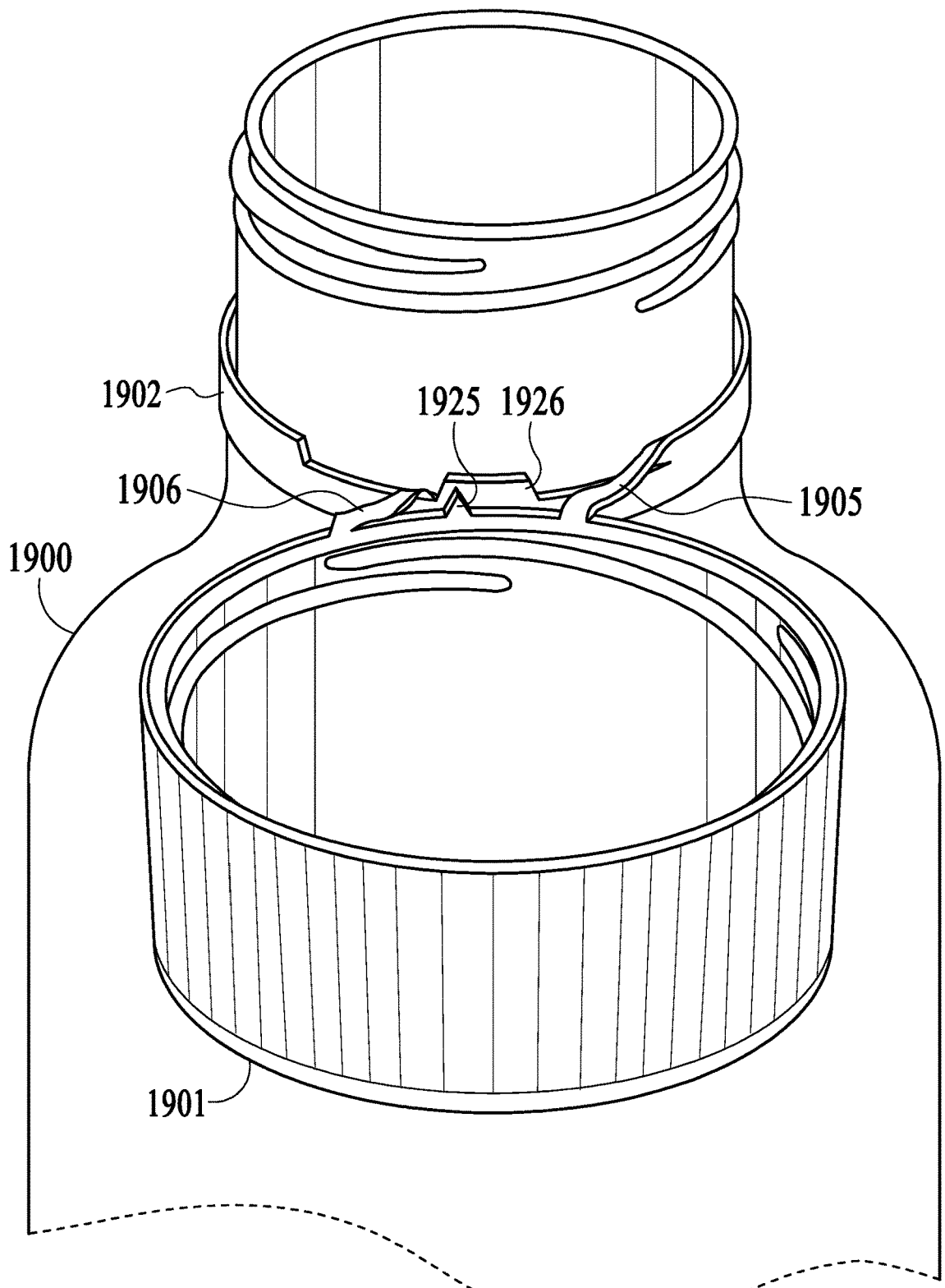

FIG. 53 shows cap 1901 in the flipped position where top surface 1908 faces in a downward direction. In the flipped position, tab 1925 of cap 1901 aligns to rest on tab 1926 of ring member 1902. The elasticity of connection portion 1905 and connection portion 1906 plus the shape and location of tab 1925 and tab 1926 hold cap 1901 in a flipped position where top surface 1908 faces in a downward direction.

Further, because both connection portion 1906 and connection portion 1905 fold over and extend out flat from ring member 1902, this allows ring member to have reduced width, lowering the location of flipped cap 1901 relative to container 1900. Tab 1925 therefore can have a lower profile, as shown in FIG. 53. The reduced profile (i.e. lower height) of tab 1925 allows for less tension on connecting portion 1905 and connecting portion 1906 when flipping and flipping back allowing connection portion 1906 and connection portion 1905 to be shortened.

Figure 54:
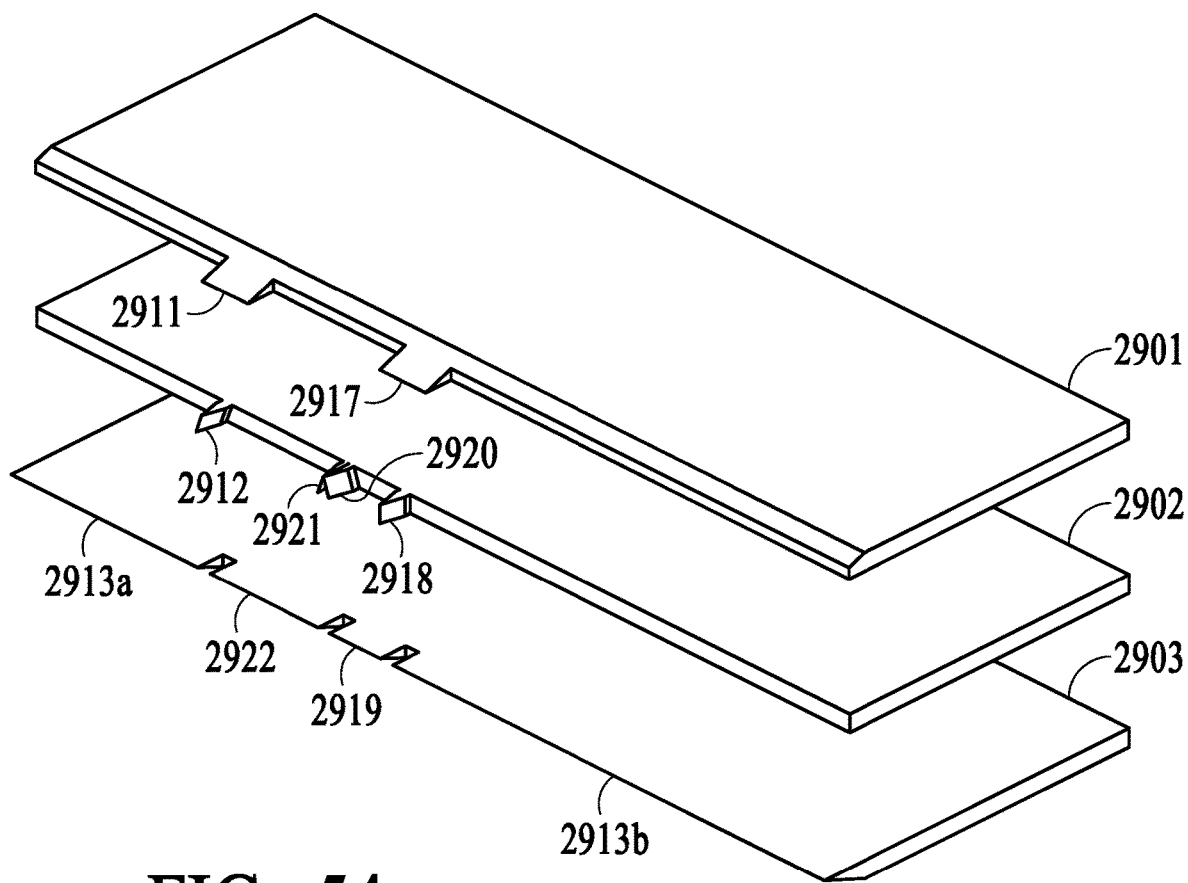
FIG. 54 shows tools used for making the incisions shown in FIG. 52.

FIG. 54 shows blades that are used to make incisions when manufacturing cap 1901 shown in FIG. 52 and FIG. 53. The tools additionally work an incision pattern that is the same pattern as the incision pattern for FIG. 48, only in a upside down orientation relative to the incision pattern for FIG. 48.

Caps are manufactured upside down, so when manufacturing cap 1901 shown in FIG. 52, blade 2901 functions as an upper blade and includes a knife 2911 that is used to form incision section 1911 and a knife 2917 that is used to form incision section 1917.

Blade 2902 functions a middle blade and includes a knife 2912 that is used to form incision section 1912, a knife 2921 that is used to form incision section 1921 and a knife 2918 that is used to form incision section 1918.

A blade 2903 functions as a lower blade and includes a knife 2913a and a knife 2913b that are used to form incision section 1913, a knife 2922 that is used to form incision section 1922 and a knife 2919 that is used to form incision section 1919.

Notches in the knives form bridge connection portions between the cap and the ring section. The bridge connection portions are broken when the cap is mounted on a container and the container is opened by unscrewing the cap.

Upper blade 2901, middle blade 2902 and lower blade 2903 are included as part of manufacturing system such as manufacturing 70 shown in FIG. 4

The upper blade, the middle blade and the lower blade form a blade set. While in FIG. 54 the knives are shown incorporated in three blades, other configurations of blades could be used. For example, the knives could all be included on one wide or multiple level blade. Alternatively, each knife could be included on its own dedicated blade. Alternatively any combination of knives could be included on any number of blades of a blade set. However, regardless of the number of blades used, the knives in each case can still configured so that a first row of the knives includes knife 2911 and knife 2917, a second row of the knives includes knife 2912, knife 2921 and knife and a third row of the knives include knife 2913a, knife 2913b, knife 2922 and knife 2919.

Figure 55:
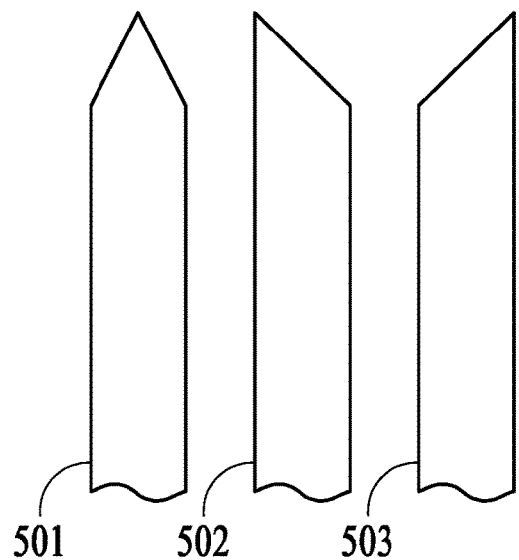
FIG. 55 illustrates orientation of a cutting edge.

The knives used for incisions can be made, for example, of hardened steel or some other long lasting material that allows for precision cutting of incisions in a manufacturing process. FIG. 55, illustrates that the cutting edge can be in any orientation including in a middle of the knife, as in knife 501, on one side of the knife as in knife 502 or on an opposite side of the knife as in knife 403.

As illustrated by blade 77 shown in FIG. 7, the blades may be in a concave formation. This allows incisions to be made on a cap from the outer radius of the cap. Alternatively, the blades may be in a convex formation. This allows incisions to be made on a cap from the inner radius of the cap.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A cap-manufacturing tool, the tool comprising:
a plurality of knives, the knives being configured to make incisions in a cap having a main body having a top plate and a circular sidewall, the top plate having a top surface, wherein two opposite sides of the circular sidewall circularly connect to each other, one periphery of the circular sidewall connects to one surface of the top plate forming a closed end, and the other periphery of the circular sidewall at the opposite side of the closed end forms an opened end and a ring member, which is located at the opened end of the main body, the plurality of knives including:
a first set of knives configured to cut a first incision in the cap, the first incision being defined between first and second ends thereof that do not meet; and
a second set of knives configured to cut a second incision in the cap such that the first incision and the second incision do not intersect, the second incision being defined between first and second ends thereof that do not meet;
wherein a first knife in the first set of knives and a second knife in the second set of knives are configured, respectively, to make a first incision section and a second incision section in the cap, thereby forming a first connection portion that connects the main body to the ring member therebetween;
wherein a third knife in the first set of knives and a fourth knife in the second set of knives are configured, respectively, to make a third incision section and a fourth incision section in the cap, thereby forming a second connection portion that connects the main body to the ring member therebetween;
wherein the second set of knives are additionally configured to form a first tab on the ring member and a second tab on the sidewall so that a fifth knife of the second set of knives is configured to make a fifth incision section defining a first side of the first tab, a sixth knife of the second set of knives is configured to make a sixth incision section defining both a second side of the first tab and a first side of the second tab, and a seventh knife of the second set of knives is configured to make a seventh incision section defining a second side of the second tab;
wherein an eighth knife of the second set of knives is configured to make an eighth incision section so that a first end of the eighth incision section is joined to the fifth incision section and a second end of the eighth incision section is joined to a first end of the sixth incision section;
wherein a ninth knife of the second set of knives is configured to make a ninth incision section so that a first end of the ninth incision section is joined to a second end of the sixth incision section and a second end of the ninth incision section is joined to the seventh incision section;
wherein the first connection portion, the second connection portion, the first tab and the second tab are all formed between the same two incision planes: a first incision plane being delimited by the first incision section, the fourth incision section, and the ninth incision section; and a second incision plane being delimited by the second incision section, the third incision section, and the eighth incision section; and
wherein the knives are organized in rows so that a first row includes the first knife and the fourth knife and the ninth knife, a second row includes the fifth knife, the sixth knife and the seventh knife and a third row includes the second knife and the third knife and the eighth knife.

2. The tool as in claim 1, wherein when the cap is opened and in a flipped position, the first tab overlaps the second tab, holding the cap in the flipped position.

3. The tool as claimed in claim 1, wherein the first incision includes a plurality of connector pins.

4. The tool as in claim 1:
wherein the first set of knives are additionally configured on the blade set to form a gap on the ring member or on the sidewall so that a tenth knife of the first set of knives makes a tenth incision section defining a first side of a third tab and an eleventh knife of the first set of knives makes an eleventh incision section defining a second side of the third tab, the gap being located at an end of the first connection portion.

5. The tool as in claim 1:
wherein the plurality of knives are incorporated within a blade set, the blade set including a first blade, a second blade and a third blade;
wherein the first knife, the fourth knife and the ninth knife are included in the first blade;
wherein the fifth knife, the sixth knife and the seventh knife are included in the second blade; and
wherein the second knife, the third knife and the eighth knife are included in the third blade.

6. The tool as in claim 1:
wherein the first set of knives are additionally configured on the blade set to form a gap on the ring member or on the sidewall so that a tenth knife of the first set of knives makes a tenth incision section defining a first side of a third tab, an eleventh knife of the first set of knives makes an eleventh incision section defining a second side of the third tab, the gap being located at an end of the first connection portion; and
wherein a twelfth knife of the first set of knives is configured to make a twelfth incision section so that a first end of the twelfth incision section is joined to the tenth incision section and a second end of the eighth incision section is joined to the eleventh incision section.

7. The tool as in claim 1:
wherein the first set of knives are additionally configured on the blade set to form a gap on the ring member or on the sidewall so that a tenth knife of the first set of knives makes a tenth incision section defining a first side of a third tab, an eleventh knife of the first set of knives makes an eleventh incision section defining a second side of the third tab, the gap being located at an end of the first connection portion;
wherein a twelfth knife of the first set of knives is configured to make a twelfth incision section so that a first end of the twelfth incision section is joined to the tenth incision section and a second end of the twelfth incision section is joined to the eleventh incision section;
wherein the plurality of knives are incorporated within a blade set, the blade set including a first blade, a second blade and a third blade;
wherein the first knife, the fourth knife and the ninth knife are included in the first blade;
wherein the fifth knife, the sixth knife, the seventh knife, the tenth knife and the eleventh knife are included in the second blade; and
wherein the second knife, the third knife, the eighth knife and the twelfth knife are included in the third blade.

8. The tool as in claim 1, wherein:
wherein the plurality of knives are incorporated within a blade set that includes a first blade, a second blade and a third blade;
wherein the first knife and the fourth knife are included as part of the first blade;
wherein the fifth knife, the sixth knife and the seventh knife are included as part of the second blade; and
wherein the second knife and the third knife are included as part of the third blade.

* * * * *